United States Patent
Talebi Fard et al.

(10) Patent No.: US 12,295,055 B2
(45) Date of Patent: May 6, 2025

(54) CELL RESELECTION DURING ONGOING SDT PROCEDURE

(71) Applicant: Ofinno, LLC, Reston, VA (US)

(72) Inventors: Peyman Talebi Fard, Vienna, VA (US); Esmael Hejazi Dinan, McLean, VA (US); Taehun Kim, Fairfax, VA (US); Jinsook Ryu, Oakton, VA (US); Kyungmin Park, Vienna, VA (US); Weihua Qiao, Herndon, VA (US)

(73) Assignee: Ofinno, LLC, Reston, VA (US)

(*) Notice: Subject to any disclaimer, the term of this patent is extended or adjusted under 35 U.S.C. 154(b) by 0 days.

(21) Appl. No.: 18/084,066

(22) Filed: Dec. 19, 2022

(65) Prior Publication Data

US 2023/0122928 A1    Apr. 20, 2023

Related U.S. Application Data

(63) Continuation of application No. 17/219,178, filed on Mar. 31, 2021, now Pat. No. 11,533,773.

(60) Provisional application No. 63/002,419, filed on Mar. 31, 2020.

(51) Int. Cl.
*H04W 76/18* (2018.01)
*H04W 72/27* (2023.01)
*H04W 76/30* (2018.01)

(52) U.S. Cl.
CPC .......... *H04W 76/18* (2018.02); *H04W 72/27* (2023.01); *H04W 76/30* (2018.02)

(58) Field of Classification Search
None
See application file for complete search history.

(56) References Cited

U.S. PATENT DOCUMENTS

| | | | |
|---|---|---|---|
| 2014/0248882 A1 | 9/2014 | Wang et al. | |
| 2021/0076354 A1* | 3/2021 | Yang | H04W 76/19 |
| 2021/0211945 A1 | 7/2021 | Rugeland et al. | |
| 2022/0124868 A1* | 4/2022 | Kim | H04W 76/19 |
| 2023/0014211 A1* | 1/2023 | Li | H04W 48/20 |
| 2023/0067158 A1* | 3/2023 | Kim | H04W 28/06 |

FOREIGN PATENT DOCUMENTS

WO    2019194649 A1    10/2019

OTHER PUBLICATIONS

3GPP TS 23.401 V16.5.0 (Dec. 2019); Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 16).

(Continued)

*Primary Examiner* — Kouroush Mohebbi
(74) *Attorney, Agent, or Firm* — Sachin Kandhari; Kavon Nasabzadeh; Jacob L. Mangan

(57) ABSTRACT

A wireless device sends, to a first base station, a first radio resource control (RRC) request message. The wireless device selects a second cell of a second base station without receiving a response to the first RRC request message. The wireless device sends, to the second base station, a second RRC request message comprising an identifier indicating the first base station. The wireless device receives, from the second base station, a RRC response message to the second RRC request message.

14 Claims, 39 Drawing Sheets

(56) References Cited

OTHER PUBLICATIONS

3GPP TS 23.501 V16.3.0 (Dec. 2019); Technical Specification; 3rd Generation Partnership Project; Technical Specification Group Services and System Aspects; System architecture for the 5G System (5GS); Stage 2; (Release 16).
3GPP TS 23.502 V16.3.0 (Dec. 2019); Technical Specification; 3rd Generation Partnership Project; Technical Specification Group Services and System Aspects; Procedures for the 5G System (5GS); Stage 2; (Release 16).
3GPP TS 24.301 V16.3.0 (Dec. 2019); Technical Specification; 3rd Generation Partnership Project; Technical Specification Group Core Network and Terminals; Non-Access-Stratum (NAS) protocol for Evolved Packet System (EPS); Stage 3 (Release 16).
3GPP TS 24.501 V16.3.0 (Dec. 2019); Technical Specification; 3rd Generation Partnership Project; Technical Specification Group Core Network and Terminals; Non-Access-Stratum (NAS) protocol for 5G System (5GS); Stage 3; (Release 16).
3GPP TS 33.401 V16.1.0 (Dec. 2019); Technical Specification; 3rd Generation Partnership Project; Technical Specification Group Services and System Aspects; 3GPP System Architecture Evolution (SAE); Security architecture; (Release 16).
3GPP TS 33.501 V15.5.0 (Jun. 2019); Technical Specification; 3rd Generation Partnership Project; Technical Specification Group Services and System Aspects; Security architecture and procedures for 5G system (Release 15).
3GPP TS 36.300 V16.0.0 (Dec. 2019); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2.
3GPP TS 36.304 V15.5.0 (Dec. 2019); Technical Specification; 3rd Generation Partnership Project; Technical Specification Group Radio Access Network; Evolved Universal Terrestrial Radio Access (E-UTRA); User Equipment (UE) procedures in idle mode (Release 15).
3GPP TS 36.321 V15.7.0 (Sep. 2019); Technical Specification; 3rd Generation Partnership Project; Technical Specification Group Radio Access Network; Evolved Universal Terrestrial Radio Access (E-UTRA); Medium Access Control (MAC) protocol specification; (Release 15).
3GPP TS 36.331 V15.7.0 (Sep. 2019); Technical Specification; 3rd Generation Partnership Project; Technical Specification Group Radio Access Network; Evolved Universal Terrestrial Radio Access (E-UTRA); Radio Resource Control (RRC); Protocol specification.
3GPP TS 36.331 V15.8.0 (Dec. 2019); Technical Specification; 3rd Generation Partnership Project; Technical Specification Group Radio Access Network; Evolved Universal Terrestrial Radio Access (E-UTRA); Radio Resource Control (RRC); Protocol specification.
3GPP TS 36.413 V16.0.0 (Dec. 2019); Technical Specification; 3rd Generation Partnership Project; Technical Specification Group Radio Access Network; Evolved Universal Terrestrial Radio Access Network (E-UTRAN);S1 Application Protocol (S1AP) (Release 16).
3GPP TS 36.423 V16.0.0 (Dec. 2019); Technical Specification; 3rd Generation Partnership Project; Technical Specification Group Radio Access Network; Evolved Universal Terrestrial Radio Access Network (E-UTRAN); X2 application protocol (X2AP); (Release 16).
3GPP TS 38.300 V16.0.0 (Dec. 2019); Technical Specification; 3rd Generation Partnership Project; Technical Specification Group Radio Access Network; NR; NR and NG-RAN Overall Description; Stage 2; (Release 16).
3GPP TS 38.304 V15.6.0 (Dec. 2019); Technical Specification; 3rd Generation Partnership Project; Technical Specification Group Radio Access Network; NR; User Equipment (UE) procedures in Idle mode and RRC Inactive state; (Release 15).
3GPP TSG-RAN WG2 Meeting #103bis; R2-1813836; Chengdu, China, Oct. 8-12, 2018; CR-Form-v11.2; Correction on UE behaviour in inactive state upon inter-RAT cell (re)selection; (Release 15).

3GPP TS 38.321 V15.8.0 (Dec. 2019); Technical Specification; 3rd Generation Partnership Project; Technical Specification Group Radio Access Network; NR; Medium Access Control (MAC) protocol specification; (Release 15).
3GPP TS 38.331 V15.8.0 (Dec. 2019); Technical Specification; 3rd Generation Partnership Project; Technical Specification Group Radio Access Network; NR; Radio Resource Control (RRC) protocol specification; (Release 15).
3GPP TS 38.413 V16.0.0 (Dec. 2019); Technical Specification; 3rd Generation Partnership Project; Technical Specification Group Radio Access Network; NG-RAN; NG Application Protocol (NGAP); (Release 16).
3GPP TS 38.423 V16.0.0 (Dec. 2019); Technical Specification; 3rd Generation Partnership Project; Technical Specification Group Radio Access Network; NG-RAN; Xn application protocol (XnAP); (Release 16).
R2-1707911; 3GPP TSG-RAN WG2 #99; Berlin, Germany, Aug. 21-25, 2017; Resubmission of R2-1706412;Source: CATT; Title:Service types in inactive Mode; Agenda Item:10.4.2.2.
R2-1708075; 3GPP TSG-RAN WG2#99 Meeting; Berlin, Germany,Aug. 21-25, 2017updates of R2-1706740; Agenda Item:10. 4.2.2; Source: Huawei, HiSilicon; Title: Cell selection and reselection rules; Agenda Item: 10.4.2.2.
R2-1708256; 3GPP TSG-RAN WG2 Meeting NR #99; Berlin, Germany, Aug. 21-25, 2017 Revision of R2-1706760; Source: MediaTek Inc.; Title:Cell Selection and Reselection in NR; Agenda Item:10.4.2.2.
R2-1708315; 3GPP TSG-RAN WG2 NR RAN2#99; Berlin, Germany, Aug. 21-25, 2017(revision of R2-1707447); Source: HTC, Mediatek; Title:Discussion on cell (re)selection while the beam number is less than N; Agenda Item:10.4.2.2.
R2-1708476; 3GPP TSG-RAN WG2 #99; Berlin, Germany, Aug. 21-25, 2017; Source:Nokia, Alcatel-Lucent Shanghai Bell; Title: Implementing Reselections in NR—cell selection and reselection; Agenda item:10.4.2.2.
R2-1708816; 3GPP TSG-RAN WG2 Meeting #99; Berlin, Germany, Aug. 21-25, 2017(Resubmitted R2-1707055); Source: Intel Corporation; Title:Further considerations for cell (re)selection; Agenda item:10.4.2.2.
R2-1708858; 3GPP TSG-RAN WG2# 99; Berlin, Germany, Aug. 21-25, 2017; Source: China telecom; Title:Service based Inter-RAT cell reselection; Agenda Item:10.4.2.2.
R2-1708983 A cell-specific parameter for cell reselection; 3GPP TSG RAN WG2 Meeting #99; Berlin, Germany Aug. 21-25, 2017; Source:CMCC; Title:A cell-specific parameter for cell reselection; Agenda item:10.4.2.2.
R2-1709298; 3GPP TSG-RAN WG2 #99 on NRTdoc; Berlin, Germany, Aug. 21-25, 2017 (Revision of R2-1707278); Source: Ericsson; Title:Cell selection and re-selection criteria and measurement configuration; Agenda Item:10.4.2.2.
R2-1709594NR; 3GPP TSG-RAN WG2 2017 RAN2#99 Meeting; Berlin, Germany, Aug. 21-25, 2017 (Resubmission of R2-1707313); Source:Samsung; Title:NR IDLE mode Cell Selection/Reselection; Agenda item:10.4.2.2.
R2-1709634; 3GPP TSG-RAN2 Meeting #99; Berlin, Germany, Aug. 21-25, 2017; Source: Qualcomm Incorporated; Title: Cell selection and reselection for NR; Agenda item:10.4.2.2.
R2-1710120; 3GPP TSG-RAN WG2 #99bis; Prague, Czech Republic, Oct. 9-13, 2017; Source:Samsung; Title:RAN paging area for NR; Agenda item:10.4.1.7.1.
R2-1713058; 3GPP TSG-RAN WG2 #100; Reno, Nevada, USA, Nov. 27-Dec. 1, 2017; Source:Ericsson; Title:Evaluation for early data transmissions; Agenda Item:9.14.2.
R2-1713785 9.13.2; 3GPP TSG-RAN2 Meeting RAN2 #100; Reno, USA, Nov. 27-Dec. 1, 2017Revision of R2-1711402; Source:LG Electronics Inc.; Title:Early Data Transmission Failure Handling in NB-IoT; Agenda Item: 9.13.2.
R2-1805015; 3GPP TSG RAN WG2 Meeting#101bis; Sanya, China, Apr. 16-20, 2018; Source:Intel Corporation; Title: Open issues related to connection resume procedure; Agenda item:10.4.1.3.6.

(56) References Cited

OTHER PUBLICATIONS

R2-1805078; 3GPP TSG-RAN WG2 Meeting#101bis; Sanya, China, Apr. 16-20, 2018; Source:Huawei; Title:Report of the Email discussion [101#57][NB-IoT/MTC R15] EDT remaining issues; Agenda Item: 9.14.2.
R2-1805270; 3GPP TSG-RAN WG2 Meeting #101bis; Sanya, China, Apr. 16-20, 2018; (Early data transmission); Source: LG Electronics Inc.; Agenda Item: 9.14.2.
R2-1807356; 3GPP TSG RAN WG2 Meeting#102; Busan, Korea, May 21-25, 2018 ; Source:Intel Corporation; Title:Clarification on cell reselection during resume procedure; Agenda item:10.4.1.3.6.
R2-1807910; 3GPP TSG-RAN WG2 #102Tdoc R2-180xxxx; Busan, Korea, May 21-25, 2018; CR-Form-v11.2; Title: Connection control TP; Change Request: 38.331CR CRNum rev—current version: 15.1.0.
R2-1906054; 3GPP TSG-RAN WG2 Meeting #106; Reno, USA, May 13-17, 2019 Revision of R2-1904687; Source:Qualcomm Incorporated, Huawei, HiSilicon; Title:Access Stratum Release Assistance Indicator for eMTC; Agenda item:12.2.10.1.
R2-1913118; 3GPP TSG-RAN WG2 #107bisTdoc; Chongqing, China, Oct. 14-18, 2019; Source:Ericsson; Title:Remaining issues for UP solution and 5GC; Agenda Item:7.1.12.1.
R2-1913757; 3GPP TSG-RAN WG2 #107bisR2-1913757; Chongqing, China, Oct. 14-18, 2019Revision of R2-1910897; Source:Ericsson; Title:RRC release after EDT for User Plane CloT EPS optimization; Agenda Item:7.1.13.
R2-1914356_S2-1910804; 3GPP TSG RAN WG2#108; Reno, USA, Nov. 18-22, 2019; SA WG2 Meeting #S2-135S2-1910804; Oct. 14-18, 2019, Split Croatia(e-mail revision 6 of S2-1910631).
R2-1915309 MT-EDT; 3GPP TSG-RAN WG2 Meeting #108; Reno, Nevada, USA, Nov. 18-22, 2019; Source: Huawei, HiSilicon; Title:Discussion on remaining aspects of MT-EDT; Agenda Item:7.1.2.
R2-1915393; 3GPP TSG-RAN WG2 Meeting #108; Reno, Nevada, USA, Nov. 18-22, 2019; CR-Form-v12.0.
R2-1915531; 3GPP TSG-RAN WG2 Meeting #108; Reno, USA, Nov. 18-22, 2019; Source:Huawei, HiSilicon; Title:Remaining issues of DL quality report; Agenda Item: 7.1.6.
R2-1915609; 3GPP TSG-WG2 Meeting #108; Reno, USA, Nov. 18-22, 2019; CR-Form-v12.0; Source to WG: Qualcomm Incorporated; Source to TSG: R2; Title: Introduction of additional enhancements for eMTC; Change Request 38.300 CR 175 rev. 1 current version: 15.7.0.
R2-1915717 eMTC-36.331-runningCR-RAN2#108; 3GPP TSG-RAN2 Meeting #18; Reno, Nevada, Nov. 18-22, 2019; CR-Form-v12.0; Source to WG: Qualcomm Incorporated; Source to TSG: R2; Title: Introduction of Rel-16 eMTC enhancements.
R2-1915718; 3GPP TSG-RAN WG2 Meeting #108; Reno, Nevada, USA Nov. 18-22, 2019; Source: Qualcomm Incorporated; Title: Discussion on reply LS from SA2 on MT-EDT; Agenda item:7.1.1.
R2-1915719; 3GPP TSG-RAN2 Meeting #108; Reno, Nevada, Nov. 18-22, 2019; Title:[Draft] Reply LS on Mobile-terminated Early Data Transmission; Reply to: Reply LS on Mobile-terminated Early Data Transmission (S2-19108041); Source: Qualcomm [to be RAN2]; Release 16.
R2-1915720; 3GPP TSG-RAN WG2 Meeting #108; Reno, Nevada, USA Nov. 18-22, 2019; Agenda item :7.1.2, 7.2.2; Source: Qualcomm Incorporated; Title: MT-EDT related Editor's Notes and FFSes in RRC running CR; Document for: Discussion/Decision.
R2-1915772 ; 3GPP TSG-RAN WG2 #108R2-1915772 Reno, NV, USA, Nov. 18-22, 2019; Revision of R2-1913757; Agenda Item: 7.2.10; Source: Ericsson; Title: RRC release assistance for Control and User Plane CloT EPS optimizations; Document for: Discussion, Decision.
R2-1915947; 3GPP TSG-RAN WG2 Meeting #107bis; Reno, USA, Nov. 18-Nov. 22, 2019; Agenda Item: 7.1.2, 7.2.2 (MT EDT); Source: LG Electronics Inc.; Title: Discussion on MT EDT support for 5G CloT; Document for: Discussion and Decision.
R2-1916357; 3GPP TSG-RAN2 Meeting #108; Reno, Nevada, Nov. 18-22, 2019; Title: [Draft] Reply LS on Mobile-terminated Early Data Transmission; Reply to: Reply LS on Mobile-terminated Early Data Transmission (S2-19108041); Release: Release 16; Work Item: LTE_eMTC5-Core, NB_IOTenh3-Core, 5G_CloT.
R2-1916361; 3GPP TSG-TSG-WG2 Meeting #108; Reno, USA, Nov. 18-22, 2019; Title: Introduction of Rel-16 eMTC enhancements.
R3-193415; 3GPP TSG-RAN WG3 Meeting #105; Ljubljana, Slovenia, Aug. 26-30, 2019; Title: Consideration on RLF for NB-IoT; Source: Huawei; Agenda item: 14.4; Document for: Discussion.
RP-193252; 3GPP TSG RAN Meeting #86; Sitges, Spain, Dec. 9-12, 2019; Source: ZTE Corporation Title: Work Item on NR smalldata transmissions in Inactive state; Document for: Approval; Agenda Item: 9.1.2.

* cited by examiner

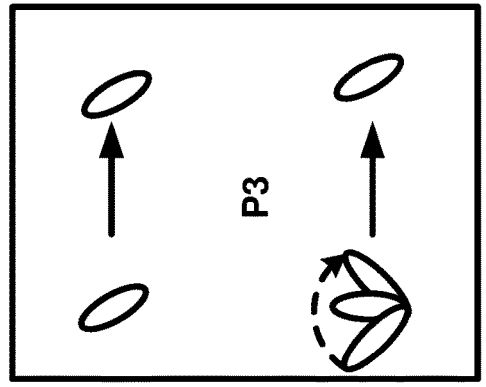
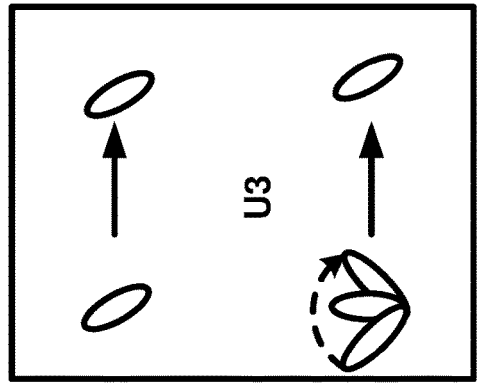
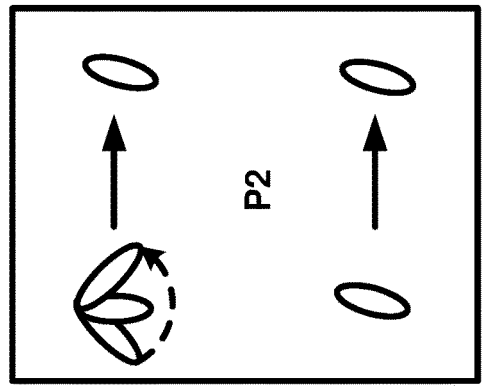
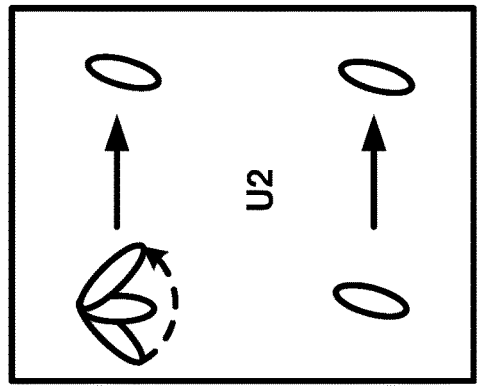
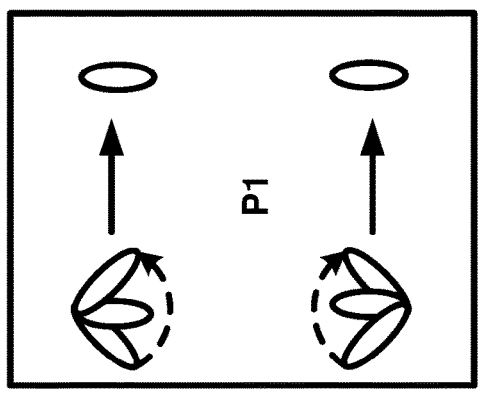
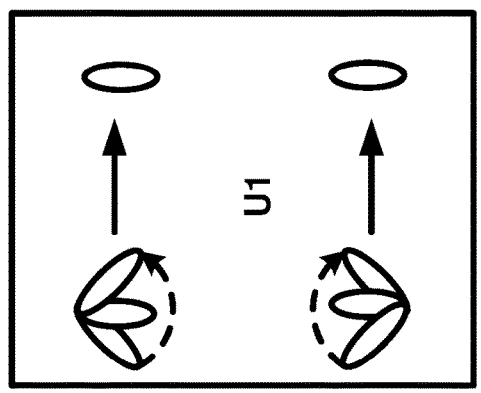
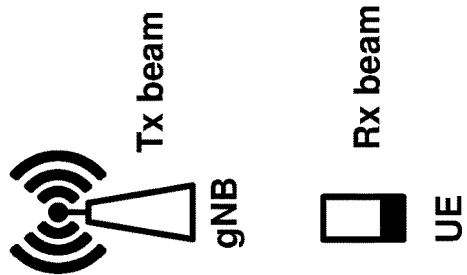
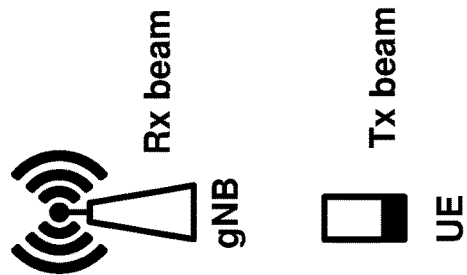
FIG. 12A
FIG. 12B

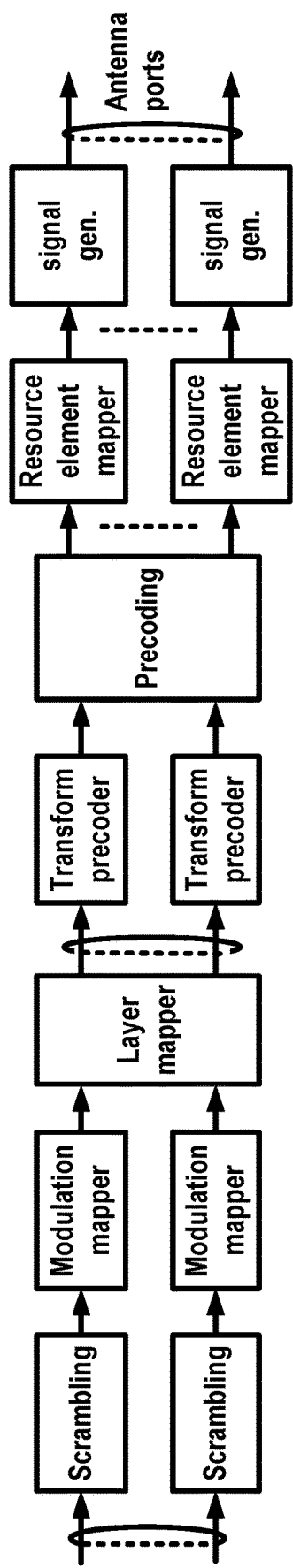
FIG. 16A
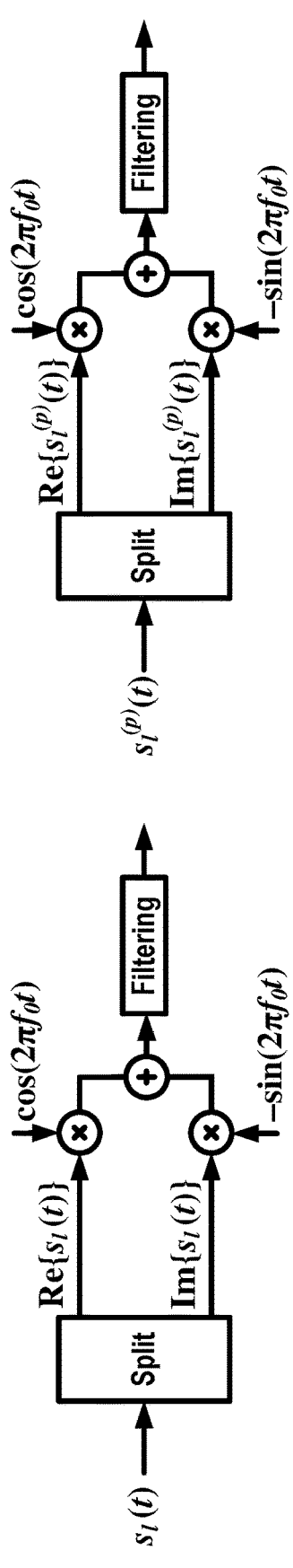
FIG. 16B
FIG. 16D
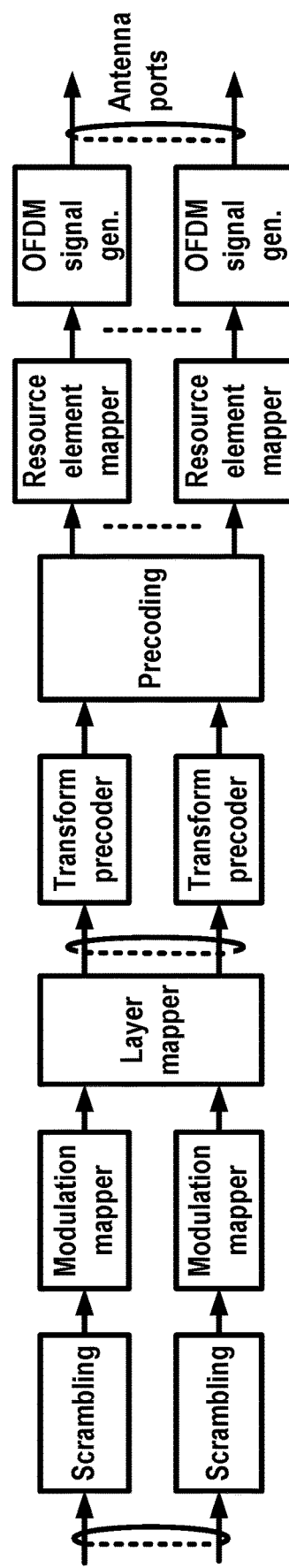
FIG. 16C

ID
CELL RESELECTION DURING ONGOING SDT PROCEDURE

CROSS-REFERENCE TO RELATED APPLICATIONS

This application is a continuation of U.S. patent application Ser. No. 17/219,178, filed Mar. 31, 2021, which claims the benefit of U.S. Provisional Application No. 63/002,419, filed Mar. 31, 2020, all of which are hereby incorporated by reference in their entireties.

BRIEF DESCRIPTION OF THE DRAWINGS

Examples of several of the various embodiments of the present disclosure are described herein with reference to the drawings.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

DETAILED DESCRIPTION

Figure 1A:
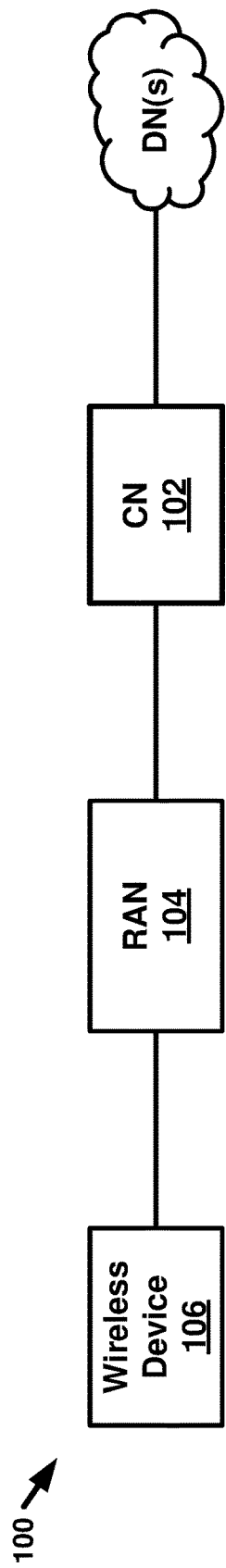
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
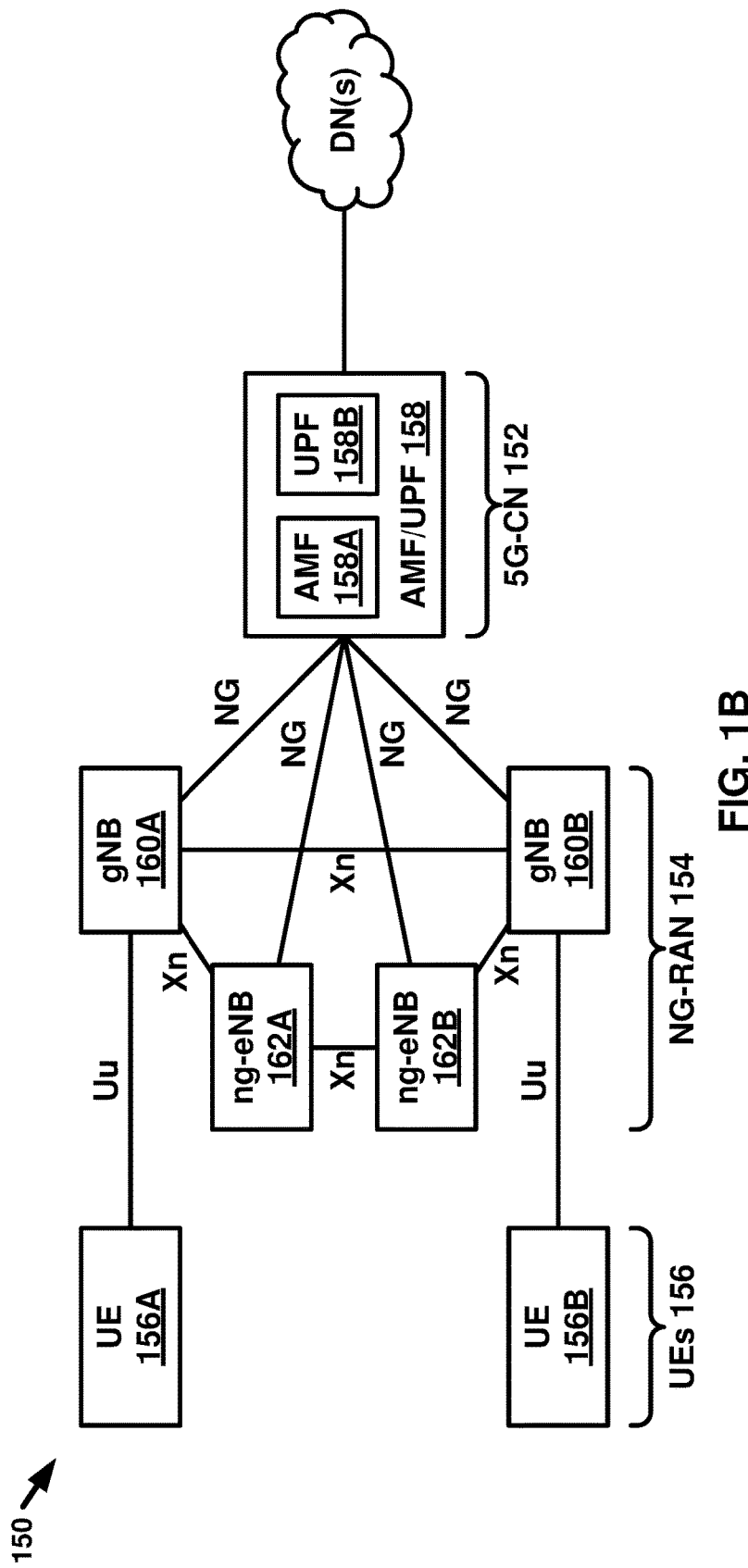

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNB s, illustrated as gNB 160A and gNB 160B (collectively gNBs 160) and/or one or more ng-eNB s, illustrated as ng-eNB 162A and ng-eNB 162B (collectively ng-eNB s 162). The gNBs 160 and ng-eNBs 162 may be more generically referred to as base stations. The gNBs 160 and ng-eNB s 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNB s 160 and/or the ng-eNB s 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
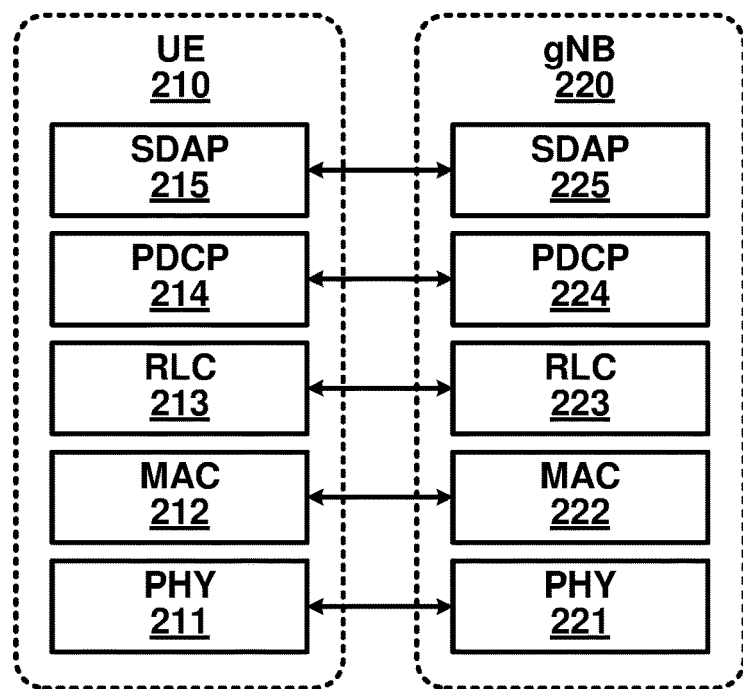
FIG. 2A and FIG. 2B respectively illustrate a New Radio (NR) user plane and control plane protocol stack.
Figure 2B:
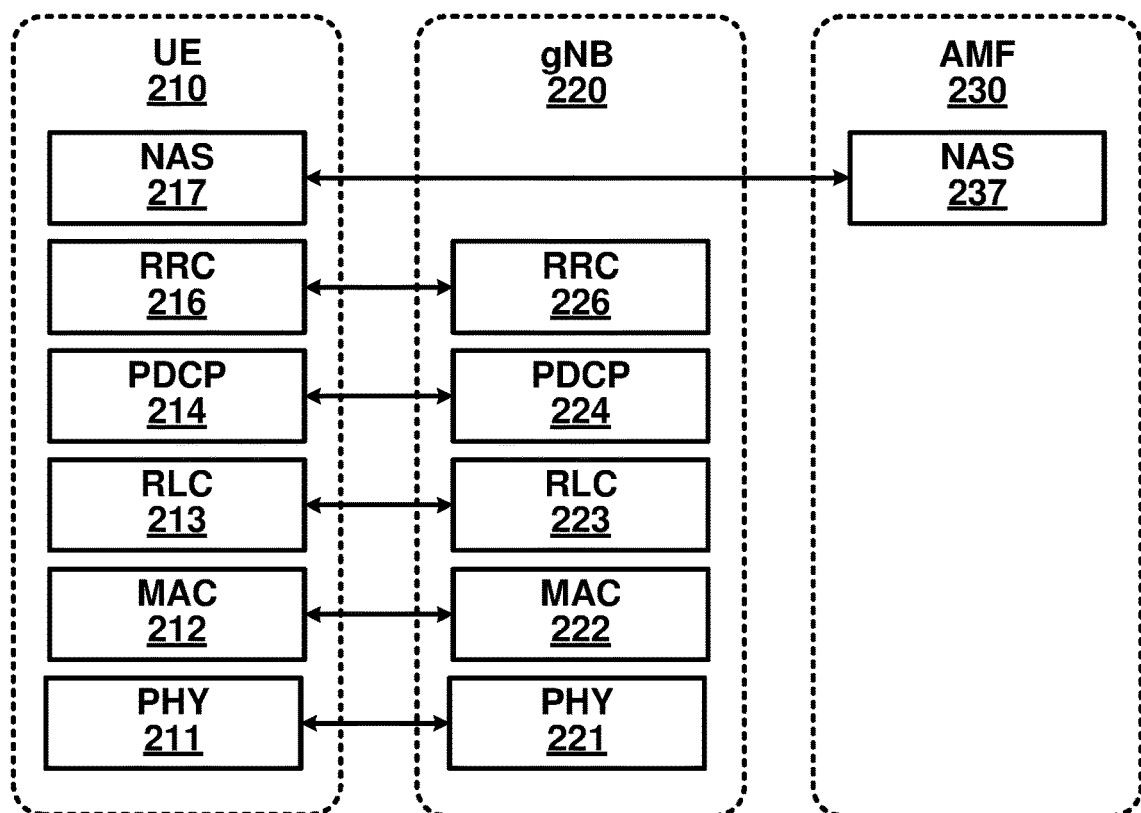

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
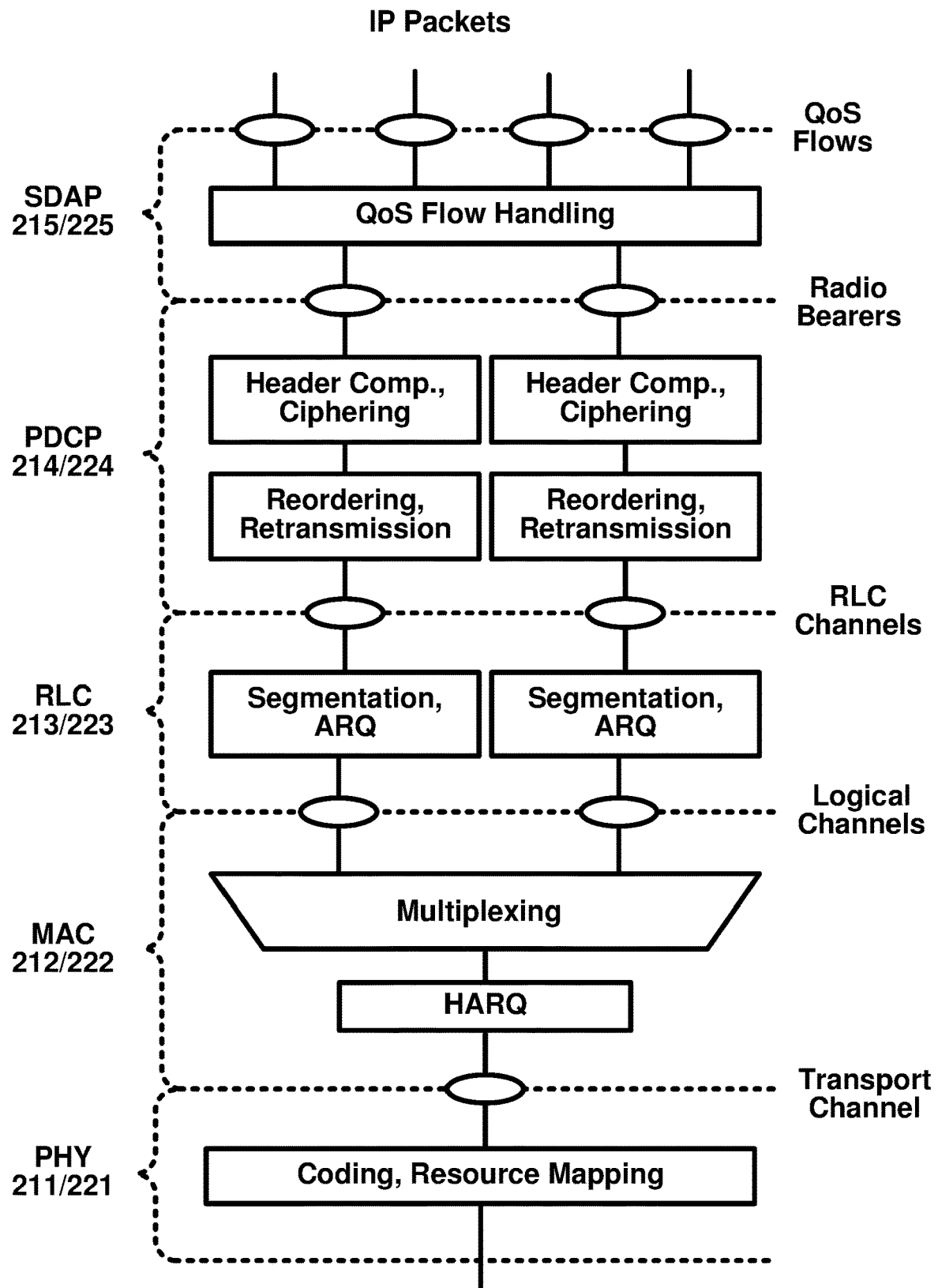
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
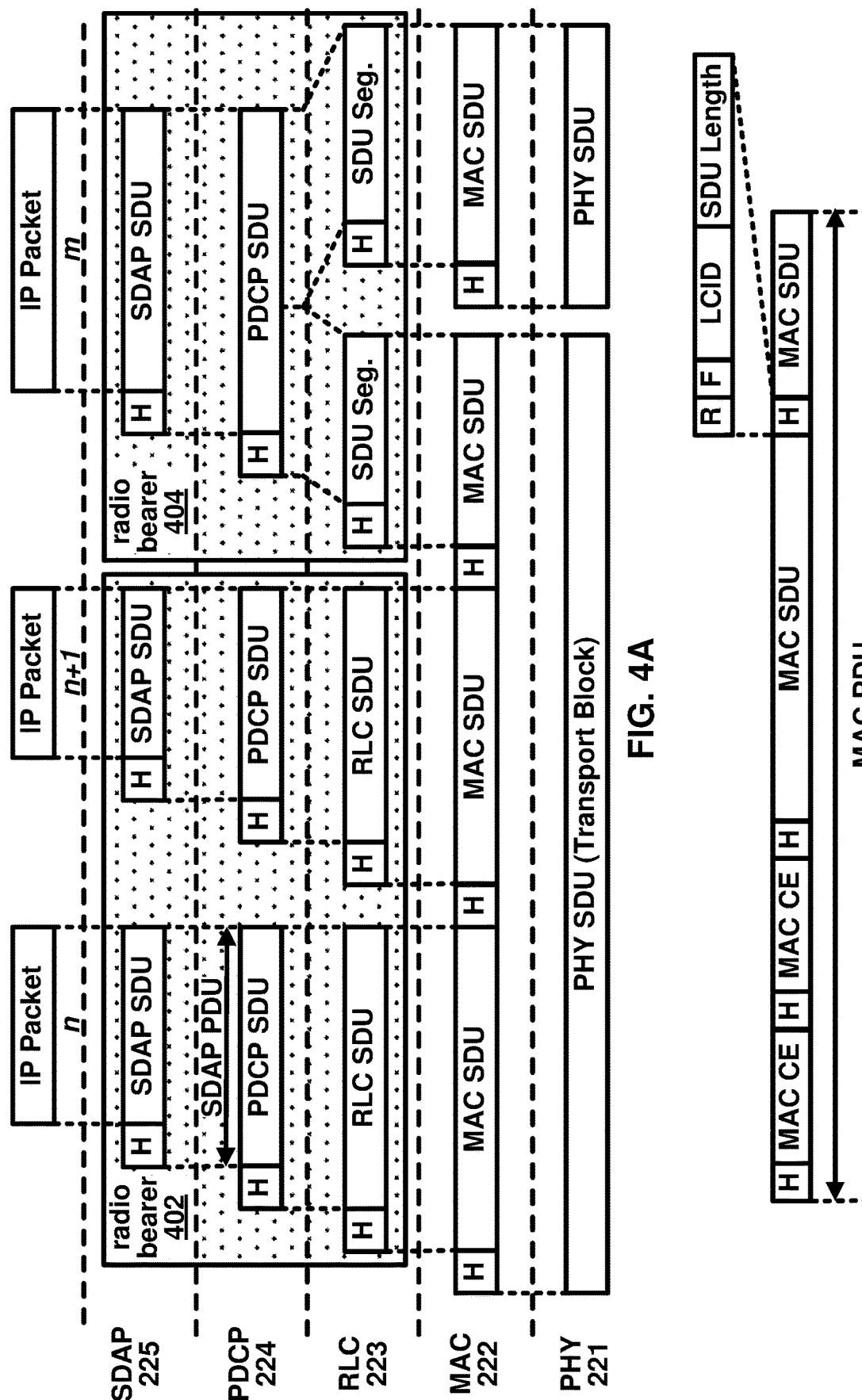
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TB s at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG.

4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
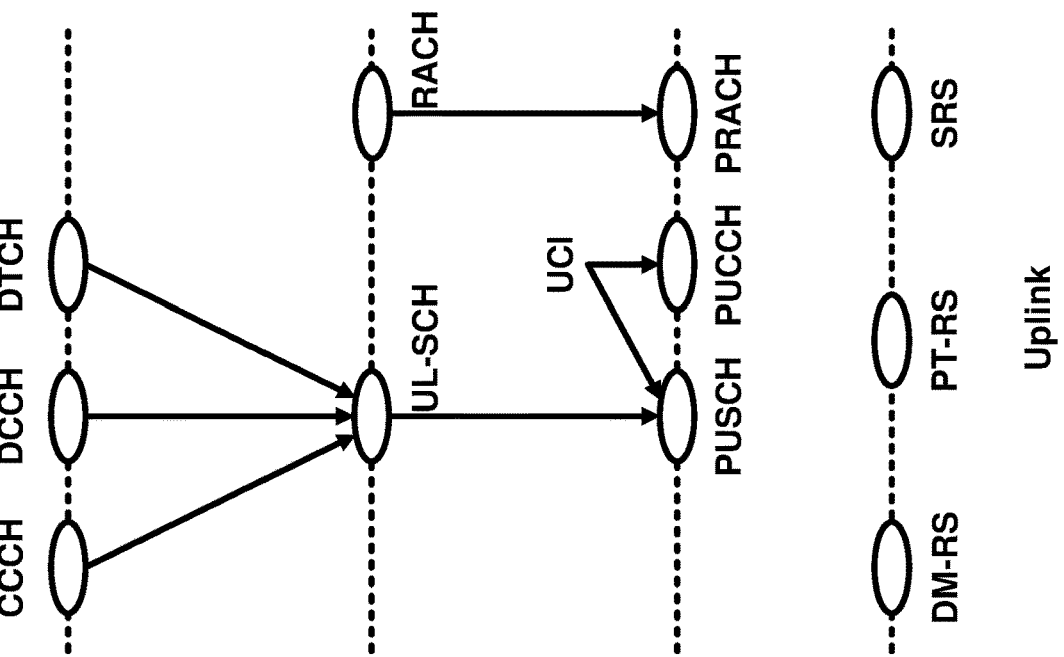
FIG. 5A and FIG. 5B respectively illustrate a mapping between logical channels, transport channels, and physical channels for the downlink and uplink.
Figure 5A:
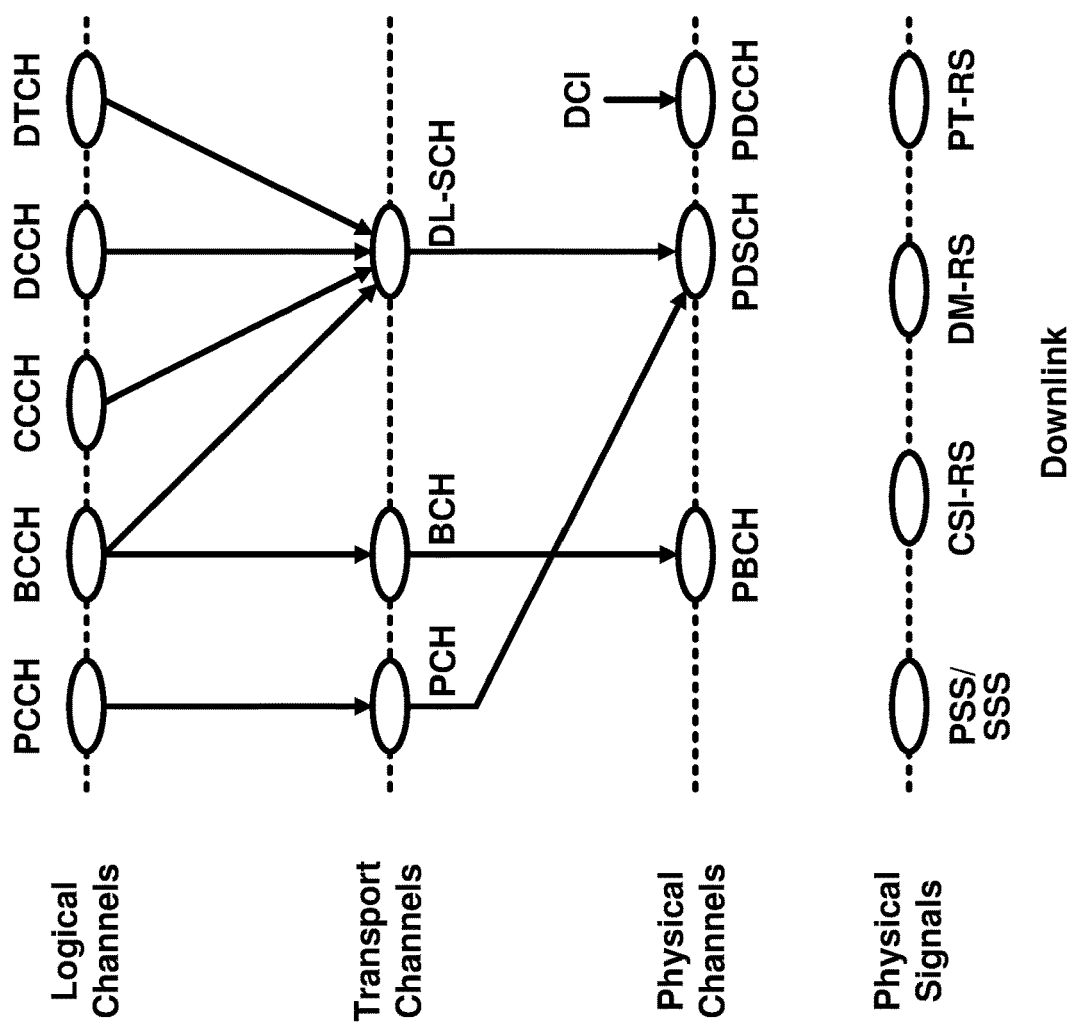

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
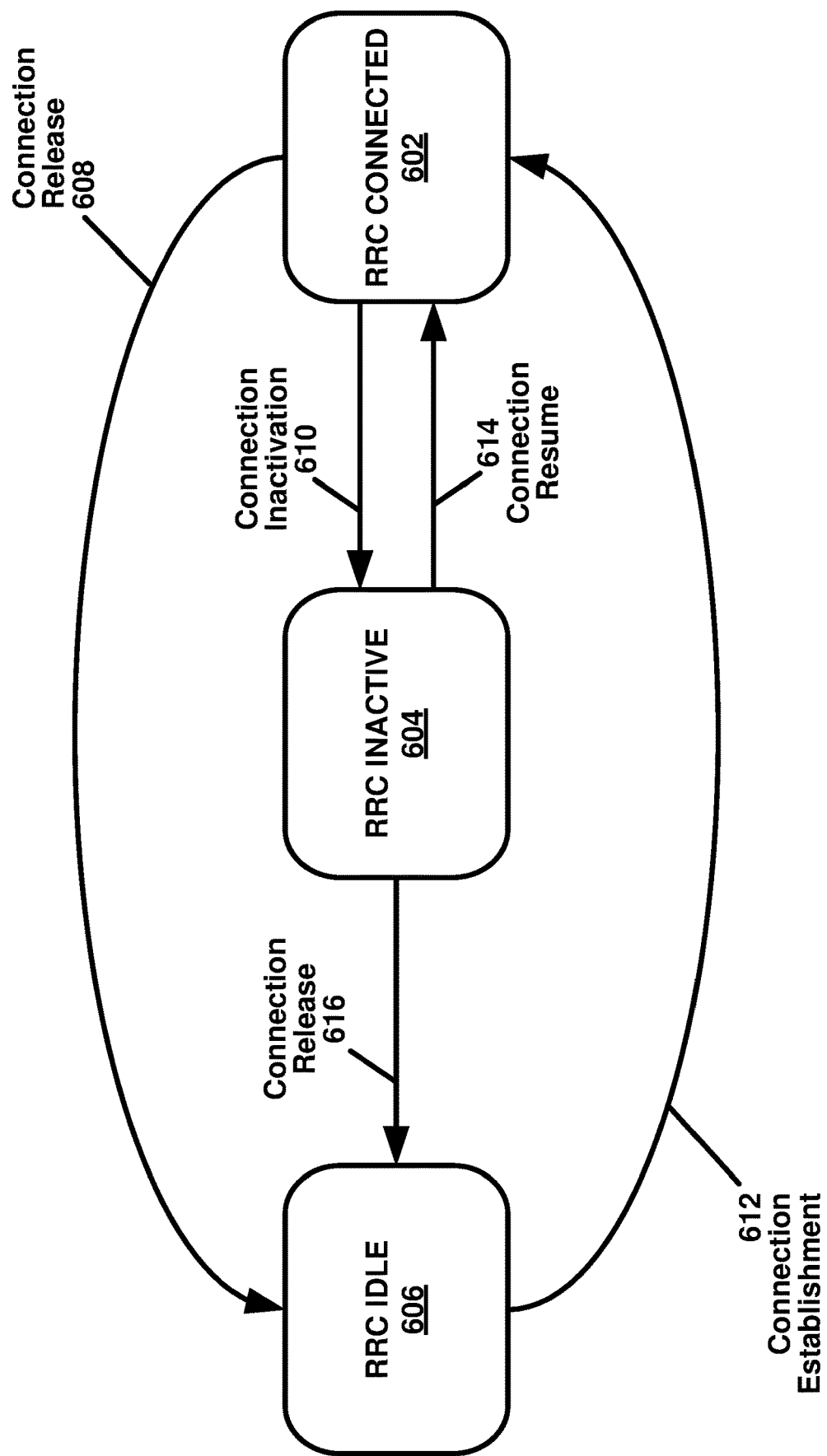
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
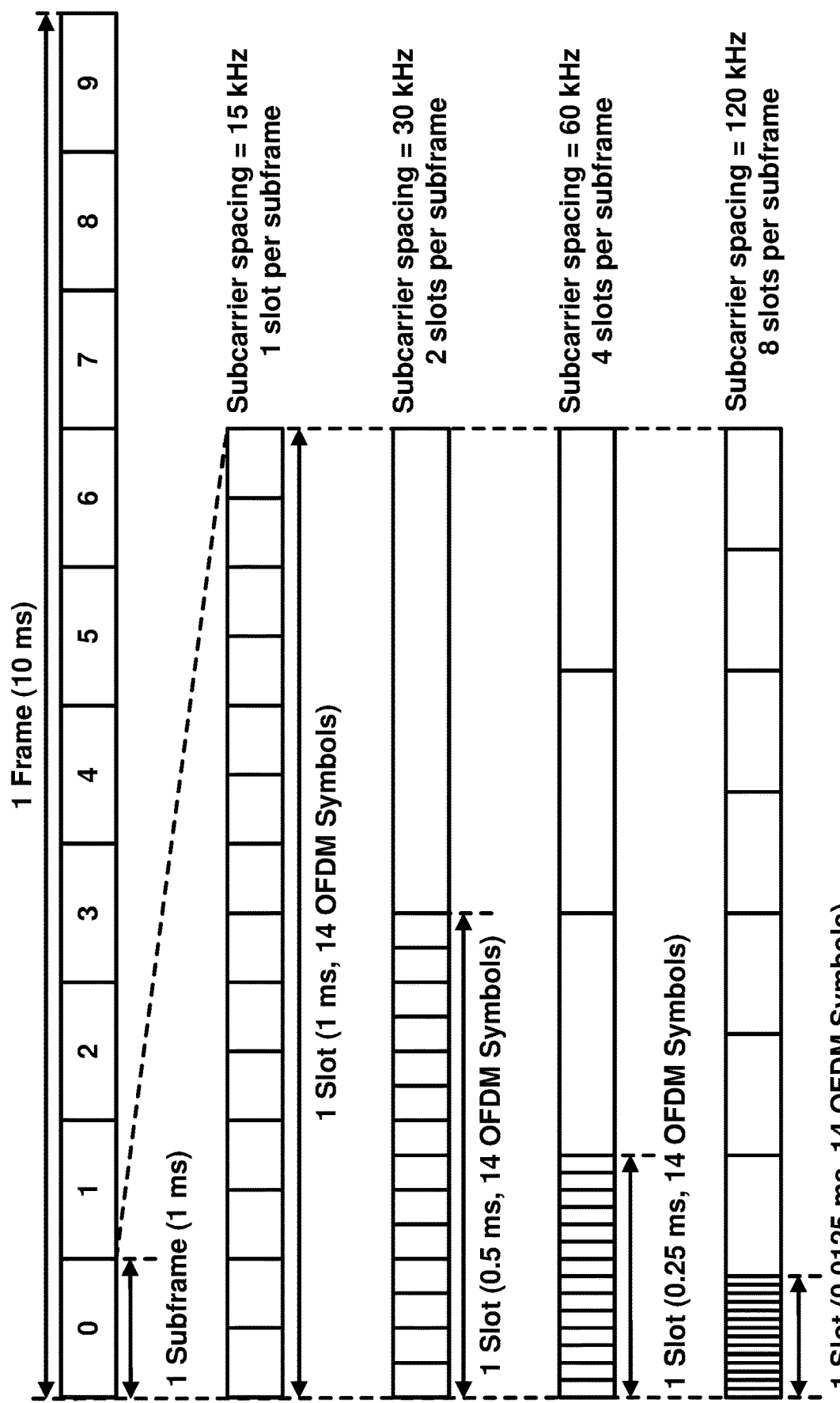
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
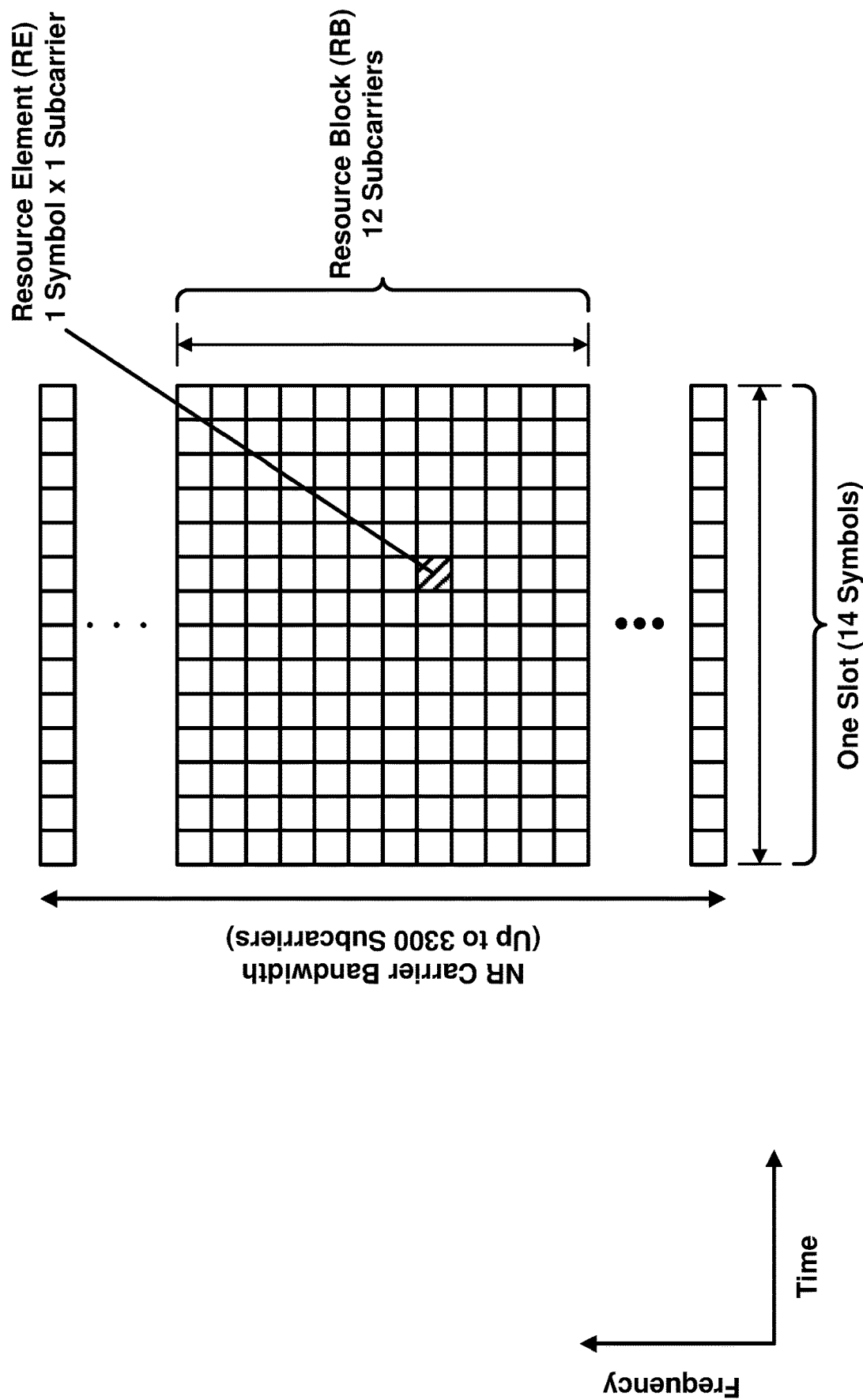
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
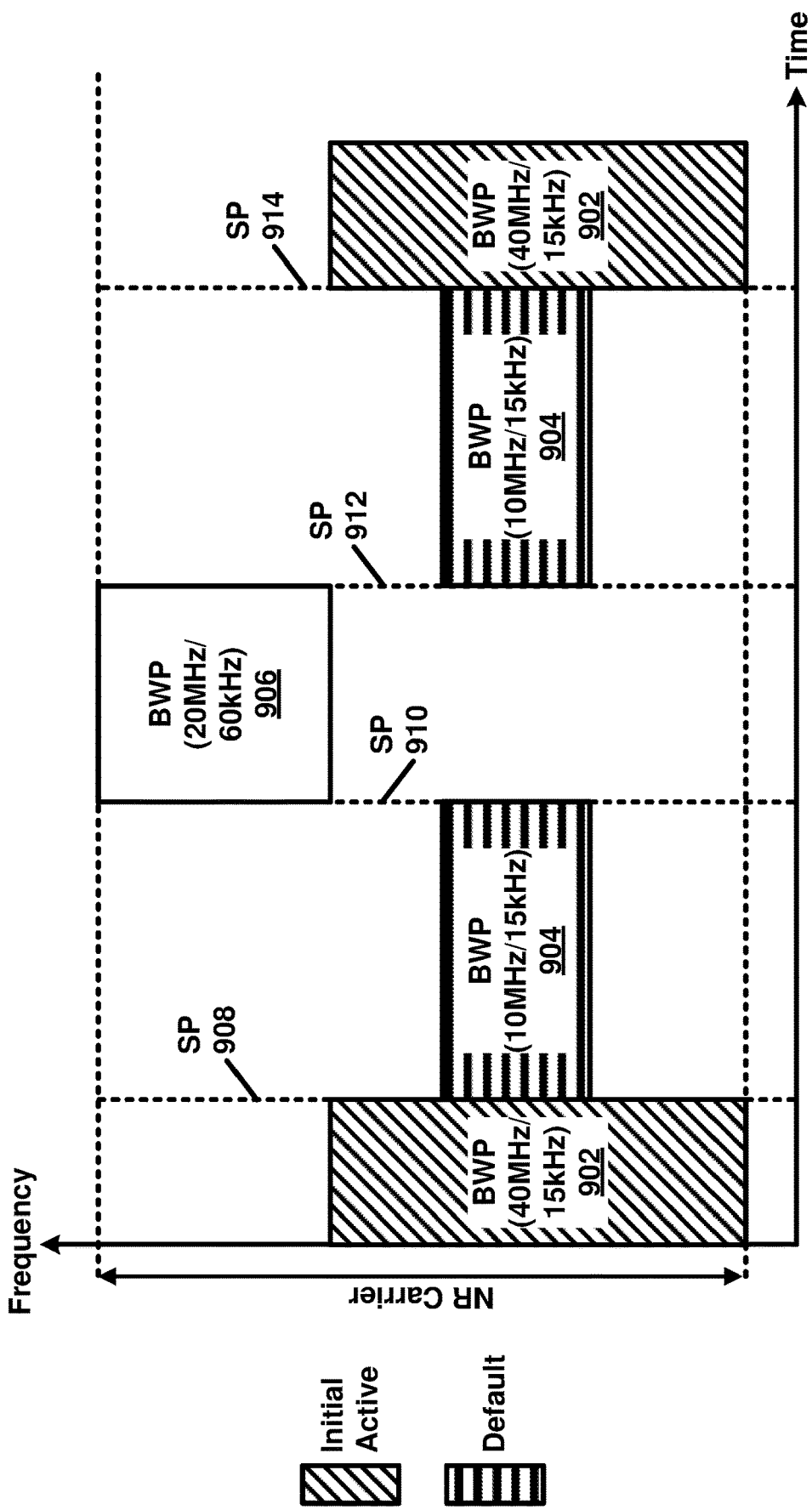
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
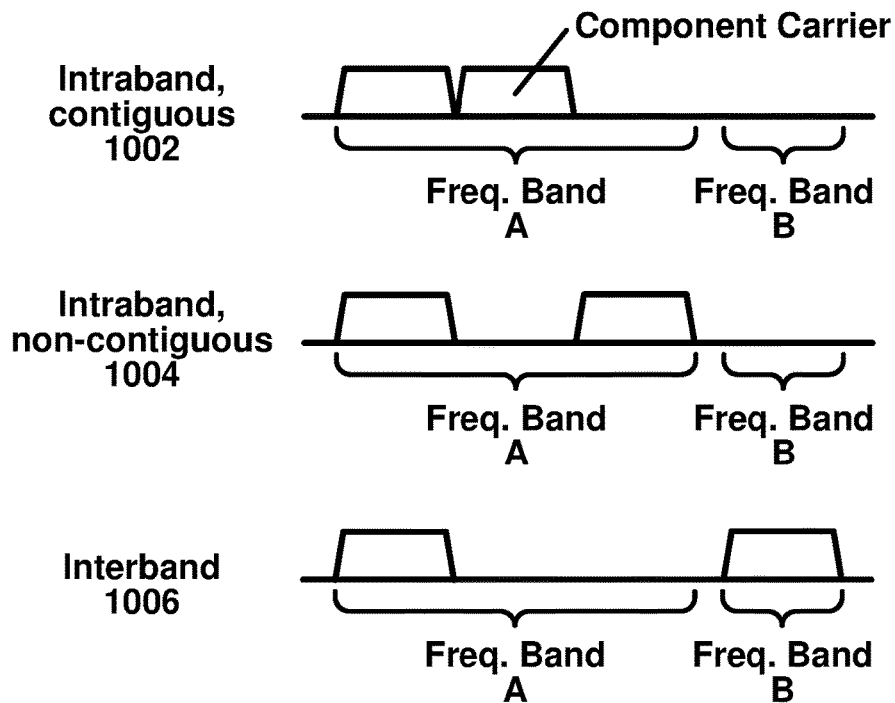
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
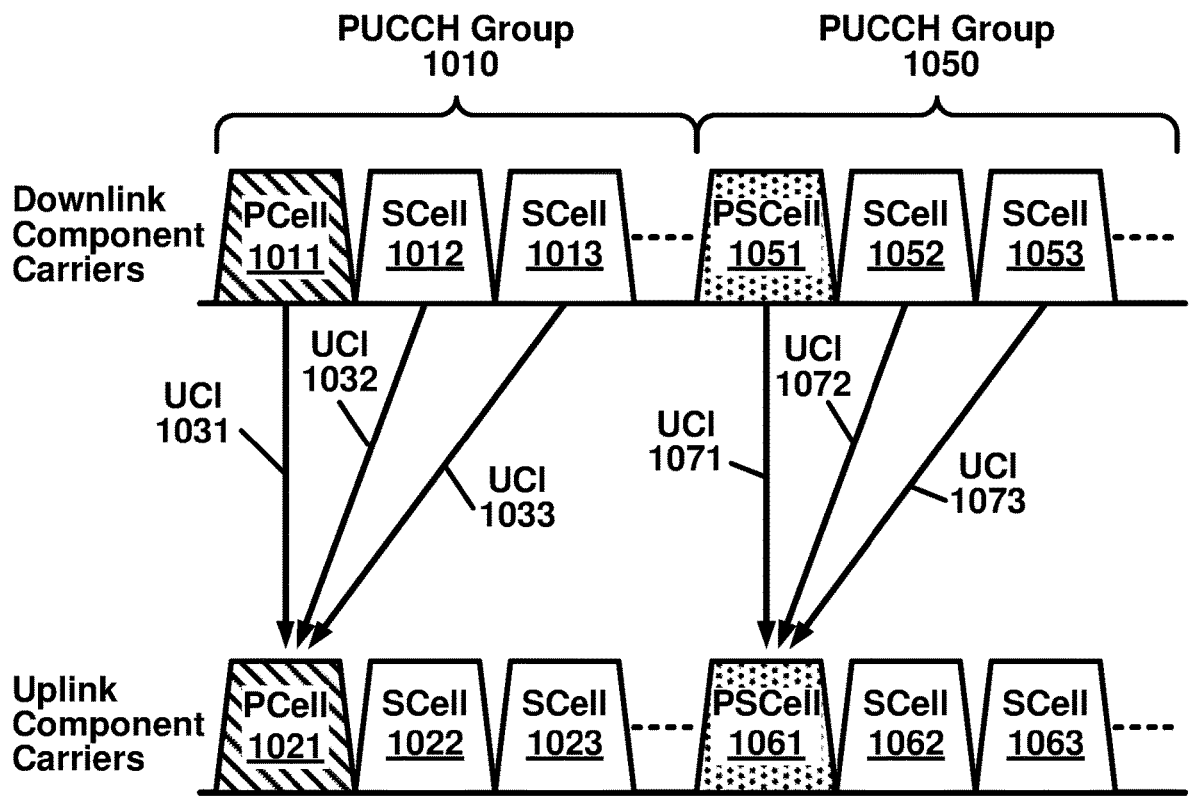
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
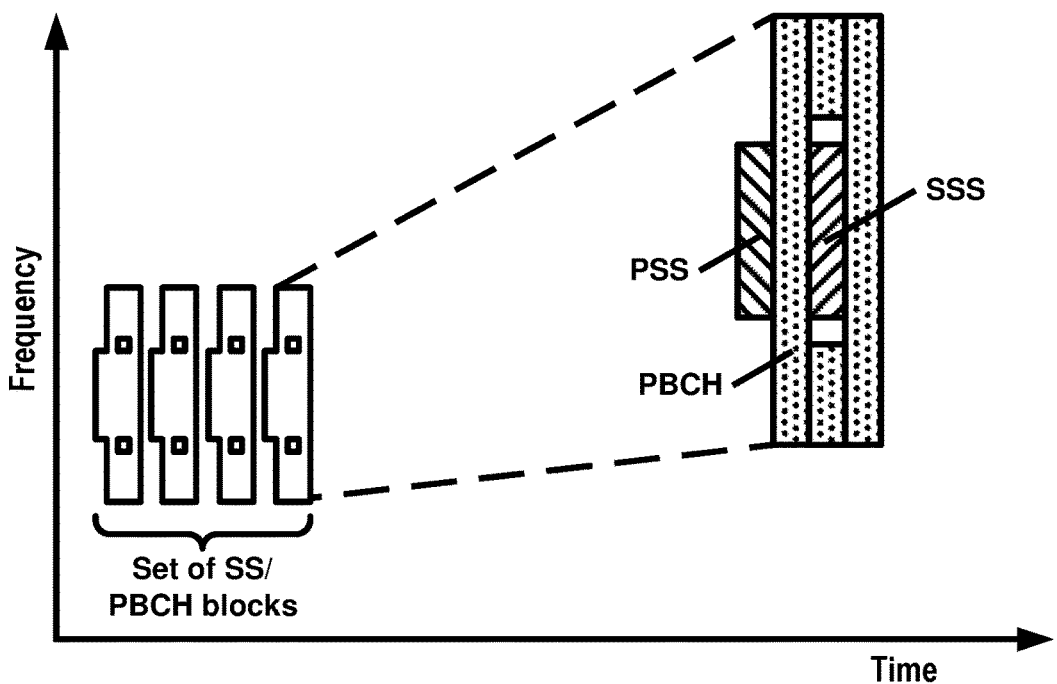
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
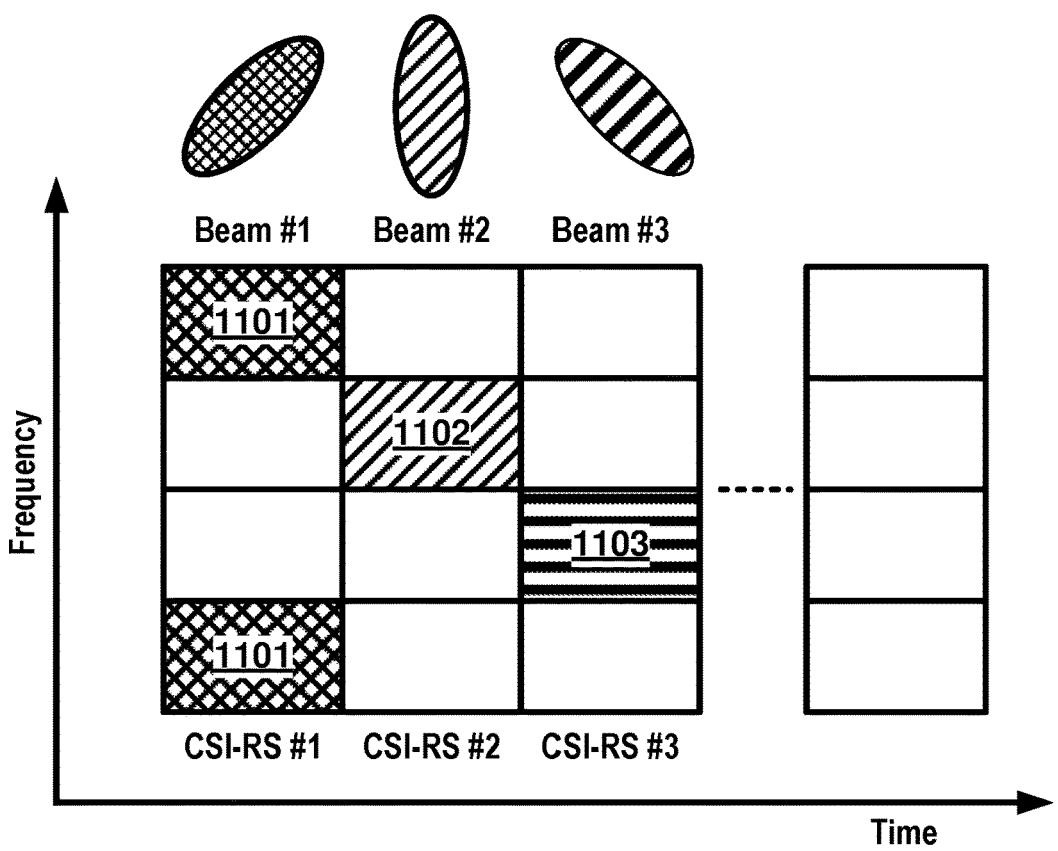
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
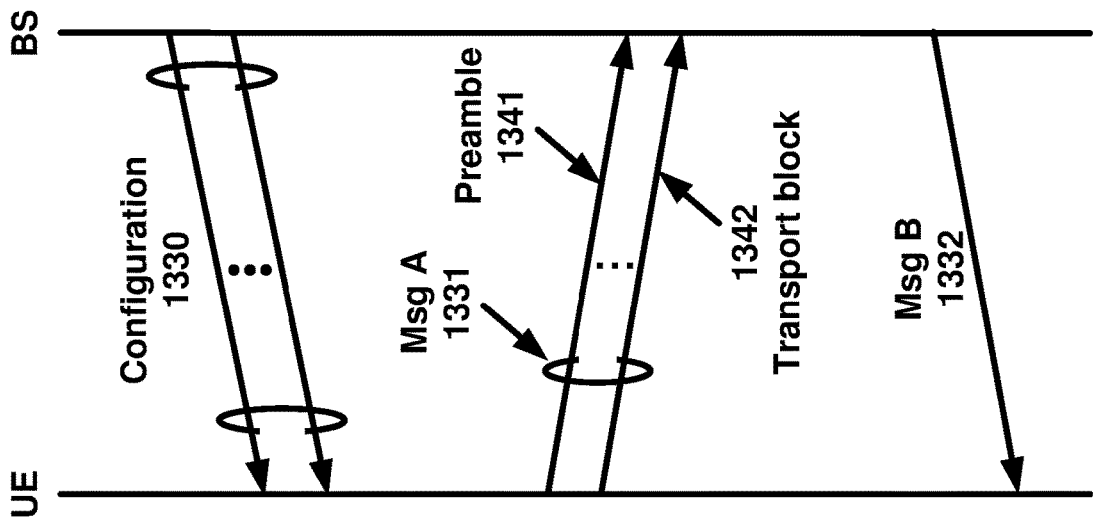
FIG. 13A, FIG. 13B, and FIG. 13C respectively illustrate a four-step contention-based random access procedure, a two-step contention-free random access procedure, and another two-step random access procedure.
Figure 13B:
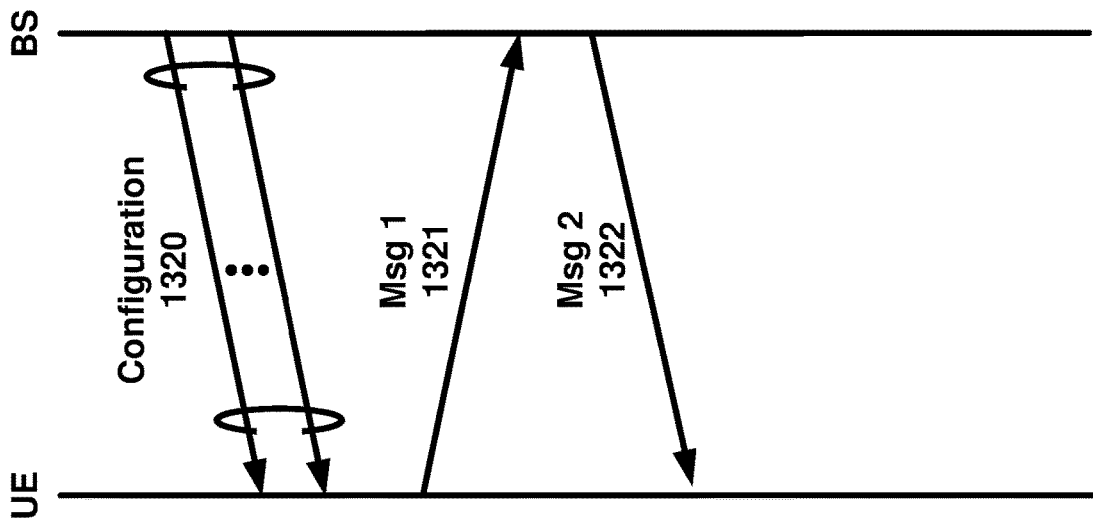
Figure 13A:
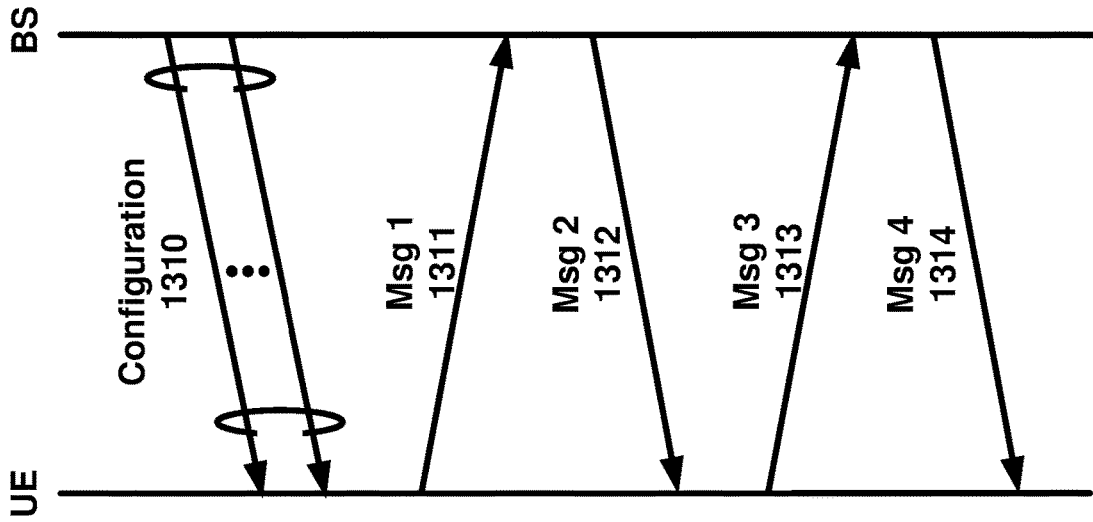

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI} = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE;

and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
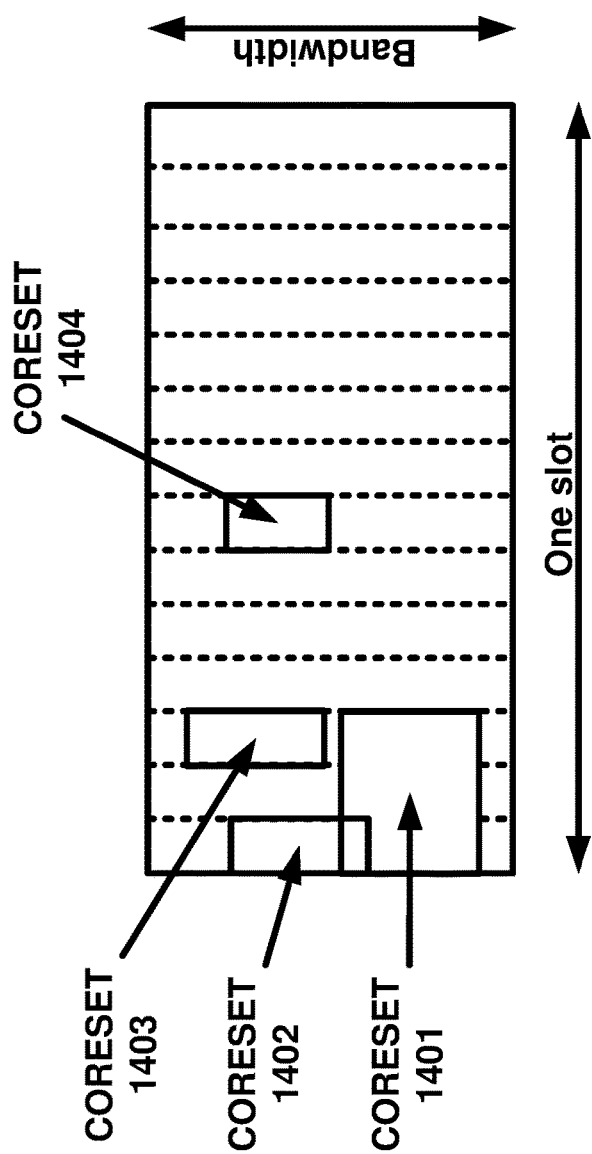
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
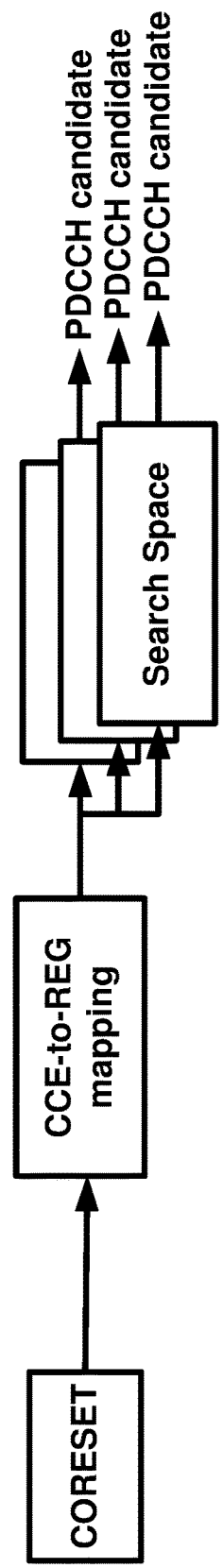
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
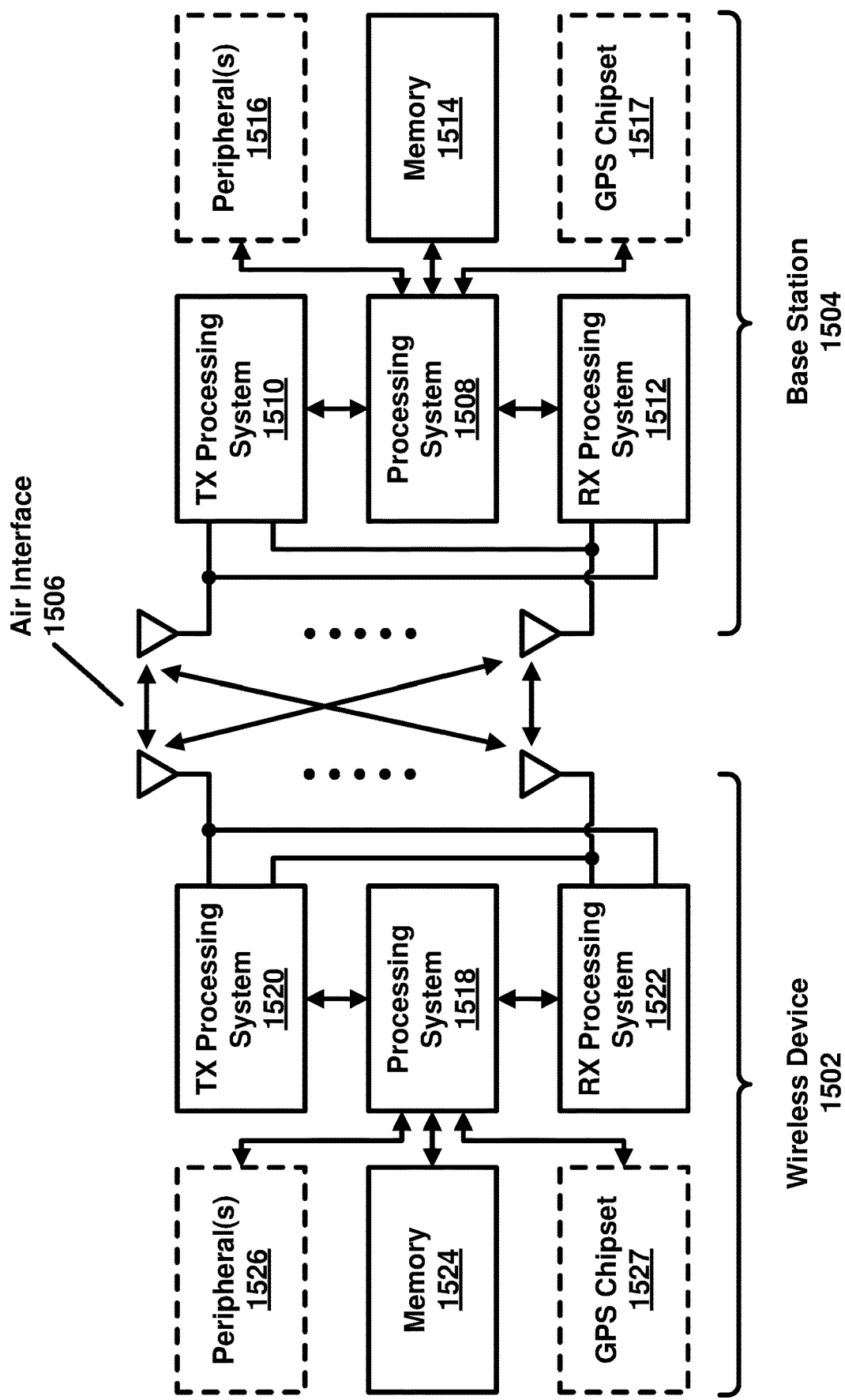
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of:

scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A UE-RRC layer may initiate an RRC connection establishment procedure, an RRC connection resume procedure, or an RRC connection re-establishment procedure. Based on initiating the RRC connection establishment procedure or the RRC connection resume procedure, the UE may perform one or more procedures:

performing a unified access control procedure for access attempt on a serving cell;

applying default configurations parameters and configurations/parameters provided by SIB1, for example, based on the access attempt being allowed, applying default configurations and configurations/parameters provided by SIB1;

starting a timer to supervise those RRC procedures;

performing sending a random access preamble to the serving cell, for example, based on the access attempt being allowed;

sending an RRC request message to the serving cell, for example, based on determining a reception of a random access response being successful, sending an RRC request message to the serving cell;

receiving an RRC response message or an RRC reject message from the serving cell; or sending an RRC complete message, for example, based on receiving the RRC response message, sending an RRC complete message.

For the RRC connection re-establishment procedure, the UE may not perform the unified access procedure.

For initiating those RRC procedures, the UE-RRC layer may use parameters in a received SIB1. The UE-RRC layer may use L1 parameter values and a time alignment timer in the SIB1. The UE-RRC layer may use UAC barring information in the SIB1 to perform the unified access control procedure. Based on the unified access control procedure, the UE-RRC layer may determine whether the access attempt of those RRC procedures is barred or allowed. Based on the determining the access attempt is allowed, the UE-RRC layer may determine send an RRC request message to a base station where the RRC request message may be an RRC setup request message, an RRC resume request message, or an RRC re-establishment procedure. The UE-NAS layer may or may not provide S-TMSI as an UE identity. The UE-RRC layer may set an UE identity in the RRC request message.

For the RRC setup request message, the UE-RRC layer may set the UE identity to S-TMSI if the UE-NAS layer provides the S-TMSI. Otherwise, the UE-RRC layer may draw a 39-bit random value and set the UE identity to the random value. For the RRC resume request message, the UE-RRC layer may set the UE identity to resume identity stored. For the RRC reestablishment request message, the UE-RRC layer may set the UE identity to C-RNTI used in the source PCell. The UE-NAS layer may provide an establishment cause (e.g., UE-NAS layer). The UE-RRC layer may set the establishment cause for the RRC request message.

For the RRC resume request message, the UE-RRC layer may restore parameters and security keys/parameters from the stored UE inactive AS context. Based on the security keys/parameters, the UE-RRC layer may set a resume MAC-I value to the 16 least significant bits of the MAC-I calculated based on variable resume MAC input, security key of integrity protection for RRC layer in a UE inactive AS context, the previous configured integrity protection algorithm, and other security parameters (e.g., count, bearer and direction). The variable resume MAC input may comprise physical cell identity and C-RNTI of a source cell, and cell identity of a target cell. The UE-RRC layer may include the resume MAC-I in the RRC resume request message. Based on the security keys/parameters, the UE-RRC layer derive new security keys for integrity protection and ciphering, and configure lower layers (e.g. MAC layer) to apply them. The UE-RRC layer may re-establish PDCP entities for SRB1 and resume SRB1.

For the RRC reestablishment request message, the UE-RRC layer may contain the physical cell identity of the source PCell and a short MAC-I in the RRC reestablishment message. The UE-RRC layer may set the short MAC-I to the 16 east significant bits of the MAC-I calculated based on variable short MAC input, security key of integrity protection for RRC layer and the integrity protection algorithm, which was used in a source PCell or the PCell in which the trigger for the reestablishment occurred, and other security parameters (e.g., count, bearer and direction). The variable short MAC input may comprise physical cell identity and C-RNTI of a source cell, and cell identity of a target cell. The UE-RRC layer may re-establish PDCP entities and RLC entities for SRB1 and apply a default SRB1 configuration parameters for SRB1. The UE-RRC layer may configure lower layers (e.g. PDCP layer) to suspend integrity protection and ciphering for SRB1 and resume SRB1.

A UE-RRC layer may send an RRC request message to lower layers (e.g., PDCP layer, RLC layer, MAC layer and/or PHY layer) for transmission.

A UE-RRC layer may receive an RRC setup message in response to an RRC resume request message or an RRC reestablishment request message. Based on the RRC setup message, the UE-RRC layer may discard any stored AS context, suspend configuration parameters and any current AS security context. The UE-RRC layer may release radio resources for all established RBs except SRB0, including release of the RLC entities, of the associated PDCP entities and of SDAP. The UE-RRC layer may release the RRC configuration except for default L1 parameter values, default MAC cell group configuration and CCCH configuration. The UE-RRC layer may indicate to upper layers (e.g., NAS layer) fallback of the RRC connection. The UE-RRC layer may stop timer T380 if running where the timer T380 is periodic RNA update timer.

A UE-RRC layer may receive an RRC setup message in response to an RRC setup request message, an RRC resume request message or an RRC reestablishment request message. Based on configurations parameters in the received RRC setup message. Based on the RRC setup message, the UE-RRC layer may perform a cell group configuration or radio bearer configuration. The UE-RRC layer may stop a barring timer and wait timer for the cell sending the RRC setup message. Based on receiving the RRC setup message, the UE-RRC layer may perform one or more of the following:
    enter RRC connected state;
    stop a cell re-selection procedure;
    consider the current cell sending the RRC setup message to be the PCell; or/and
    send an RRC setup complete message by setting the content of the RRC setup complete message.

A UE-RRC layer may receive an RRC resume message in response to an RRC resume request message. Based on the RRC resume message, the UE-RRC layer may discard a UE inactive AS context and release a suspend configuration parameters except ran notification area information. Based on configuration parameters in the RRC resume message, the UE-RRC layer may perform a cell group configuration, a radio bearer configuration, security key update procedure, measurement configuration procedure. Based on receiving the RRC resume message, the UE-RRC layer may perform one or more of the following:
    indicate upper layers (e.g., NAS layer) that the suspended RRC connection has been resumed;
    resume SRB2, all DRBs and measurements;
    enter RRC connected state;
    stop a cell re-selection procedure;
    consider the current cell sending the RRC resume message to be the PCell; or/and
    send an RRC resume complete message by setting the content of the RRC resume complete message.

A UE-RRC layer may receive an RRC reject message in response to an RRC setup request message or an RRC resume request message. The RRC reject message may contain wait timer. Based on the wait timer, the UE-RRC layer may start timer T302, with the timer value set to the wait timer. Based on the RRC reject message, the UE-RRC layer may inform upper layers (e.g., UE-NAS layer) about the failure to setup an RRC connection or resume an RRC connection. The UE-RRC layer may reset MAC and release the default MAC Cell Group configuration. Based on the RRC Reject received in response to a request from upper layers, the UE-RRC layer may inform the upper layer (e.g., NAS layer) that access barring is applicable for all access categories except categories '0' and '2'.

A UE-RRC layer may receive an RRC reject message in response to an RRC resume request message. Based on the RRC reject message, The UE-RRC layer may discard current security keys. The UE-RRC layer may suspend SRB1. The UE-RRC layer may set pending rna update value to true if resume is triggered due to an RNA update.

A UE-RRC layer may perform a cell (re)selection procedure while performing a RRC procedure to establish an RRC connection. Based on cell selection or cell reselection, the UE-RRC layer may change a cell on the UE camped and stop the RRC procedure. The UE-RRC layer may inform upper layers (e.g., NAS layer) about the failure of the RRC procedure.

A UE may fail in a random access procedure to establish connection with a base station. A UE may store connection establishment failure information. The connection establishment failure information may comprise at least one of: a failed cell identity which is the global cell identity of a cell where connection establishment failure is detected; location information of the UE comprising coordinates of the location and/or the horizontal velocity of the UE; measurement results of the failed cell comprising RSRP and RSRQ, if available, of the cell where connection establishment failure is detected and based on measurements collected up to the moment the UE detected the failure; measurements of neighbor cells; time since failure indicating the time that elapsed since the last connection establishment failure; a number of preambles sent indicating the number of preambles sent by MAC for the failed random access procedure; contention detected indicating whether contention resolution was not successful for at least one of the transmitted preambles for the failed random access procedure; or maximum transmission power reached indicating whether or not the maximum power level was used for the last transmitted preamble. The UE may send a report comprising the connection establishment failure information (e.g., a connection establishment failure report) to a base station.

A UE may fail in a RACH procedure. The UE may store the RACH failure information. The RACH failure information may comprise at least one of a number of preambles sent indicating the number of preambles sent by MAC for the failed random access procedure or contention detected indicating whether contention resolution was not successful for at least one of the transmitted preambles for the failed random access procedure. The UE may send a report comprising the rach failure information (e.g., a rach report) to a base station.

Based on receiving an RRC reconfiguration message from a base station, a UE-RRC layer may perform reconfiguration with sync in at least one of the following cases: (1) reconfiguration with sync and security key refresh, involving random access (RA) to the PCell/PSCell, MAC reset, refresh of security and re-establishment of RLC and PDCP triggered by explicit layer 2 (L2) indicators; or (2) reconfiguration with sync but without security key refresh, involving RA to the PCell/PSCell, MAC reset and RLC re-establishment and PDCP data recovery (for AM DRB) triggered by explicit L2 indicators.

A UE-RRC layer may receive an RRC reconfiguration message with reconfiguration sync information element (IE) or mobility control information from a base station. Based on the RRC reconfiguration message, the UE may perform a random access procedure to a base station indicated in the reconfiguration sync IE or mobility control information in the RRC reconfiguration message. Based on the random access procedure being successfully completed, the UE may send an RRC reconfiguration complete message to the base station. The UE and the base station may consider sending/receiving the RRC reconfiguration complete message successfully as reconfiguration with sync completion. The reconfiguration with sync completion may include at least one of handover completion or PSCell addition for cell group addition.

For normal service, a UE may camp on a suitable cell, monitor control channel(s) of the camped on cell. From the camped on cell, the UE may receive system information (SI) from the PLMN. The UE may receive registration area information from the PLMN (e.g., tacking area code (TAC)) and receive other AS and NAS Information from the SI. The UE may receive paging and notification messages from the PLMN and initiate transfer to connected mode if the UE is registered in the PLMN. The UE may regularly search for a better cell according to the cell reselection criteria. If a better cell is found, that cell is selected. The UE may camped on the selected cell.

A base station may provide priorities of different frequencies on same RAT or inter-RAT frequencies to a UE in system information, in dedicated signaling (e.g., an RRC release message), or by inheriting from another RAT at inter RAT cell (re)selection. The UE may store the priorities of frequencies provided by the dedicated signaling.

A base station may provide redirection information. The redirection information may comprise at least one of one or more frequencies or one or more core network types. An RRC release message comprise the redirection information. The base station may provide the RRC release message to transition a UE to RRC inactive or RRC inactive state. Based on the RRC release message, the UE may perform cell selection procedure. Based on the redirection information, the UE may perform a cell selection procedure to find a suitable cell if the RRC release message contains the redirection information. Otherwise, the UE may perform the cell selection procedure on a carrier of RAT which the UE selects currently (e.g., NR carrier or LTE carrier).

A UE in RRC idle or RRC inactive state may perform one of two procedures such as initial cell selection and cell selection by leveraging stored information. The UE may perform the initial cell selection when the UE doesn't have stored cell information for the selected PLMN. Otherwise, the UE may perform the cell selection by leveraging stored information. For initial cell selection, a UE may scan all RF channels in the NR bands according to its capabilities to find a suitable cell. Based on results of the scan, the UE may search for the strongest cell on each frequency. The UE may select a cell which is a suitable cell. For the cell selection by leveraging stored information, the UE may requires stored information of frequencies and optionally also information on cell parameters from previously received measurement control information elements or from previously detected cells. Based on the stored information, the UE may search a suitable cell and select the suitable cell if the UE found the suitable cell. If the UE does not found the suitable cell, the UE may perform the initial cell selection.

A base station may configure cell selection criteria for cell selection. a UE may seek to identify a suitable cell for the cell selection. The suitable cell is one for which satisfies following conditions: (1) the measured cell attributes satisfy the cell selection criteria, (2) the cell PLMN is the selected PLMN, registered or an equivalent PLMN, (3) the cell is not barred or reserved, and (4) the cell is not part of tracking area which is in the list of "forbidden tracking areas for roaming". An RRC layer in a UE may inform a NAS layer in the UE of cell selection and reselection result based on changes in received system information relevant for NAS. For example, the cell selection and reselection result may be a cell identity, tracking area code and a PLMN identity.

A UE may detect a failure of a connection with a base station. The failure comprises at least one of:
  a radio link failure;
  a reconfiguration with sync failure;
  a mobility failure from new radio (NR);
  an integrity check failure indication from lower layers (e.g., PDCP layer) concerning signaling radio bearer 1 (SRB1) or signaling radio bearer 2 (SRB2); or
  an RRC connection reconfiguration failure.
The radio link failure may be a radio link failure of a primary cell of the base station. The base station may send a reconfiguration with sync in an RRC message to the UE in RRC connected state. The reconfiguration with sync may comprise a reconfiguration timer (e.g., T304). Based on receiving the reconfiguration sync, the UE may start the reconfiguration timer and perform the reconfiguration with sync (e.g., handover). Based on expiry of the reconfiguration timer, the UE determine the reconfiguration sync failure. A base station may send mobility from NR command message to the UE in RRC connected state. Based on receiving the mobility from NR command message, the UE may perform to handover from NR to a cell using other RAT (e.g., E-UTRA). The UE may determine the mobility failure from NR based on at least one of conditions being met:
- if the UE does not succeed in establishing the connection to the target radio access technology; or
- if the UE is unable to comply with any part of the configuration included in the mobility from NR command message; or
- if there is a protocol error in the inter RAT information included in the mobility from NR message.

Based on detecting the failure, the UE may initiate an RRC connection reestablishment procedure. Based on initiating the RRC connection reestablishment procedure, the UE may start a timer T311, suspend all radio bearers except for SRB0, reset MAC (layer). Based on initiating the RRC connection reestablishment procedure, the UE may release MCG SCells, release special cell (SpCell) configuration parameters and multi-radio dual connectivity (MR-DC) related configuration parameters. For example, based on initiating the RRC connection reestablishment procedure, the UE may release master cell group configuration parameters.

Cell group configuration parameters may be used to configure a master cell group (MCG) or secondary cell group (SCG). If the cell group configuration parameters are used to configure the MCG, the cell group configuration parameters are master cell group configuration parameters. If the cell group configuration parameters are used to configure the SCG, the cell group configuration parameters are secondary cell group configuration parameters. A cell group comprises of one MAC entity, a set of logical channels with associated RLC entities and of a primary cell (SpCell) and one or more secondary cells (SCells). The cell group configuration parameters (e.g., master cell group configuration parameters or secondary cell group configuration parameters) may comprise at least one of RLC bearer configuration parameters for the cell group, MAC cell group configuration parameters for the cell group, physical cell group configuration parameters for the cell group, SpCell configuration parameters for the cell group or SCell configuration parameters for the cell group. The MAC cell group configuration parameters may comprise MAC parameters for a cell group wherein the MAC parameters may comprise at least DRX parameters. The physical cell group configuration parameters may comprise cell group specific L1 (layer 1) parameters.

The special cell (SpCell) may comprise a primary cell (PCell) of an MCG or a primary SCG cell (PSCell) of a SCG. The SpCell configuration parameters may comprise serving cell specific MAC and PHY parameters for a SpCell. The MR-DC configuration parameters may comprise at least one of SRB3 configuration parameters, measurement configuration parameter for SCG, SCG configuration parameters.

Based on initiating the RRC connection reestablishment procedure, the UE may perform a cell selection procedure. Based on the cell selection procedure, the UE may select a cell based on a signal quality of the cell exceeding a threshold. The UE may select a cell based on a signal quality of the cell exceeding a threshold. The UE may determine, based on a cell selection procedure, the selected cell exceeding the threshold. The signal quality comprises at least one of: a reference signal received power; a received signal strength indicator; a reference signal received quality; or a signal to interference plus noise ratio.

Based on selecting a suitable cell, the UE may stop the timer 311 and start a timer T301. Based on selecting the suitable cell, the UE may stop a barring timer T390 for all access categories. Based on stopping the barring timer T390, the UE may consider a barring for all access category to be alleviated for the cell. Based on selecting the cell, the UE may apply the default L1 parameter values except for the parameters provided in SIB1, apply the default MAC Cell Group configuration, apply the CCCH configuration, apply a timer alignment timer in SIB1 and initiate transmission of the RRC reestablishment request message.

The UE may stop the timer T301 based on reception of an RRC response message in response of the RRC reestablishment request message. The RRC response message may comprise at least one of RRC reestablishment message or RRC setup message or RRC reestablishment reject message. The UE may stop the timer T301 when the selected cell becomes unsuitable.

Based on the cell selection procedure triggered by initiating the RRC connection reestablishment procedure, the UE may select an inter-RAT cell. Based on selecting an inter-RAT cell, the UE (UE-AS layer) may go to RRC IDLE state and may provide a release cause 'RRC connection failure' to upper layers (UE-NAS layer) of the UE.

Based on initiating the transmission of the RRC reestablishment request message, the UE may send the RRC reestablishment message. The RRC reestablishment message may comprise at least one of C-RNTI used in the source PCell, a physical cell identity (PCI) of the source PCell, short MAC-I or a reestablishment cause. The reestablishment cause may comprise at least one of reconfiguration failure, handover failure or other failure.

Based on initiating the transmission of the RRC reestablishment request message, the UE (RRC layer) may re-establish PDCP for SRB1, re-establish RLC for SRB1, apply default SRB configurations for SRB1, configure lower layers (PDCP layer) to suspend integrity protection and ciphering for SRB1, resume SRB1 and submit the RRC reestablishment request message to lower layers (PDCP layer) for transmission. Based on submitting the RRC reestablishment request message to lower layers, the UE may send the RRC reestablishment request message to a target base station via the cell selected based on the cell selection procedure wherein the target base station may or may not be the source base station.

Based on expiry of the timer T311 or T301, the UE (UE-AS layer) may go to RRC IDLE state and may provide a release cause 'RRC connection failure' to upper layers (UE-NAS layer) of the UE.

Based on receiving the release cause 'RRC connection failure', the UE (UE-NAS layer) may perform a NAS signaling connection recovery procedure when the UE does not have signaling pending and user data pending. Based on performing the NAS signaling connection recovery procedure, the UE may initiate the registration procedure by sending a Registration request message to the AMF.

Based on receiving the release cause 'RRC connection failure', the UE (UE-NAS layer) may perform a service request procedure by sending a service request message to the AMF when the UE has signaling pending or user data pending.

Based on receiving the RRC reestablishment request message, the target base station may check whether the UE context of the UE is locally available. Based on the UE context being not locally available, the target base station may perform a retrieve UE context procedure by sending a retrieve UE context request message to the source base station (the last serving base station) of the UE.

For RRC connection reestablishment procedure, the retrieve UE context request message may comprise at least one of a UE context ID, integrity protection parameters or a new cell identifier. The UE context ID may comprise at least one of C-RNTI contained the RRC reestablishment request message, a PCI of the source PCell (the last serving PCell). The integrity protection parameters for the RRC reestablishment may be the short MAC-I. The new cell identifier may be an identifier of the target cell wherein the target cell is a cell where the RRC connection has been requested to be re-established.

For the RRC connection reestablishment procedure, based on receiving the retrieve UE context request message, the source base station may check the retrieve UE context request message. If the source base station is able to identify the UE context by means of the UE context ID, and to successfully verify the UE by means of the integrity protection contained in the retrieve UE context request message, and decides to provide the UE context to the target base station, the source base station may respond to the target base station with a retrieve UE context response message. If the source base station is not able to identify the UE context by means of the UE context ID, or if the integrity protection contained in the retrieve UE context request message is not valid, the source base station may respond to the target base station with a retrieve UE context failure message.

For the RRC connection reestablishment procedure, the retrieve UE context response message may comprise at least one of Xn application protocol (XnAP) ID of the target base station, XnAP ID of the source base station, globally unique AMF identifier (GUAMI) or UE context information (e.g., UE context information retrieve UE context response). The UE context information may comprise at least one of a NG-C UE associated signaling reference, UE security capabilities, AS security information, UE aggregate maximum bit rate, PDU session to be setup list, RRC context, mobility restriction list or index to RAT/frequency selection priority. The NG-C UE associated signaling reference may be a NG application protocol ID allocated at the AMF of the UE on the NG-C connection with the source base station. The AS security information may comprise a security key of a base station ($K_{gNB}$) and next hop chaining count (NCC) value. The PDU session to be setup list may comprise PDU session resource related information used at UE context in the source base station. The PDU session resource related information may comprise a PDU session ID, a PDU session resource aggregate maximum bitrate, a security indication, a PDU session type or QoS flows to be setup list. The security indication may comprise a user plane integrity protection indication and confidentiality protection indication which indicates the requirements on user plane (UP) integrity protection and ciphering for the corresponding PDU session, respectively. The security indication may also comprise at least one of an indication whether UP integrity protection is applied for the PDU session, an indication whether UP ciphering is applied for the PDU session and the maximum integrity protected data rate values (uplink and downlink) per UE for integrity protected DRBs. The PDU session type may indicate at least one of internet protocol version 4 (IPv4), IPv6, IPv4v6, ethernet or unstructured. The QoS flow to be setup list may comprise at least one of QoS flow identifier, QoS flow level QoS parameters (the QoS Parameters to be applied to a QoS flow) or bearer identity.

For the RRC connection reestablishment procedure, the retrieve UE context failure message may comprise at least XnAP ID of the target base station and a cause value.

For the RRC connection reestablishment procedure, based on receiving the retrieve UE context response message, the target base station may send an RRC reestablishment message to the UE. The RRC reestablishment message may comprise at least a network hop chaining count (NCC) value.

Based on receiving the RRC reestablishment message, the UE may derive a new security key of a base station ($K_{gNB}$) based on at least one of current $K_{gNB}$ or next hop (NH) parameters associated to the NCC value. Based on the new security key of the base station and a previously configured integrity protection algorithm, the UE may derive a security key for integrity protection of an RRC signaling ($K_{RRCint}$) and a security key for integrity protection of user plane (UP) data ($K_{UPint}$). Based on the new security key of the base station and a previously configured ciphering algorithm, the UE may derive a security key for ciphering of an RRC signaling ($K_{RRCenc}$) and a security key for ciphering of user plane (UP) data ($K_{UPenc}$). Based on the $K_{RRCint}$, and the previously configured integrity protection algorithm, the UE may verify the integrity protection of the RRC reestablishment message. Based on the verifying being failed, the UE (UE-AS layer) may go to RRC IDLE state and may provide a release cause 'RRC connection failure' to upper layers (UE-NAS layer) of the UE. Based on the verifying being successful, the UE may configure to resume integrity protection for SRB1 based on the previously configured integrity protection algorithm and the $K_{RRCint}$ and configure to resume ciphering for SRB1 based on the previously configured ciphering algorithm and $K_{RRCenc}$. The UE may send an RRC reestablishment complete message to the target base station.

Based on receiving the retrieve UE context failure message, the target base station may send an RRC release message to the UE. For example, based on the retrieve UE context failure message comprising the RRC release message, the target base station may send the RRC release message to the UE. Based on receiving the retrieve UE context failure message, the target base station may send an RRC setup message or an RRC reject message. Based on receiving the retrieve UE context failure message, the target base station may not send any response message to the UE.

Figure 17:
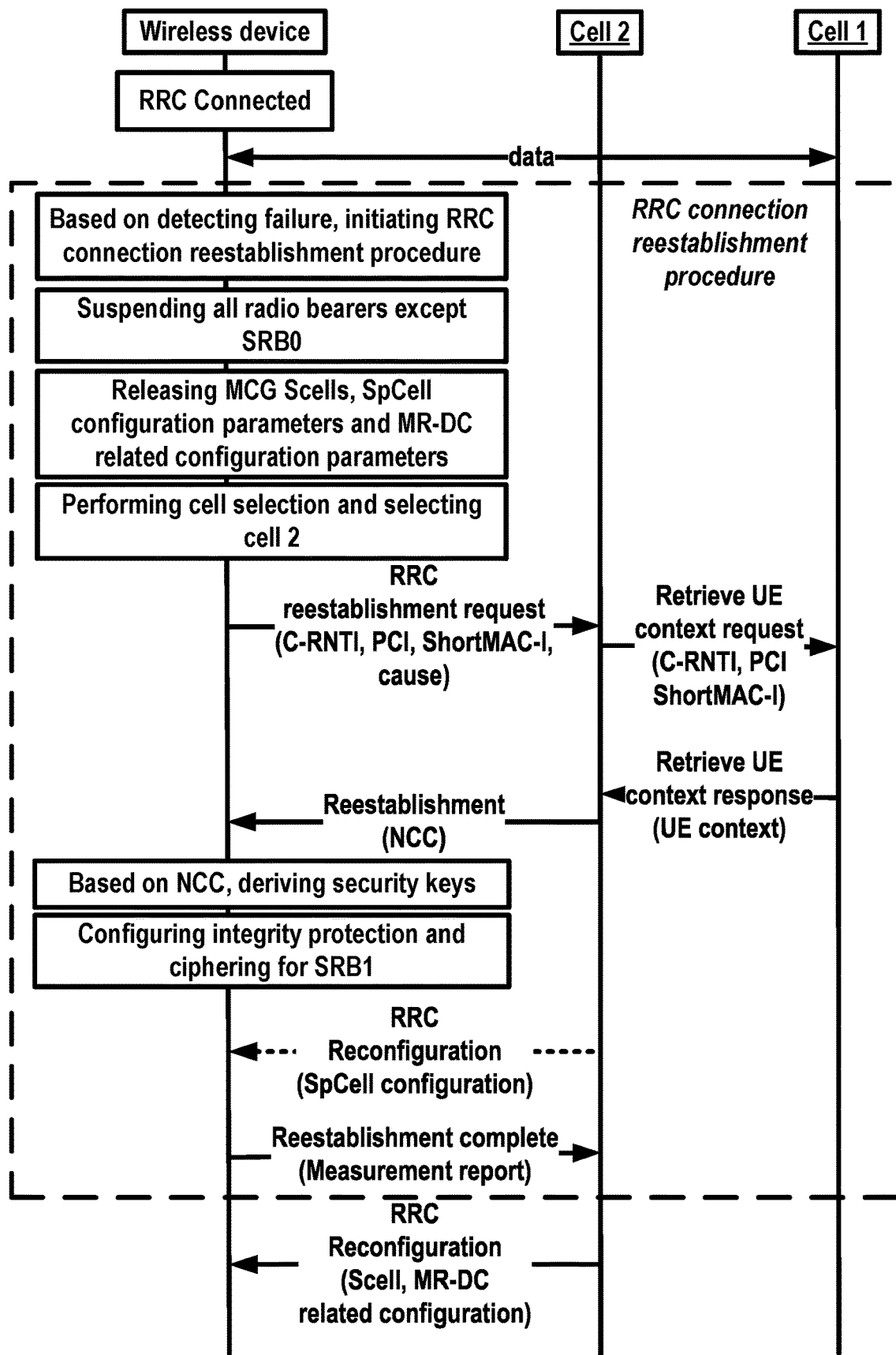
FIG. 17 illustrates an example of an RRC connection reestablishment procedure.

FIG. 17 illustrates an example of an RRC connection reestablishment procedure. The UE in an RRC connected state may send and receive data to/from a first base station (for example, a source base station) via a cell 1 wherein the cell 1 is a primary cell of the first base station. The UE may detect a failure of a connection with the first base station. Based on the failure, the UE may initiate the RRC reestablishment procedure. Based on initiating the RRC connection reestablishment procedure, the UE may start a timer T311, suspend all radio bearers except for SRB0, and/or reset a MAC (layer). Based on initiating the RRC connection reestablishment procedure, the UE may release MCG SCells, release the special cell (SpCell) configuration parameters and the multi-radio dual connectivity (MR-DC) related configuration parameters. Based on initiating the RRC connection reestablishment procedure, the UE may perform a cell selection procedure. Based on the cell selection procedure, the UE may select a cell 2 of a second base station (for example, a target base station) wherein the cell 2 is a suitable cell. Based on selecting a suitable cell, the UE may stop the timer T311 and start a timer T301. Based on selecting the suitable cell, the UE may stop a barring timer T390 for all access categories. Based on stopping the barring timer T390, the UE may consider a barring for all access category to be alleviated for the cell. Based on selecting the cell, the UE may apply the default L1 parameter values except for the parameters provided in SIB1, apply the default MAC Cell Group configuration, apply the CCCH configuration, apply a timer alignment timer in SIB1 and initiate transmission of the RRC reestablishment request message. The RRC reestablishment message may comprise at least one of C-RNTI used in the source PCell (e.g., the cell 1), a physical cell identity (PCI) of the source PCell, short MAC-I or a reestablishment cause. Based on initiating the transmission of the RRC reestablishment request message, the UE (RRC layer) may re-establish PDCP for SRB1, re-establish RLC for SRB1, apply default SRB configurations for SRB1, configure lower layers (PDCP layer) to suspend integrity protection and ciphering for SRB1, resume SRB1 and submit the RRC reestablishment request message to lower layers (PDCP layer) for transmission. Based on initiating the transmission of the RRC reestablishment request message, the UE may send the RRC reestablishment request message to the second base station via the cell 2. Based on receiving the RRC reestablishment request message, the second base station may check whether the UE context of the UE is locally available. Based on the UE context being not locally available, the second base station may perform the retrieve UE context procedure by sending a retrieve UE context request message to the source base station of the UE. The retrieve UE context request message may comprise at least one of C-RNTI, a PCI of the source PCell (the last serving PCell) or short MAC-I. Based on receiving the retrieve UE context request message, the source base station may check the retrieve UE context request message. If the source base station is able to identify the UE context by means of the C-RNTI, and to successfully verify the UE by means of the short MAC-I, and decides to provide the UE context to the second base station, the source base station may respond to the second base station with a retrieve UE context response message. The retrieve UE context response message may comprise at least of GUAMI or the UE context information. Based on receiving the retrieve UE context response message, the second base station may send an RRC reestablishment message to the UE. The RRC reestablishment message may comprise a network hop chaining count (NCC) value. Based on receiving the RRC reestablishment message, the UE may derive a new security key of a base station ($K_{gNB}$) based on at least one of current $K_{gNB}$ or next hop (NH) parameters associated to the NCC value. Based on the new security key of a base station ($K_{gNB}$) and the previously configured security algorithms, the UE may derive security keys for integrity protection and ciphering of RRC signaling (e.g., $K_{RRCint}$ and $K_{RRCenc}$ respectively) and user plane (UP) data (e.g., $K_{UPint}$ and $K_{UPenc}$ respectively). Based on the security key for integrity protection of the RRC signaling ($K_{RRCint}$), the UE may verify the integrity protection of the RRC reestablishment message. Based on the verifying being successful, the UE may configure to resume integrity protection for SRB1 based on the previously configured integrity protection algorithm and the $K_{RRCint}$ and configure to resume ciphering for SRB1 based on the previously configured ciphering algorithm and the $K_{RRCenc}$. The second base station may send a first RRC reconfiguration message. The RRC first reconfiguration message may comprise the SpCell configuration parameters. Based on receiving the SpCell configuration parameters, the UE may initiate transmission and reception of data to/from the second base station. The UE may send an RRC reestablishment complete message to the second base station. The RRC reestablishment complete message may comprise measurement report. Based on receiving the measurement report, the second base station may determine to configure SCells and/or secondary cell groups (e.g., SCG or PSCells). Based on the determining, the second base station may send a second RRC reconfiguration message comprising SCells configuration parameters and/or MR-DC related configuration parameters. Based receiving the second RRC reconfiguration message, the UE may transmit and receive data via the SCells and/or SCGs.

The RRC reconfiguration message may comprise at least one of cell group configuration parameters of MCG and/or SCG, radio bearer configuration parameters or AS security key parameters.

A UE may remain in CM-CONNECTED and move within an area configured by the base station without notifying the base station when the UE is in RRC inactive state where the area is an RNA. In RRC inactive state, a last serving base station may keep the UE context and the UE-associated NG connection with the serving AMF and UPF. Based on received downlink data from the UPF or downlink UE-associated signaling from the AMF while the UE is in RRC inactive state, the last serving base station may page in the cells corresponding to the RNA and may send RAN Paging via an Xn interface to neighbor base station(s) if the RNA includes cells of neighbor base station(s).

An AMF may provide to the base station a core network assistance information to assist the base station's decision whether a UE can be sent to RRC inactive state. The core network assistance information may include the registration area configured for the UE, the periodic registration update timer, a UE identity index value, the UE specific DRX, an indication if the UE is configured with mobile initiated connection only (MICO) mode by the AMF, or the expected UE behavior. The base station may use the UE specific DRX and the UE identity index value to determine a paging occasion for RAN paging. The base station may use periodic registration update timer to configure periodic RNA update timer (e.g., a timer T380). The base station may use an expected UE behavior to assist the UE RRC state transition decision.

A base station may initiate a RRC connection release procedure to transit an RRC state of a UE from RRC connected state to RRC idle state, from an RRC connected state to RRC inactive state, from RRC inactive state back to RRC inactive state when the UE tries to resume, or from RRC inactive state to RRC idle state when the UE tries to resume. The RRC connection procedure may also be used to release an RRC connection of the UE and redirect a UE to another frequency. The base station may send the RRC release message comprising suspend configuration parameters when transitioning RRC state of the UE to RRC inactive state. The suspend configuration parameters may comprise at least one of a resume identity, RNA configuration, RAN paging cycle, or network hop chaining count (NCC) value wherein the RNA configuration may comprise RNA notification area information, or periodic RNA update timer value (e.g., T380 value). The base station may use the resume identity (e.g., inactive-RNTI (I-RNTI)) to identify the UE context when the UE is in RRC inactive state.

If the base station has a fresh and unused pair of {NCC, next hop (NH)}, the base station may include the NCC in the suspend configuration parameters. Otherwise, the base station may include the same NCC associated with the current $K_{gNB}$ in the suspend configuration parameters. The NCC is used for AS security. The base station may delete the current AS keys (e.g., $K_{RRCenc}$, $K_{UPenc}$), and $K_{UPint}$ after sending the RRC release message comprising the suspend configuration parameters to the UE but may keep the current AS key $K_{RRCint}$. If the sent NCC value is fresh and belongs to an unused pair of {NCC, NH}, the base station may save the pair of {NCC, NH} in the current UE AS security context and may delete the current AS key $K_{gNB}$. If the sent NCC value is equal to the NCC value associated with the current $K_gNB$, the base station may keep the current AS key $K_{gNB}$ and NCC. The base station may store the sent resume identity together with the current UE context including the remainder of the AS security context.

Upon receiving the RRC release message comprising the suspend configuration parameters from the base station, the UE may verify that the integrity of the received RRC release message comprising the suspend configuration parameters is correct by checking PDCP MAC-I. If this verification is successful, then the UE may take the received NCC value and save it as stored NCC with the current UE context. The UE may delete the current AS keys $K_{RRCenc}$, $K_{UPenc}$, and $K_{UPint}$, but keep the current AS key $K_{RRCint}$ key. If the stored NCC value is different from the NCC value associated with the current $K_{gNB}$, the UE may delete the current AS key $K_{gNB}$. If the stored NCC is equal to the NCC value associated with the current $K_{gNB}$, the UE shall keep the current AS key KgNB. The UE may store the received resume identity together with the current UE context including the remainder of the AS security context, for the next state transition.

Based on receiving the RRC release message comprising the suspend configuration parameters, the UE may reset MAC, release the default MAC Cell Group configuration, re-establish RLC entities for SRB1. Based on receiving the RRC release message comprising suspend configuration parameters, the UE may store in the UE inactive AS context current configuration parameters. The current configuration parameters may comprise the current $K_{gNB}$ and $K_{RRCint}$ keys, a robust header compression (ROHC) state, stored QoS flow to DRB mapping rules, the C-RNTI used in the source PCell, the cell identity and the physical cell identity of the source PCell, and all other parameters configured except for the ones within reconfiguration with sync and serving cell configuration common parameters in SIB. The serving cell configuration common parameters in SIB may be used to configure cell specific parameters of a UE's serving cell in SIB1. Based on receiving the RRC release message comprising the suspend configuration parameters, the UE may suspend all SRB(s) and DRB(s) except for SRB0. Based on receiving the RRC release message comprising suspend configuration parameters, the UE may start a timer T380, enter RRC inactive state, perform cell selection procedure.

The UE in RRC inactive state may initiate an RRC connection resume procedure. For example, based on having data or signaling to transmit, or receiving RAN paging message, the UE in RRC inactive state may initiate the RRC connection resume procedure. Based on initiating the RRC connection resume procedure, the UE may select access category based on triggering condition of the RRC connection resume procedure and perform unified access control procedure based on the access category. Based on the unified access control procedure, the UE may consider access attempt for the RRC connection resume procedure as allowed. Based on considering the access attempt as allowed, the UE may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message.

Based on initiating the transmission of the RRC resume request message, the UE may set the contexts of the RRC resume request message. The RRC resume request message may comprise at least one of resume identity, resume MAC-I or resume cause. The resume cause may comprise at least one of emergency, high priority access, mt access, mo signaling, mo data, mo voice call, mo sms, ran update, mps priority access, mcs priority access.

Based on initiating the transmission of the RRC resume request message, the UE may restore RRC configuration parameters and the $K_{gNB}$ and $K_{RRCint}$ keys from the stored UE inactive AS context except for the master cell group configuration parameters, MR-DC related configuration parameters (e.g., secondary cell group configuration parameters) and PDCP configuration parameters. The RRC configuration parameter may comprise at least one of the C-RNTI used in the source PCell, the cell identity and the physical cell identity of the source PCell, and all other parameters configured except for the ones within reconfiguration with sync and serving cell configuration common parameters in SIB. Based on current (restored) $K_{gNB}$ or next hop (NH) parameters associated to the stored NCC value, the UE may derive a new key of a base station ($K_{gNB}$). Based on the new key of the base station, the UE may derive security keys for integrity protection and ciphering of RRC signaling (e.g., $K_{RRCenc}$ and $K_{RRCint}$ respectively) and security keys for integrity protection and ciphering of user plane data (e.g., $K_{UPint}$ and the $K_{UPenc}$ respectively). Based on configured algorithm and the $K_{RRCint}$ and $K_{UPint}$, the UE may configure lower layers (e.g., PDCP layer) to apply integrity protection for all radio bearers except SRB0. Based on configured algorithm and the $K_{RRCenc}$ and the $K_{UPenc}$, the UE may configure lower layers (e.g., PDCP layer) to apply ciphering for all radio bearers except SRB0.

Based on initiating the transmission of the RRC resume request message, the UE may re-establish PDCP entities for SRB1, resume SRB1 and submit the RRC resume request message to lower layers wherein the lower layers may comprise at least one of PDCP layer, RLC layer, MAC layer or physical (PHY) layer.

A target base station may receive the RRC resume request message. Based on receiving the RRC resume request message, the target base station may check whether the UE context of the UE is locally available. Based on the UE context being not locally available, the target base station may perform the retrieve UE context procedure by sending the retrieve UE context request message to the source base station (the last serving base station) of the UE. The retrieve UE context request message may comprise at least one of a UE context ID, integrity protection parameters, a new cell identifier or the resume cause wherein the resume cause is in the RRC resume request message.

For the RRC connection resume procedure, based on receiving the retrieve UE context request message, the source base station may check the retrieve UE context request message. If the source base station is able to identify the UE context by means of the UE context ID, and to successfully verify the UE by means of the integrity protection contained in the retrieve UE context request message, and decides to provide the UE context to the target base station, the source base station may respond to the target base station with the retrieve UE context response message. If the source base station is not able to identify the UE context by means of the UE context ID, or if the integrity protection contained in the retrieve UE context request message is not valid, or, if the source base station decides not to provide the UE context to the target base station, the source base station may respond to the target base station with a retrieve UE context failure message.

For the RRC connection resume procedure, the retrieve UE context failure message may comprise at least XnAP ID of the target base station, an RRC release message or a cause value.

For the RRC connection resume procedure, based on receiving the retrieve UE context response message, the target base station may send an RRC resume message to the UE. The RRC resume message may comprise at least one of radio bearer configuration parameters, cell group configuration parameters for MCG and/or SCG, measurement configuration parameters or sk counter wherein the sk counter is used to derive a security key of secondary base station based on $K_{gNB}$.

Based on receiving the retrieve UE context failure message, the target base station may send an RRC release message to the UE. For example, based on the retrieve UE context failure message comprising the RRC release message, the target base station may send the RRC release message to the UE. Based on receiving the retrieve UE context failure message, the target base station may send an RRC setup message or an RRC reject message. Based on receiving the retrieve UE context failure message, the target base station may not send any response message to the UE.

Based on receiving the RRC resume message, the UE may stop the timer T319 and T380. Based on receiving the RRC resume message, the UE may restore mater cell group configuration parameters, secondary cell group configuration parameters and PDCP configuration parameters in the UE inactive AS context. Based on restoring the master cell group configuration parameter and/or the secondary cell group configuration parameters, the UE may configure SCells of MCG and/or SCG by configuring lower layers to consider the restored MCG and/or SCG SCells to be in deactivated state, discard the UE inactive AS context and release the suspend configuration parameters.

Based on receiving the cell group configuration parameters in the RRC resume message, the UE may perform cell group configuration of MCG and/or SCG. Based on receiving the radio bearer configuration parameters in the RRC resume message, the UE may perform radio bearer configuration. Based on the sk counter in the RRC resume message, the UE may perform to update the security key of secondary base station.

Figure 18:
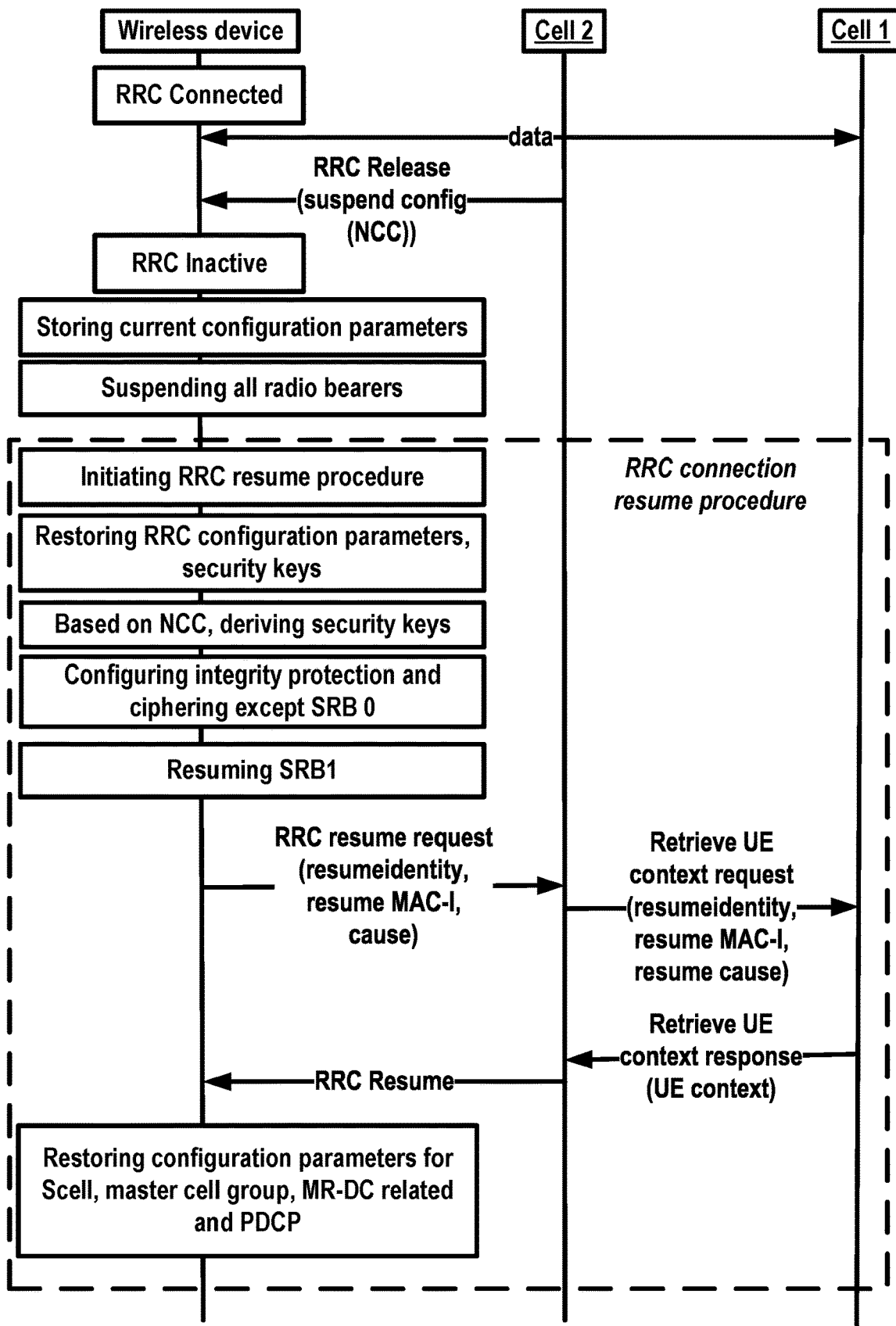
FIG. 18 illustrates an example of an RRC connection resume procedure.

FIG. 18 illustrates an example of an RRC connection resume procedure. A UE in RRC connected state may transmit and receive data to/from a first base station (a source base station) via a cell 1. The first base station may determine to transit a UE in RRC connected state to RRC inactive state. Based on the determining, the base station may send an RRC release message comprising the suspend configuration parameters. Based on receiving the RRC release message comprising suspend configuration parameters, the UE may store in the UE inactive AS Context the current $K_{gNB}$ and $K_{RRCint}$ keys, a robust header compression (ROHC) state, stored QoS flow to DRB mapping rules, the C-RNTI used in the source PCell, the cell identity and the physical cell identity of the source PCell, and all other parameters configured except for the ones within reconfiguration with sync and serving cell configuration common parameters in SIB. The UE may suspend all SRB(s) and DRB(s) except for SRB0. Based on receiving the RRC release message comprising suspend configuration parameters, the UE may start a timer T380, enter RRC inactive state, perform cell selection procedure. Based on the cell selection procedure, the UE may select a cell 2 of a second base station (a target base station). The UE in RRC inactive state may initiate an RRC connection resume procedure. The UE may perform the unified access control procedure. Based on the unified access control procedure, the UE may consider access attempt for the RRC connection resume procedure as allowed. The UE may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message. Based on initiating the transmission of the RRC resume request message, the UE may restore RRC configuration parameters and security keys from the UE inactive AS context. For example, the UE may restore the RRC configuration parameters and the $K_{gNB}$ and $K_{RRCint}$ keys from the stored UE Inactive AS context except for the master cell group configuration parameters, MR-DC related configuration parameters (e.g., secondary cell group configuration parameters) and PDCP configuration parameters. Based on current (restored) $K_{gNB}$ or next hop (NH) parameters associated to the stored NCC value, the UE may derive a new key of a base station ($K_{gNB}$). Based on the new key of the base station, the UE may derive security keys for integrity protection and ciphering of RRC signaling (e.g., $K_{RRCenc}$ and $K_{RRCint}$ respectively) and security keys for integrity protection and ciphering of user plane data (e.g., $K_{UPint}$ and the $K_{UPenc}$ respectively). Based on configured algorithm and the $K_{RRCint}$ and $K_{UPint}$, the UE (RRC layer) may configure lower layers (e.g., PDCP layer) to apply integrity protection for all radio bearers except SRB0. Based on configured algorithm and the $K_{RRCenc}$ and the $K_{UPenc}$, the UE may configure lower layers (e.g., PDCP layer) to apply ciphering for all radio bearers except SRB0. For communication between the UE and the base station, the integrity protection and/or the ciphering may be required. Based on the integrity protection and/or the ciphering, the UE may be able to transmit and receive data to/from the second base station. The UE may use the restored RRC configuration parameters to transmit and receive the data to/from the second base station. Based on initiating the transmission of the RRC resume request message, the UE may re-establish PDCP entities for SRB1, resume SRB1 and submit the RRC resume request message to lower layers. Based on receiving the RRC resume request message, the second base station may check whether the UE context of the UE is locally available. Based on the UE context being not locally available, the second base station may perform the retrieve UE context procedure by sending the retrieve UE context request message to the first base station (the last serving base station) of the UE. The retrieve UE context request message may comprise at least one of resume identity, resume MAC-I, or the resume cause. based on receiving the retrieve UE context request message, the first base station may check the retrieve UE context request message. If the first base station is able to identify the UE context by means of the UE context ID, and to successfully verify the UE by means of the resume MAC-I and decides to provide the UE context to the second base station, the first base station may respond to the second base station with the retrieve UE context response message. Based on receiving the retrieve UE context response message, the second base station may send an RRC resume message to the UE. Based on receiving the RRC resume message, the UE may restore mater cell group configuration parameters, secondary cell group configuration parameters and PDCP configuration parameters in the UE inactive AS context. Based on restoring the master cell group configuration parameter and/or the secondary cell group configuration parameters, the UE may configure SCells of MCG and/or SCG by configuring lower layers to consider the restored MCG and/or SCG SCells to be in deactivated state, discard the UE inactive AS context and release the suspend configuration parameters. The UE may transmit and receive data via the SCells and/or SCGs.

The RRC resume message may comprise at least one of cell group configuration parameters of MCG and/or SCG, radio bearer configuration parameters or AS security key parameters (e.g., sk counter).

Figure 19:
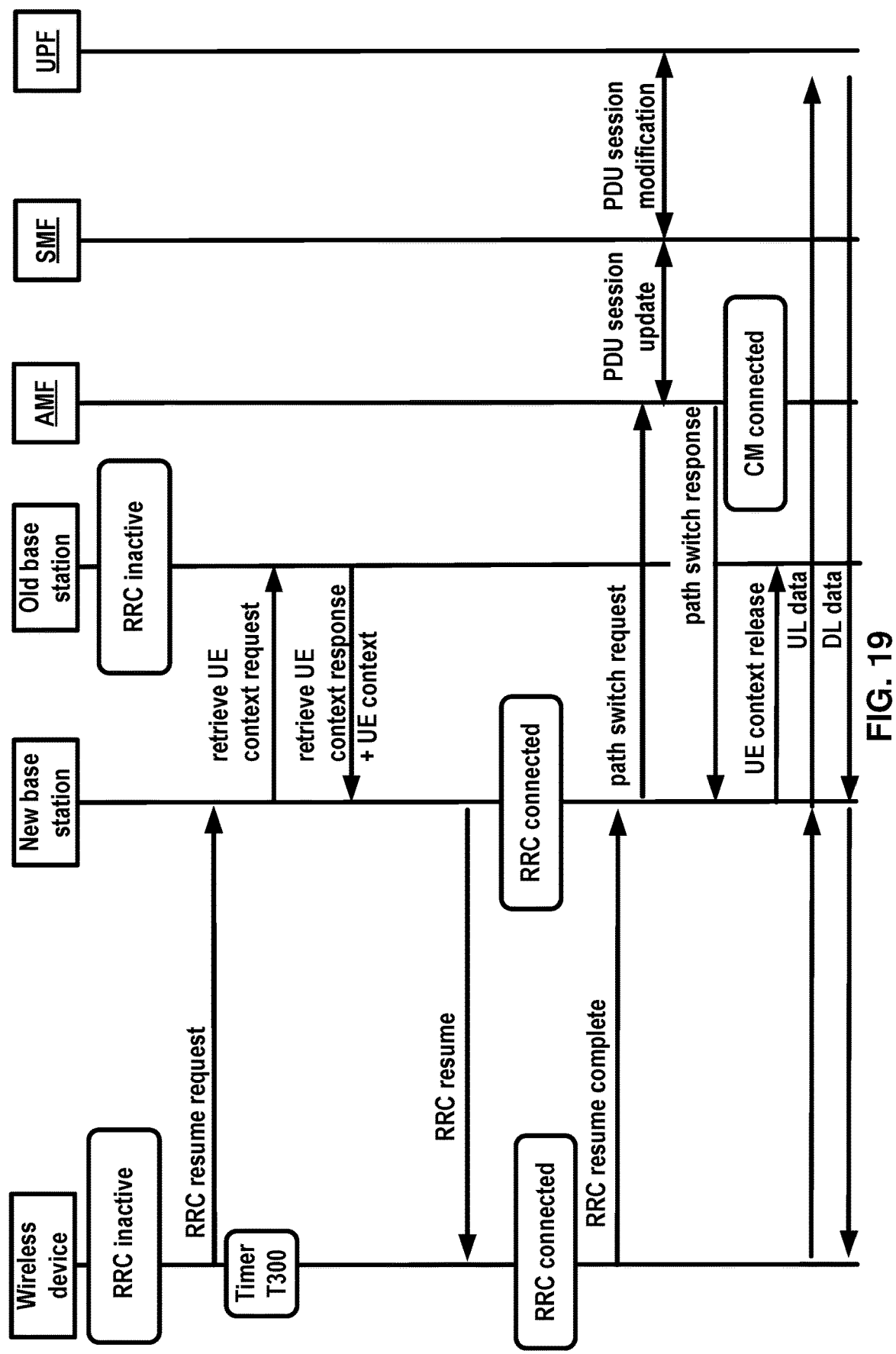
FIG. 19 illustrates an example of an RRC connection resume procedure with anchor relocation.

FIG. 19 illustrates an example of an RRC connection resume procedure with anchor relocation. A UE (e.g., a wireless device) may be in RRC inactive state. An old base station (e.g., anchor base station or first base station or source base station) may sends an RRC release message requesting to suspend RRC connection. The RRC release message may request the UE to be in RRC inactive state. For example, the anchor base station may send the RRC release message comprising the suspend configuration parameters to the UE. Based on sending the RRC release message, the anchor base station may store current UE configuration parameters and the suspend configuration parameters into UE context (e.g., UE inactive AS context) and transition to an RRC inactive state. Based on receiving the suspend configuration parameters, the UE may enter to an RRC inactive state. The suspend configuration parameters may comprises a resume identity of the UE (e.g., I-RNTI). Based on receiving the RRC release message, the UE may store current configuration parameters and the suspend configuration parameters. Based on receiving the RRC release message, the UE may suspend all SRB(s) and DRB(s) except for SRB0, and transition (enter) to an RRC inactive state. The UE may perform a cell selection procedure. Based on the cell selection procedure, the UE may select a cell of a new base station (e.g., non-anchor base station or target base station or second base station). The UE may perform an RRC connection resume procedure by sending an RRC resume request message to the new base station via the cell. The RRC resume request message may comprise the resume identity and the resume cause. The new base station may send a retrieve UE context request message to the anchor base station to request UE context of the UE, wherein the retrieve UE context request message may comprise the resume identity and the resume cause. Based on the retrieve UE context request message, the anchor base station may determine to perform anchor relocation by sending the retrieve UE context response message comprising the UE context to the new base station. Based on the retrieve UE context response message, the new base station may send an RRC resume message to the UE. Based on the RRC resume message, the UE may resume the suspended SRBs and DRBs, transition to an RRC connected state and send an RRC resume complete message to the new base station. The anchor base station may buffer downlink user data of the UE. The new base station may send user plane address for forwarding the downlink user data. The anchor base station may send the downlink user data to the new base station via the address. An existing path for transmitting/receiving control signaling of the UE (e.g., N2 interface) may be between the anchor base station and AMF. An existing path for transmitting/receiving user data of the UE (e.g., N3 interface) may be established between the anchor base station and UPF. Based on the anchor relocation, the path (and resource) for transmitting/receiving control signaling and user data may need to be updated as between the new base station and AMF/UPF. For the updating the path, the new base station may perform a path switch procedure by sending a path switch request message to AMF. The path switch request message may comprise new addresses of the new base station for transmitting/receiving control signaling and user data of the UE, and PDU session information comprising PDU session identities. Based on the path switch request message, the AMF may update the path for transmitting/receiving control signaling of the UE. Based on the path switch request message, the AMF may perform a PDU session update procedure with SMF. The SMF may perform a PDU session modification with UPF. Based on the procedure, the SMF and UPF may update the path (and resource) for transmitting/receiving the user data of the UE. The AMF may send a path switch response message to the new base station. Based on receiving the path switch response message, the new base station may update the path for transmitting/receiving control signaling and user data of the UE, and send a UE context release message to the anchor base station. Based on the UE context release message, the anchor may release the UE context. Based on the updated path, the new base station may forward uplink user data from the UE to the UPF and forward downlink data from the UPF to the UE.

In an example, a connection suspend procedure may be initiated by a serving NG-RAN node when a UE is in CM-CONNECTED with RRC Connected state and has received the "RRC Inactive Assistance Information" from the AMF. The NG-RAN may initiate a transition of the UE's RRC state to RRC Inactive state from RRC connected state. In an example, a connection suspend procedure may be initiated by the serving NG-RAN node when the UE is in CM-CONNECTED and has at least one PDU session with active user plane connection, and NG-eNB or gNB has received indication from the AMF that User Plane CIoT 5GS Optimisation is supported for the UE.

In an example, an NG-RAN initiated connection suspend procedure may comprise the following. An NG-RAN may send to an AMF an N2 suspend request message. The AMF may enter CM-IDLE with suspend indicator. Context information related to the NGAP UE association, UE Context and PDU session context, necessary to resume the connection may be stored in the UE, NG-RAN node and in the AMF. The NG-RAN may include the suspend cause, and the N2 SM information. The NG-RAN may include the information on recommended cells and NG-RAN for paging in the N2 suspend request message. If available, the AMF may store this information to be used when paging the UE. The NG-RAN may include Information for Enhanced Coverage, if available, in the N2 Suspend Request message. If service gap control is being applied to the UE and the service gap timer is not already running, the service gap timer may be started in the AMF when entering CM-IDLE, unless the connection was initiated after a paging of an MT event, or after a mobility registration procedure without Follow-on Request indication. The AMF may send/invoke to a SMF (e.g., for one or more of the PDU Sessions in the N2 Suspend Request), a Nsmf_PDUSession_UpdateSMContext Request (comprising PDU Session ID, Cause, Operation type, User Location Information, Age of Location Information, N2 SM Information (Secondary RAT usage data)). The Operation Type may be set to UP suspend to indicate suspend of user plane resources for the PDU Session. The SMF may send to a UPF an N4 Session Modification Request (e.g., with indication that AN Tunnel Info to be suspended, Buffering on/off). The SMF may initiate an N4 Session Modification procedure indicating the need to release the tunnel info of AN terminating N3 between AN and UPF. Buffering on/off may indicate whether the UPF may buffer incoming DL PDU or not. The UPF may send N4 Session Modification Response to acknowledge the SMF request. The SMF may maintain the N3 tunnel info (including both AN Tunnel Info and the CN Tunnel Info). The UPF may maintain the CN tunnel info as it may receive uplink packets from the AN. The SMF may send to the AMF an Nsmf_PDUSession_UpdateSMContext response. The AMF may send to NG-RAN an N2 Suspend Response. The NG-RAN may successfully terminate the Connection Suspend procedure. The NG-RAN may send an RRC message to suspend the RRC Connection towards the UE including UE Resume ID and/or an I-RNTI. If Service Gap Control is applied for the UE and the Service Gap timer is not already running, the Service Gap timer may be started in the UE when entering CM-IDLE, unless the connection was initiated as a response to paging of an MT event, or after a mobility registration procedure without Follow-on Request Indication set.

In an example embodiment, a connection resume procedure may be employed by a UE to request the establishment of a secure connection between a UE and the network when the UE is in CM-CONNECTED with RRC Inactive state, or in CM-IDLE with suspend indicator for the UE supporting User Plane CIoT 5GS Optimisation. The UE may initiate the procedure when upper layers or the AS (when responding to RAN paging or upon triggering RNA updates) requests the resumption of a suspended RRC connection. In an example, the UE may initiate the transition from RRC Inactive state to RRC Connected state. The UE may provide its resume identity needed by the NG-RAN to access the UE's stored Context. The NG-RAN may perform UE Context Retrieval procedure. The UE Context Retrieval may be performed when the UE Context associated with the UE attempting to resume its connection is not locally available at the accessed NG-RAN. The NG-RAN node may perform an N2 Path switch procedure. If the accessed NG-RAN is able to retrieve the UE Context, the accessed NG-RAN node may initiate N2 Path Switch procedure. If the connection resume procedure is a response to RAN paging which is triggered by 5GC due to an N2 interface procedure, NG-RAN and 5GC may handle the N2 interface procedure as a collision. The NG-RAN may send UE Notification message to report that UE is in RRC Connected if an AMF requested N2 Notification to the NG-RAN. The NG-RAN may send to the UE an RRC message to confirm to the UE that the UE has entered RRC Connected state. In an example, the NG-RAN may be a base station, gNB, eNB, and/or the like.

In an example, a UE context retrieval procedure may be employed by a base station. The purpose of the retrieve UE context procedure is to either retrieve the UE context from the old NG-RAN (e.g., the old base station) node and transfer the UE context to the NG-RAN node (the new base station 1 or the new base station 2) where the UE RRC Connection has been requested to be established, or to enable the old NG-RAN node to forward an RRC message to the UE via the new NG-RAN node without context transfer. In an example, based on receiving an RRC resume request message, the new base station may send the retrieve UE context request message to the old base station. Based on receiving the retrieve UE context request message, the old base station may determine whether to perform anchor relocation (or transfer UE context to the new base station). Based on the determining of the anchor relocation, the new base station may send an retrieve UE context response message comprising UE context to the new base station. Based on not determining the anchor relocation, the old base station may send an UE context retrieve failure message to the new base station. the UE context failure message may comprise an RRC message. The UE context retrieval procedure may employ UE-associated signaling. The new NG-RAN node may initiate the procedure by sending a retrieve UE context request message to the old NG-RAN node. If the old NG-RAN node is able to identify the UE context by means of the UE Context ID, and to successfully verify the UE by means of the integrity protection contained in the retrieve UE context request message, and decides to provide the UE context to the new NG-RAN node, it may respond to the new NG-RAN node with the retrieve UE context response message. If the Index to RAT/Frequency Selection Priority IE is contained in the retrieve UE context response message, the new NG-RAN node may store this information. If the Location Reporting Information IE is included in the retrieve UE context response message, then the new NG-RAN node may initiate the requested location reporting functionality. If the old NG-RAN node is not able to identify the UE context by means of the UE Context ID, or if the integrity protection contained in the retrieve UE context request message is not valid, or, if it decides not to provide the UE context to the new NG-RAN node, it may respond to the new NG-RAN node with the retrieve UE context failure message. If the old NG-RAN node decides to keep the UE context in case of periodic RNAU, it may store the Allocated C-RNTI IE and the Access PCI IE in the UE Context ID IE. If the Old NG-RAN node to New NG-RAN node Resume Container IE is included in the retrieve UE context failure message, the new NG-RAN node may transparently forward the content of this IE to the UE.

In an example, the N2 path switch procedure may comprise the following. The NG-RAN node may initiate the procedure by sending the path switch request message to the AMF. Upon reception of the path switch request message the AMF shall, for each PDU session indicated in the PDU Session ID IE, transparently transfer the Path Switch Request Transfer IE to the SMF associated with the concerned PDU session. After all necessary updates including the UP path switch have been successfully completed in the 5GC for at least one of the PDU session resources included in the path switch request, the AMF may send the path switch request acknowledge message to the NG-RAN node and the procedure may end. The list of accepted QoS flows may be included in the path switch request message within the Path Switch Request Transfer IE. For each PDU session for which the additional DL QoS flow per TNL Information IE is included in the Path Switch Request Transfer IE of the path switch request message, the SMF may use each included UP transport layer information as the downlink termination point for the included associated QoS flows for this PDU session split in different tunnels. The list of PDU sessions which failed to be setup, if any, may be included in the path switch request message within the Path Switch Request Setup Failed Transfer IE. For each PDU session for which the User Plane Security Information IE is included in the Path Switch Request Transfer IE of the path switch request message, the SMF may send back the Security Indication IE within the Path Switch Request Acknowledge Transfer IE of the path switch request ACKNOWLEDGE message. For each PDU session for which the DL NG-U TNL Information Reused IE set to "true" is included in the Path Switch Request Transfer IE of the path switch request message, the SMF may, if supported, consider that the DL TNL information contained in the DL NG-U UP TNL Information IE has been reused. If the UL NG-U UP TNL Information IE is included within the Path Switch Request Acknowledge Transfer IE of the path switch request ACKNOWLEDGE message, the NG-RAN node may store this information and use it as the uplink termination point for the user plane data for this PDU session. If the Additional NG-U UP TNL Information IE is included within the Path Switch Request Acknowledge Transfer IE of the path switch request ACKNOWLEDGE message, the NG-RAN node may store this information and use the included UL NG-U UP TNL Information IE(s) as the uplink termination point(s) of the user plane data for this PDU session split in different tunnel. If the Core Network Assistance Information for RRC INACTIVE IE is included in the path switch request ACKNOWLEDGE message, the NG-RAN node may, if supported, store this information in the UE context and use it for e.g. the RRC_INACTIVE state decision and RNA configuration for the UE and RAN paging if any for a UE in RRC_INACTIVE state. If the RRC Inactive Transition Report Request IE is included in the path switch request ACKNOWLEDGE message, the NG-RAN node may, if supported, store this information in the UE context. Upon reception of the path switch request ACKNOWLEDGE message the NG-RAN node may store the received Security Context IE in the UE context. If the Redirection for Voice EPS Fallback IE is included in the path switch request ACKNOWLEDGE message, the NG-RAN node may, if supported, store it and use it in a subsequent decision of EPS fallback for voice. If the PDU Session Resource Released List IE is included in the path switch request ACKNOWLEDGE message, the NG-RAN node may release the corresponding QoS flows and regard the PDU session(s) indicated in the PDU Session Resource Released List IE as being released. The appropriate cause value for each PDU session released is included in the Path Switch Request Unsuccessful Transfer IE contained in the path switch request ACKNOWLEDGE message. In an example, Interactions with RRC Inactive Transition Report procedure may comprise the following. If the RRC Inactive Transition Report Request IE is included in the path switch request acknowledge message and set to "single RRC connected state report" and the UE is in RRC_CONNECTED state, the NG-RAN node may, if supported, send one RRC INACTIVE transition report message to the AMF to report the RRC state of the UE. If the RRC Inactive Transition Report Request IE is included in the path switch request ACKNOWLEDGE message and set to "single RRC connected state report" and the UE is in RRC_INACTIVE state, the NG-RAN node may, if supported, send to the AMF one RRC INACTIVE transition report message plus one subsequent RRC INACTIVE transition report message when the RRC state transitions to RRC_CONNECTED state. If the RRC Inactive Transition Report Request IE is included in the path switch request acknowledge message and set to "subsequent state transition report", the NG-RAN node may, if supported, send one RRC INACTIVE transition report message to the AMF to report the RRC state of the UE and subsequent RRC INACTIVE transition report messages to report the RRC state of the UE when the UE enters or leaves RRC_INACTIVE state.

In an example embodiment, mobile originated early data transmission (MO-EDT) may be employed to allow one uplink data transmission optionally followed by one downlink data transmission during a random access procedure. MO-EDT may be triggered when the upper layers have requested the establishment or resumption of the RRC Connection for Mobile Originated data (e.g., not signaling or SMS) and the uplink data size is less than or equal to a TB size indicated in a system information. MO-EDT may be employed by or applicable to BL UEs, UEs in enhanced coverage and NB-IoT UEs, and/or the like.

Figure 20:
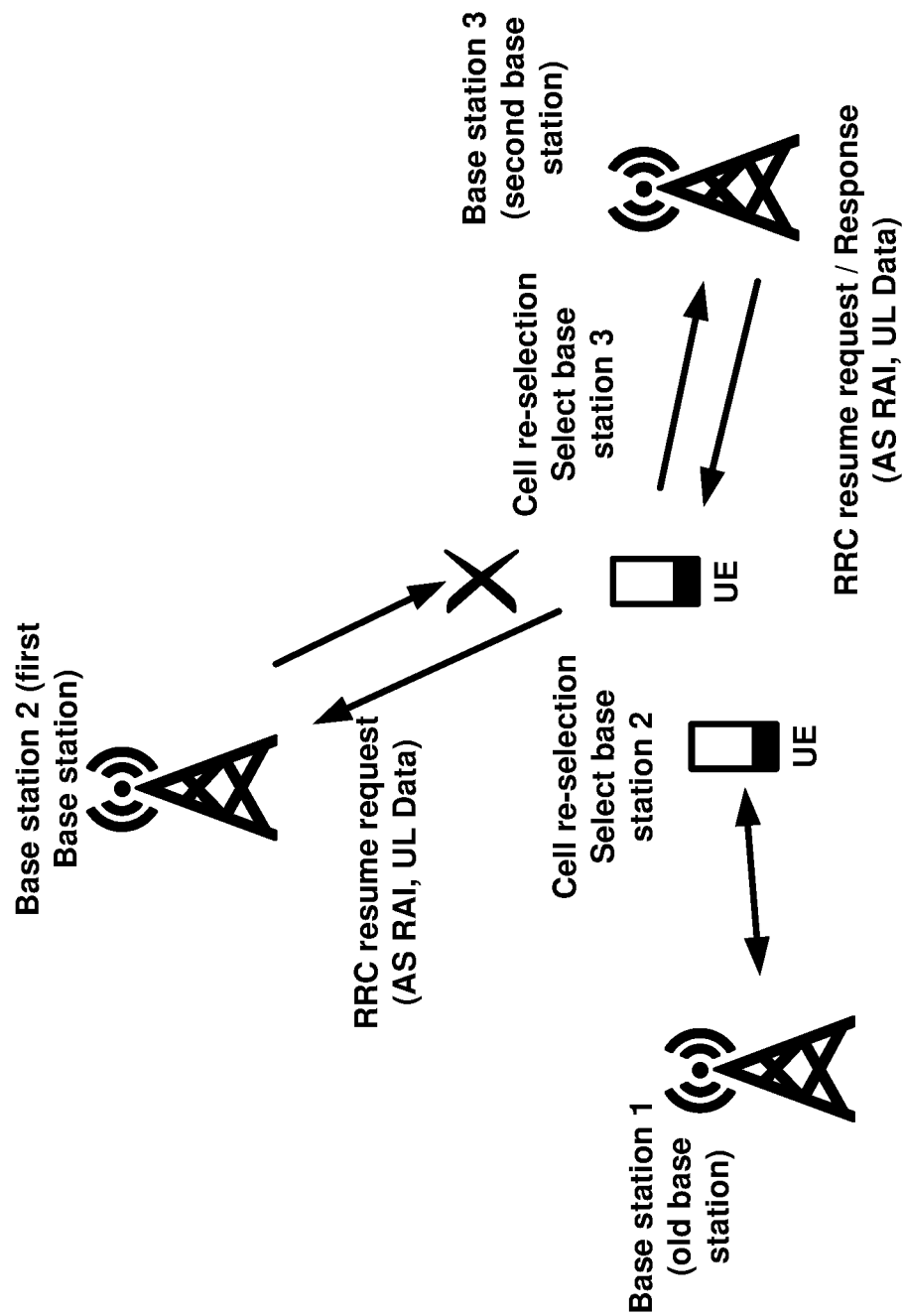
FIG. 20 is an example diagram as per an aspect of an embodiment of the present disclosure.

3GPP systems (e.g., 5G systems) may support early data transmission (EDT) during an RRC procedure. For example, EDT may be employed during an RRC resume procedure. A wireless device may perform the RRC resume procedure via (a cell of) a first base station to transition the wireless device from an RRC-INACTIVE or RRC-IDLE state to an RRC-CONNECTED state. During the RRC resume procedure, the wireless device may send uplink (UL) data to the network using an RRC resume request message. The RRC resume request message may comprise an indication that downlink (DL) data may be expected after the wireless device sends the UL data to the network. During the RRC resume procedure with the first base station, the wireless device may perform a cell re-selection prior to completion of the RRC resume procedure with the first base station. If the first base station is different than a base station the wireless device was previously camped on after entering the RRC-INACTIVE or RRC-IDLE state (referred to the "old base station"), the first base station may retrieve the wireless device context of the wireless device from the old base station. Intermittent connectivity may occur where the wireless device may select the first base station and, while performing an RRC resume procedure with the first base station, the wireless device may re-select a cell of a new, second base station. The wireless device may then perform an RRC resume procedure with the second base station (e.g., as depicted in FIG. 20). The intermittent connectivity may cause the loss of the wireless device context and DL data at the first base station and the second base station may not be able to retrieve the wireless device context and receive the DL data to deliver to the wireless device because the DL data may be delivered to the first base station. Existing mechanisms may result in loss of DL data and inefficient signaling.

Example embodiments enhance signaling and robustness of a network against issues caused by intermittent connections as discussed above. In an example embodiment, a base station may detect a failure and invoke a fallback procedure to recover DL data and context information. Example embodiments may comprise coordination among base stations to recover the state of a resume procedure and recover the DL data and context information. Example embodiments may comprise a wireless device assisted mechanism to improve resiliency of the radio access network.

Figure 21:
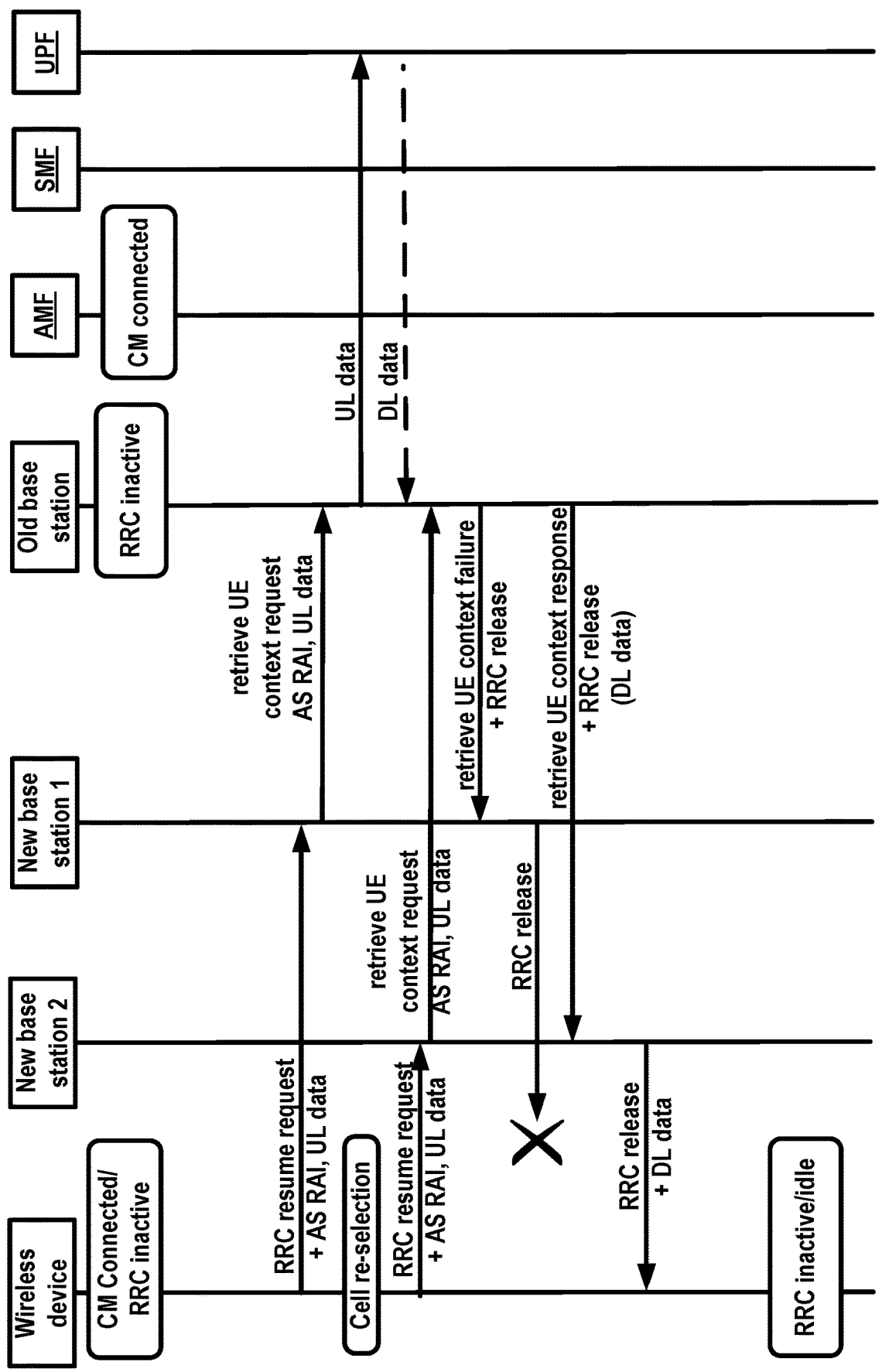
FIG. 21 is an example call flow as per an aspect of an embodiment of the present disclosure.

FIG. 21 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. The RAI may indicate that the UL data may be followed by one or more DL data. The RAI may indicate that no further UL data and/or DL data is expected after transmission of the UL data. The RAI may be employed by the new base station 1 to determine release of resources and connection upon delivery/transmission of the UL data or after transmitting the DL data to the wireless device. In an example, based on the RAI, the new base station 1 may release the resources when it sends the UL data to the UPF. In an example, based on the RAI, the new base station 1 may release the resources when it sends the DL data to the UE/wireless device. The wireless device may start a timer upon sending the RRC resume request message. The timer may be T300, T319, and/or the like. The wireless device may perform a cell reselection while the timer is running. The wireless device may perform a cell reselection before receiving a confirmation from the new base station 1 that the UL data is received, an RRC release message comprising DL data, or an RRC resume message indicating successful resumption of the RRC connection.

The new base station 1 may receive the RRC resume request message from the wireless device. The new base station 1 may send, to the old base station, a retrieve wireless device context request message to retrieve the wireless device context of the wireless device. The purpose of a retrieve wireless device context procedure is to either: (1) retrieve the wireless device context of the wireless device from the old base station (or old NG-RAN node) and transfer the wireless device context to the new base station 1 (or new NG-RAN node) where the wireless device RRC Connection has been requested to be established, or (2) to enable the old NG-RAN node to forward an RRC message to the wireless device via the new NG-RAN node without context transfer. The new NG-RAN node may initiate the retrieve wireless device context procedure by sending the retrieve wireless device context request message to the old NG-RAN node. If the old NG-RAN node is able to identify the wireless device context by means of a UE Context ID, successfully verify the wireless device by means of integrity protection contained in the retrieve wireless device context request message, and decides to provide the UE context to the new NG-RAN node, the old NG-RAN node may respond to the new NG-RAN node with the retrieve wireless device context response message. If the location reporting information IE is included in the retrieve wireless device context response message, then the new NG-RAN node may initiate the requested location reporting functionality. If the old NG-RAN node is not able to identify the wireless device context by means of the UE Context ID, or if the integrity protection contained in the retrieve wireless device context request message is not valid, or, if the old NG-RAN node decides not to provide the wireless device context to the new NG-RAN node, the old NG-RAN node may respond to the new NG-RAN node with the retrieve wireless device context failure message. If the old NG-RAN node decides to keep the wireless device context in case of periodic RNAU, the old NG-RAN node may store the Allocated C-RNTI IE and the Access PCI IE in the wireless device Context ID IE. If the Old NG-RAN node to New NG-RAN node Resume Container IE is included in the retrieve wireless device context failure message, the new NG-RAN node may transparently forward the content of this IE to the UE.

In an example embodiment, when the wireless device sends the RRC resume request message, the wireless device may start a timer such as T300, T319, and/or the like. In an example, the wireless device may perform a cell reselection before expiry of the timer. In an example, the wireless device may perform a cell reselection after the expiry of the timer. In an example embodiment, cell reselection may be occur while an RRC resume procedure for EDT or CIoT data transmission is in progress and/or not completed.

In an example embodiment, the old base station may release or delete the wireless device context information and resources when the old base station sends the wireless device context information to the new base station 1. The old base station may release the wireless device context after a period determined by a timer at the old base station.

In an example as depicted in FIG. 21, the retrieve wireless device context request message may comprise the UL data, the AS RAI, and/or the like. The retrieve wireless device context request message may comprise new NG-RAN node (new base station 1) UE XnAP ID reference, wireless device Context ID, Integrity protection, New Cell Identifier, RRC Resume Cause, and/or the like. The old base station may send a retrieve wireless device context response message to the new base station 1. The retrieve wireless device context response message may comprise wireless device context information, DL data, and/or the like. The retrieve wireless device context response message may comprise new NG-RAN node (new base station 1) UE XnAP ID reference, Old NG-RAN node (old base station) UE XnAP ID reference, GUAMI, UE context information retrieve wireless device context response, trace activation, masked IMEISV, location reporting information, criticality diagnostics, and/or the like. If the old base station determines to send a retrieve wireless device context failure message to the new base station 1, the retrieve wireless device context failure message may comprise message type, new NG-RAN node (the new base station 1) UE XnAP ID reference, Old NG-RAN node to New NG-RAN node Resume Container, Cause, Criticality Diagnostics, and/or the like.

In an example as depicted in FIG. 21, the old base station may release or remove the UE context information. The wireless device may perform a cell reselection prior to receiving an RRC release message from new base station 1. The wireless device may select a cell of new base station 2 and send an RRC resume request message via the cell to the new base station 2. The RRC resume request message may comprise the AS RAI and the UL data. The new base station 2 may send to the old base station a retrieve UE context request message. The old base station may send a failure message (such as retrieve UE context failure message) to the new base station 2. The old base station may receive DL data in response to the UL data. The old base station may send the DL data to the new base station 1. The DL data may not reach the UE and may be lost.

Figure 22:
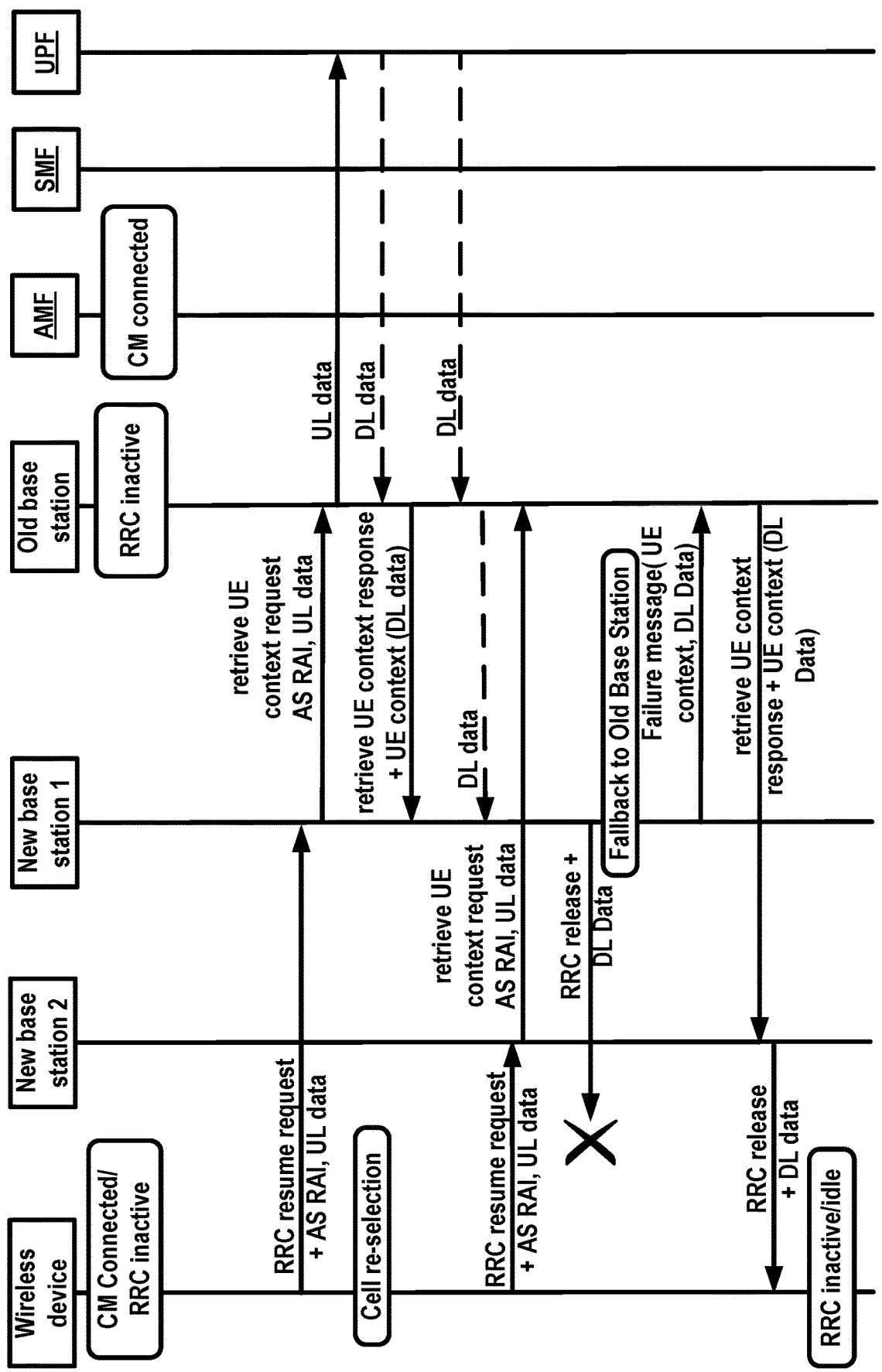
FIG. 22 is an example call flow as per an aspect of an embodiment of the present disclosure.
Figure 23:
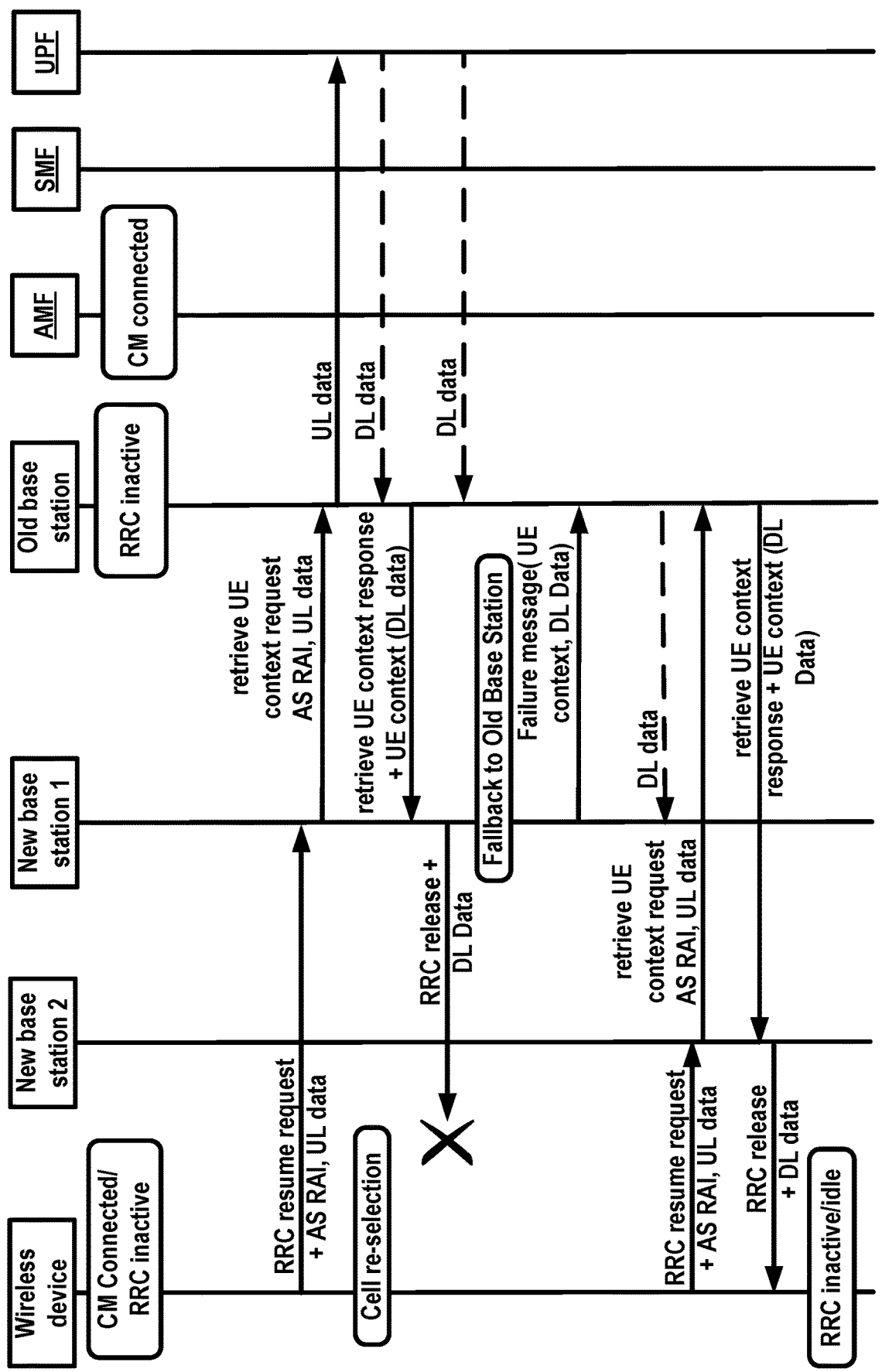
FIG. 23 is an example call flow as per an aspect of an embodiment of the present disclosure.

In an example embodiment as depicted in FIG. 22 and FIG. 23, the new base station 1 may receive an RRC resume request message comprising UL data, and AS RAI. FIG. 22 and FIG. 23 illustrate call flows of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. The new base station 1 may send a retrieve UE context request to old base station and may receive a retrieve UE context response comprising the UE context. The retrieve UE context response may comprise DL data. In an example, the old base station may send the DL data to the new base station 1 when DL data is received from a UPF. The old base station may release the UE context. The new base station 1 may send an RRC release message to the UE. The RRC release message may comprise the DL data. In an example, the wireless device may not receive the RRC release message e.g., due to a radio link failure, not being in a coverage of the new base station 1 or a cell of the new base station 1, and/or the like. The wireless device may receive the RRC release message and then send an acknowledge message or RRC complete message to the new base station 1. The new base station 1 may not receive the RRC message (e.g., acknowledge message, response message, and/or the like). In an example, the new base station 1 may determine that the transmission of the RRC release message to the wireless device has failed. The new base station 1 may determine to initiate or invoke a fallback procedure to the old base station. The fallback procedure may comprise sending a message over Xn interface to the old base station indicating a failure of an RRC (release) message transmission to the wireless device or reception of an RRC message from the UE. The message may be a failure message comprising the context of the wireless device that was received from the old base station, DL data, a cause indicating the failure, and/or the like. The wireless device may perform a cell reselection procedure and send an RRC resume request message to a new base station 2. The new base station 2 may send a retrieve wireless device context request message to the old base station. The old base station may send a retrieve wireless device context response message comprising the context of the wireless device and the DL data. The new base station 2 may send an RRC release message to the UE. The RRC release message may comprise the DL data. The wireless device may transition to an RRC-INACTVE state. The wireless device may transition to an RRC-IDLE state.

Figure 24:
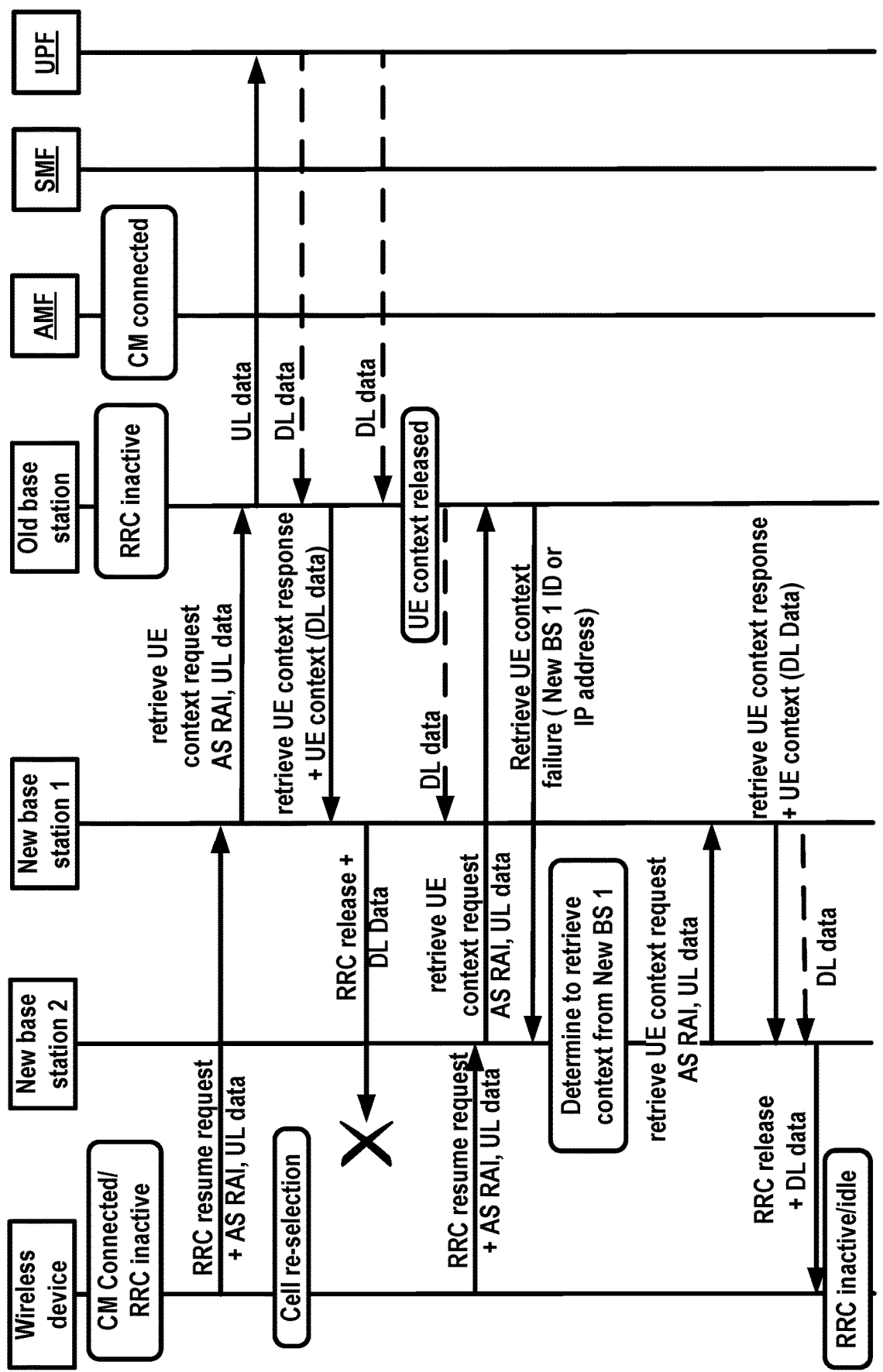
FIG. 24 is an example call flow as per an aspect of an embodiment of the present disclosure.

FIG. 24 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 24, the new base station 1 may receive an RRC resume request message comprising UL data, and AS RAI. The new base station 1 may send a retrieve UE context request to old base station and may receive a retrieve UE context response comprising the UE context. The retrieve UE context response may comprise DL data. In an example, the old base station may send the DL data to the new base station 1 when DL data is received from a UPF. The old base station may release the UE context. The new base station 1 may send an RRC release message to the UE. The RRC release message may comprise the DL data. In an example, the UE may not receive the RRC release message e.g., due to a radio link failure, not being in a coverage of the new base station 1 or a cell of the new base station 1, and/or the like. The UE may receive the RRC release message and then send an acknowledge message or RRC complete message to the new base station 1. The new base station 1 may not receive the RRC message (e.g., acknowledge message, response message, and/or the like). In an example, the new base station 1 may determine that the transmission of the RRC release message to the UE has failed. The UE may send an RRC resume request message to the new base station 2 after performing a cell reselection while the RRC resume procedure with the new base station 1 is in progress. The new base station 2 may perform a retrieve UE context procedure with the old base station by sending a retrieve UE context request message to the old base station. The old base station has released the UE context. The old base station may send a response message to the new base station 2 (such as a retrieve UE context failure/response message) comprising an identifier of the new base station 1. The old base station may send a response message such as a retrieve UE context failure/response message comprising an IP address of the new base station 1. The new base station 2 may employ the elements of the response message to determine that the context of the UE may be retrieved from the new base station 1. The new base station 2 may send a retrieve UE context request message to the new base station 1. The new base station 1 may send a retrieve UE context response to the new base station 1 comprising the UE context. The retrieve UE context response may comprise the DL data. The new base station 2 may send the DL data to the UE. The new base station 2 may send an RRC release message to the UE. The RRC release message may comprise the DL data.

Figure 25:
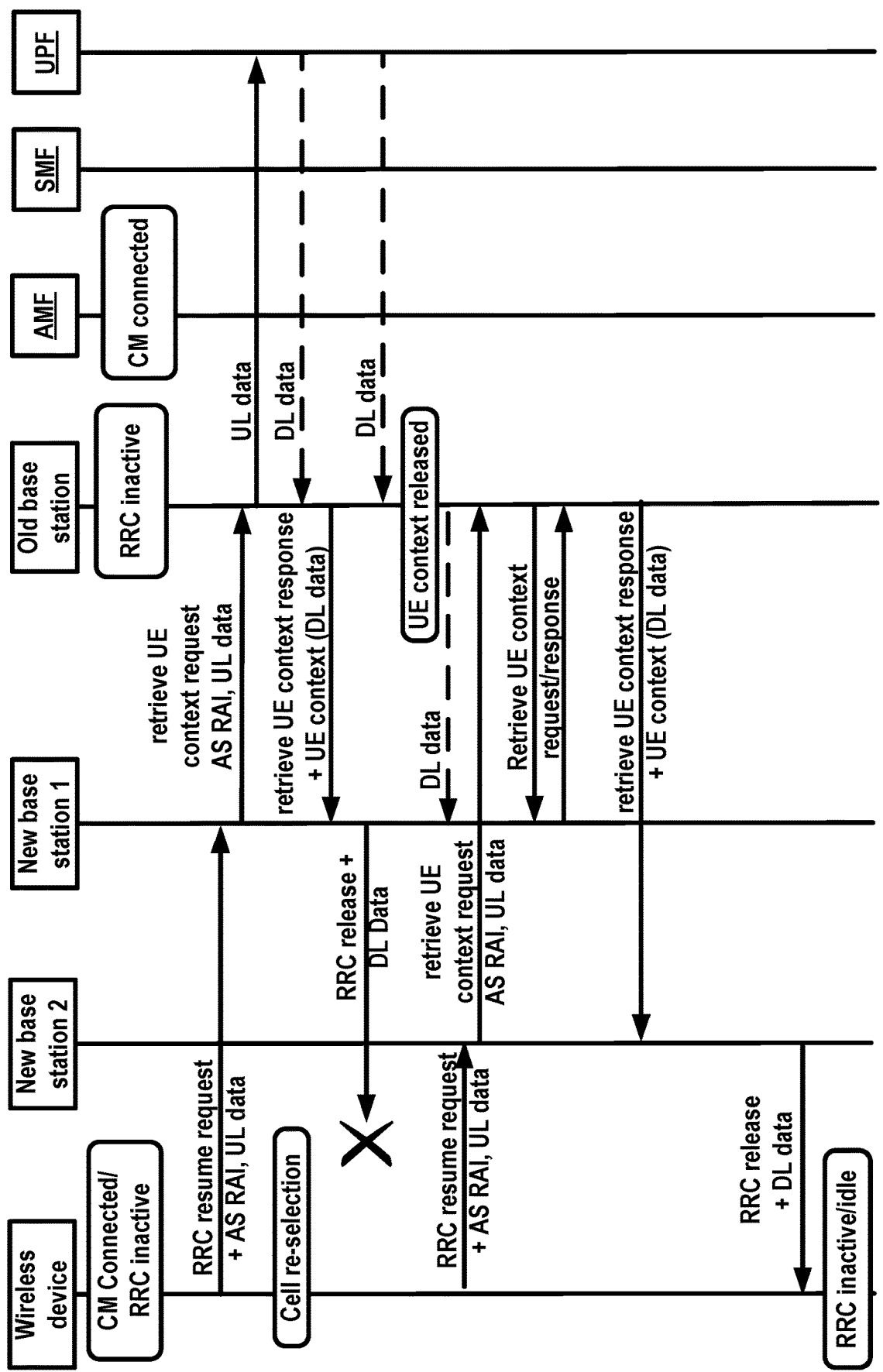
FIG. 25 is an example call flow as per an aspect of an embodiment of the present disclosure.

FIG. 25 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 25, the old base station may retrieve the UE context from the new base station 1 when the old base station receives a request for the same transaction from the new base station 2. The new base station 1 may receive an RRC resume request message comprising UL data, and AS RAI. The new base station 1 may send a retrieve UE context request to old base station and may receive a retrieve UE context response comprising the UE context. The retrieve UE context response may comprise DL data. In an example, the old base station may send the DL data to the new base station 1 when DL data is received from a UPF. The old base station may release the UE context. The old base station may store information of new base station 1. (e.g., during predetermined time). The new base station 1 may send an RRC release message to the UE. The RRC release message may comprise the DL data. In an example, the UE may not receive the RRC release message e.g., due to a radio link failure, not being in a coverage of the new base station 1 or a cell of the new base station 1, and/or the like. The UE may receive the RRC release message and then send an acknowledge message or RRC complete message to the new base station 1. The new base station 1 may not receive the RRC message (e.g., acknowledge message, response message, and/or the like). In an example, the new base station 1 may determine that the transmission of the RRC release message to the UE has failed. The UE may send an RRC resume request message to the new base station 2 after performing a cell reselection while the RRC resume procedure with the new base station 1 is in progress.

In an example, the new base station 2 may perform a retrieve UE context procedure with the old base station by sending a retrieve UE context request message to the old base station. The old base station has released the UE context. In an example, the old base station may send a retrieve UE context request message to the new base station 1 (e.g., based on a transaction record indicating that the UE context is transferred to the new base station 1 before release of the UE context). The old base station may receive a retrieve UE context response from the new base station 1. The retrieve UE context response may comprise the UE context information. The retrieve UE context response may comprise the DL data. In an example, the new base station 1 may send the DL data to the old base station (e.g., the new base station 1 may buffer the DL data until successful transmission of the DL data to the UE). When the old base station receives the UE context, the old base station may send a retrieve UE context response message to the new base station 2. The retrieve UE context response may comprise the context of the UE, the DL data and/or the like. The new base station 2 may send the DL data to the UE. The new base station 2 may send an RRC release message to the UE. The RRC release message may comprise the DL data.

Figure 26:
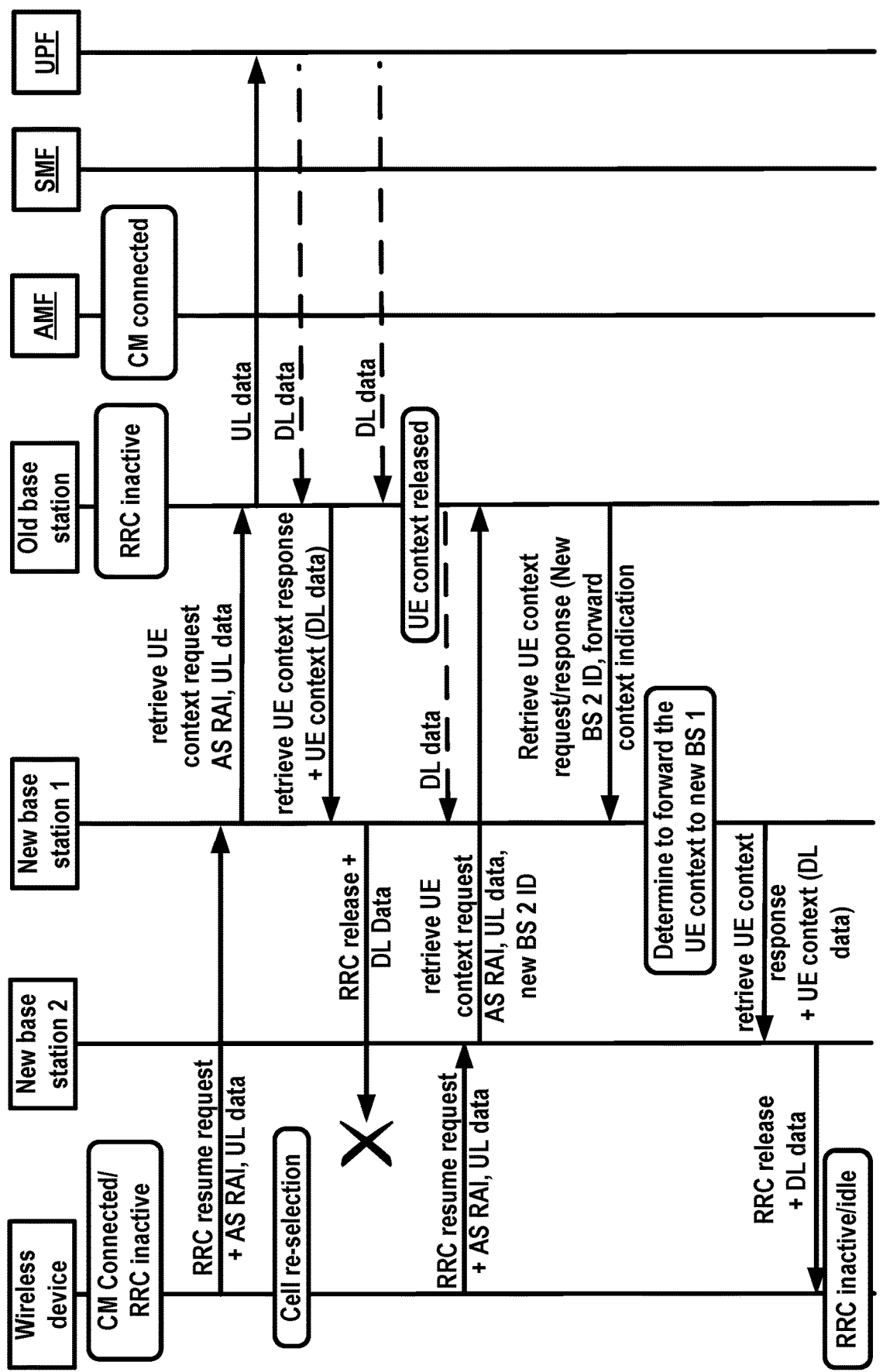
FIG. 26 is an example call flow as per an aspect of an embodiment of the present disclosure.

FIG. 26 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 26, the old base station in response to receiving a UE context retrieve request message from a new base station 2 may indicate to the new base station 1 to send the UE context to the new base station 2. The new base station 1 may receive an RRC resume request message comprising UL data, and AS RAI. The new base station 1 may send a retrieve UE context request to old base station and may receive a retrieve UE context response comprising the UE context. The retrieve UE context response may comprise DL data. In an example, the old base station may send the DL data to the new base station 1 when DL data is received from a UPF. The old base station may release the UE context. The new base station 1 may send an RRC release message to the UE. The RRC release message may comprise the DL data.

In an example, the UE may not receive the RRC release message e.g., due to a radio link failure, not being in a coverage of the new base station 1 or a cell of the new base station 1, and/or the like. The UE may receive the RRC release message and then send an acknowledge message or RRC complete message to the new base station 1. The new base station 1 may not receive the RRC message (e.g., acknowledge message, response message, and/or the like). In an example, the new base station 1 may determine that the transmission of the RRC release message to the UE has failed. The UE may send an RRC resume request message to the new base station 2 after performing a cell reselection while the RRC resume procedure with the new base station 1 is in progress. The new base station 2 may perform a retrieve UE context procedure with the old base station by sending a retrieve UE context request message to the old base station. The old base station has released the UE context. In an example, the old base station may receive a retrieve UE context request message for the same transaction from the new base station 2. The retrieve UE context request message may comprise an identifier of the new base station 2 and/or an IP address of the new base station 2. The old base station may forward the retrieve UE context request message to new base station 2. The old base station may send a message to the new base station 1 that may comprise an indication or a request to send/forward the UE context to the new base station 2. The message may comprise an identifier of the new base station 2 (Base station ID 2) and/or an IP address of the new base station 2. The new base station 1 may send a message (e.g., retrieve UE context response message) to the new base station 2. The retrieve UE context response message received by the new base station 2 (from the new base station 1) may comprise the context of the UE, the DL data and/or the like. The new base station 2 may send the DL data to the UE. The new base station 2 may send an RRC release message to the UE. The RRC release message may comprise the DL data.

Figure 27:
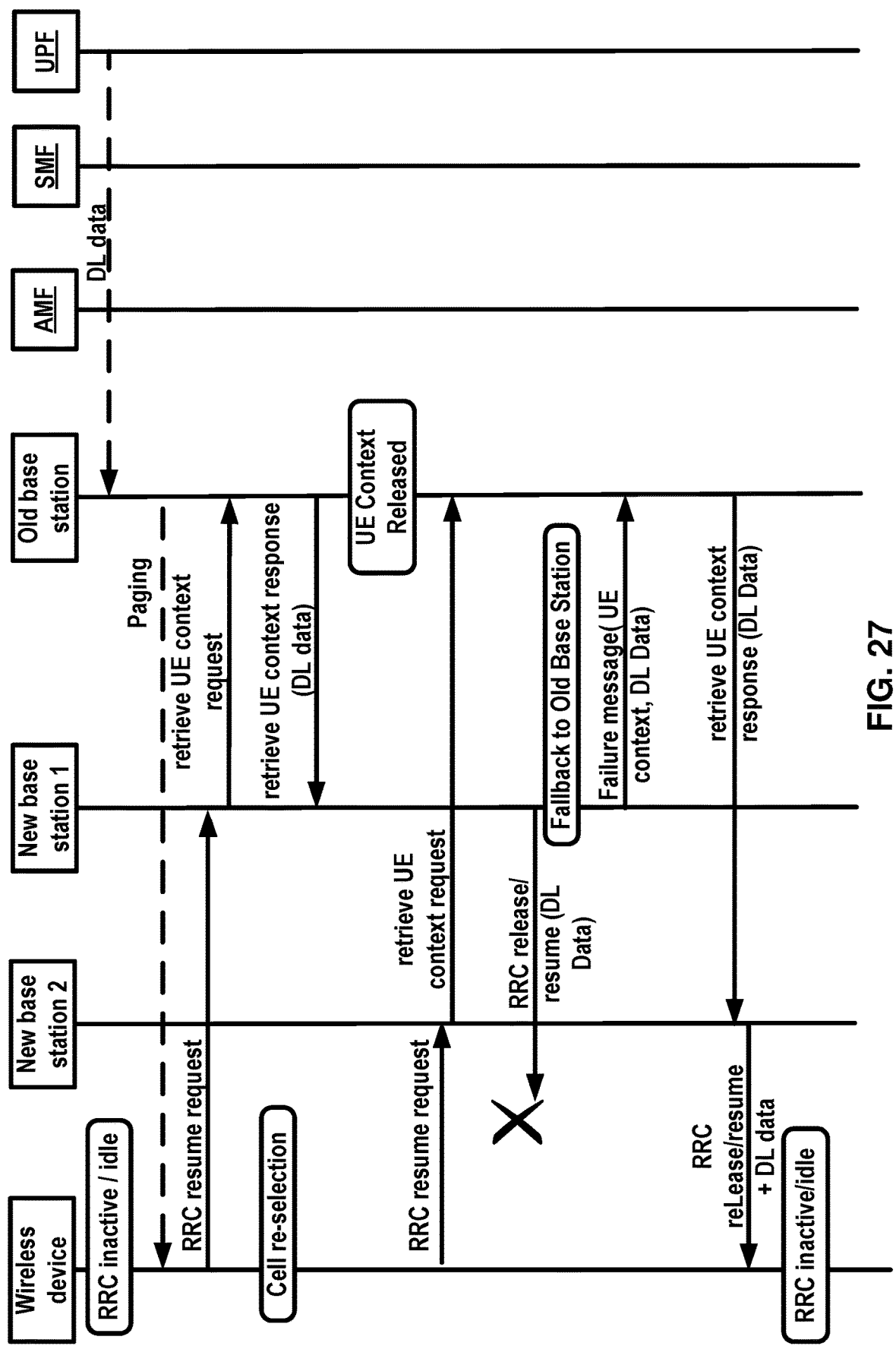
FIG. 27 is an example call flow as per an aspect of an embodiment of the present disclosure.

FIG. 27 illustrates a call flow of a procedure for mobile terminating data transmission for a wireless device in accordance with embodiments of the present disclosure. Before the call flow is initiated, the wireless device may receive a paging message from a base station (e.g., an old base station, or a new base station 1). The wireless device may perform a cell reselection and may determine to send an RRC resume request to a new base station 1. In an example embodiment as depicted in FIG. 27, a mobile terminating EDT (MT-EDT) may be employed to transmit DL data to a wireless device (UE). In an example, a UPF may receive DL data for the UE that EDT or 5G CIoT user plane optimization, and/or the like. The UPF may send the DL data to the old base station. The old base station may send a paging to the UE. The UE may send an RRC resume request message to the new base station 1. The RRC resume request message may comprise an I-RNTI and/or a resume ID. The new base station 1 may send a retrieve UE context request to old base station and may receive a retrieve UE context response comprising the UE context. The retrieve UE context response may comprise DL data. In an example, the old base station may send the DL data to the new base station 1 after sending the context of the UE. The old base station may buffer the DL data until the DL is sent to the new base station 1. The old base station may release the UE context. The new base station 1 may send an RRC release message to the UE. The RRC release message may comprise the DL data. In an example, the UE may not receive the RRC release message e.g., due to a radio link failure, not being in a coverage of the new base station 1 or a cell of the new base station 1, and/or the like. The UE may receive the RRC release message and then send an acknowledge message or RRC complete message to the new base station 1. The new base station 1 may not receive the RRC message (e.g., acknowledge message, response message, and/or the like). In an example, the new base station 1 may determine that the transmission of the RRC release message to the UE has failed. The new base station 1 may determine to initiate or invoke a fallback procedure to the old base station. The fallback procedure may comprise sending a message over Xn interface to the old base station indicating a failure of an RRC (release) message transmission to the UE or reception of an RRC message from the UE. The message may be a failure message comprising the context of the UE that was received from the old base station, DL data, a cause indicating the failure, and/or the like. The UE may perform a cell reselection procedure and send an RRC resume request message to a new base station 2. The new base station 2 may send a retrieve UE context request message to the old base station. The old base station may send a retrieve UE context response message comprising the context of the UE and the DL data. The new base station 2 may send an RRC release message to the UE. The RRC release message may comprise the DL data. The UE may transition to an RRC-INACTVE state. The UE may transition to an RRC-IDLE state. In an example embodiment, the paging may be triggered by a DL data notification. For example, the DL data notification may be received from the UPF, the AMF, or the SMF.

Figure 28:
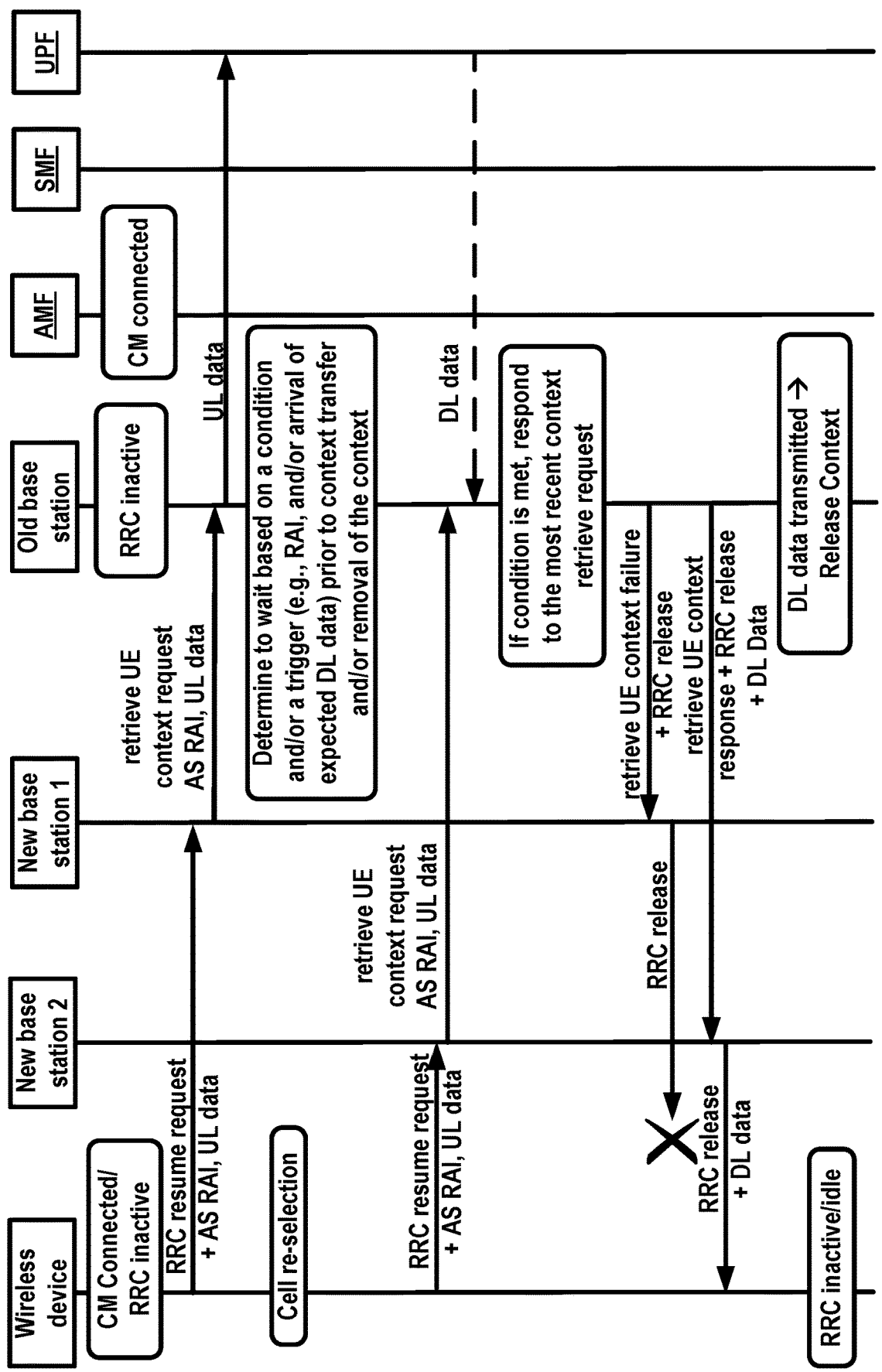
FIG. 28 is an example call flow as per an aspect of an embodiment of the present disclosure.

FIG. 28 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 28, the old base station may employ a retention mechanism. The retention mechanism may be employed for delay tolerant communication. The retention mechanism or a retention policy may be based on an element of the AS RAI. For example, the old base station may delay sending of the retrieve UE context response until arrival of the DL data. In an example, the old base station may send the retrieve UE context response to the new base station 1 and retain the UE context information until arrival of DL data. In an example, the retention policy may be based on a condition such as signal strength or measurement report of a UE. As depicted in FIG. 28, the UE may send an RRC resume request to a new base station e.g., new base station 1. The RRC resume request message may comprise an I-RNTI (and/or a resume ID), access stratum release assistance information/indication (RAI), uplink data (UL data), and/or the like. The RAI may indicate that the UL data may be followed by one or more DL data. The RAI may indicate that no further UL data and/or DL data is expected after transmission of the UL data. The RAI may be employed by the new base station 1, RAN node, NG-RAN, gNB, and/or the like to determine release of resources and connection upon delivery/transmission of the UL data or after transmitting the DL data to the UE. The UE may start a timer upon sending the RRC resume request message. The timer may be T300, T319 and/or the like. The UE may perform a cell reselection while the timer is running. The UE may perform a cell reselection before receiving a confirmation from the new base station 1 that the UL data is transmitted, or an RRC release message comprising DL data, or RRC resume message indicating successful resumption of the RRC connection. The new base station 1 may receive the RRC resume request message from the UE. The new base station 1 may send to the old base station a retrieve UE context request message to retrieve the UE context. The new NG-RAN node (the new base station 1) may initiate the procedure by sending the retrieve UE context request message to the old NG-RAN node (the old base station). If the old base station is able to identify the UE context by means of the UE Context ID, and to successfully verify the UE by means of the integrity protection contained in the retrieve UE context request message, and decides to provide the UE context to the new base station 1, the old NG-RAN node (the old base station) may respond to the new base station 1 with the retrieve UE context response message. The old base station may determine based on an element of the AS RAI (e.g., that may indicate that DL data is expected subsequent to the UL data), to delay sending the retrieve UE context response message to the new base station 1. The old base station may determine based on an element of the AS RAI to send the retrieve UE context response and keep/retain the UE context information until arrival of DL data or based on the retention policy. In an example, the UE may perform a cell re-selection while the resume procedure is in progress. The UE may select a new base station 2. The UE may send an RRC resume request comprising the AS RAI and the UL data to the new base station 2. The new base station 2 may send a retrieve UE context request message to the old base station. The old base station may have the UE context information based on the retention policy. In an example, the old base station may send the retrieve UE context response message to the new base station 2. The retrieve UE context response message may comprise the context information of the UE. The retrieve UE context response message may comprise the DL data. The old base station may send a retrieve UE context failure message to the new base station 1. In an example, the old base station may release the UE context and the resources.

Figure 29:
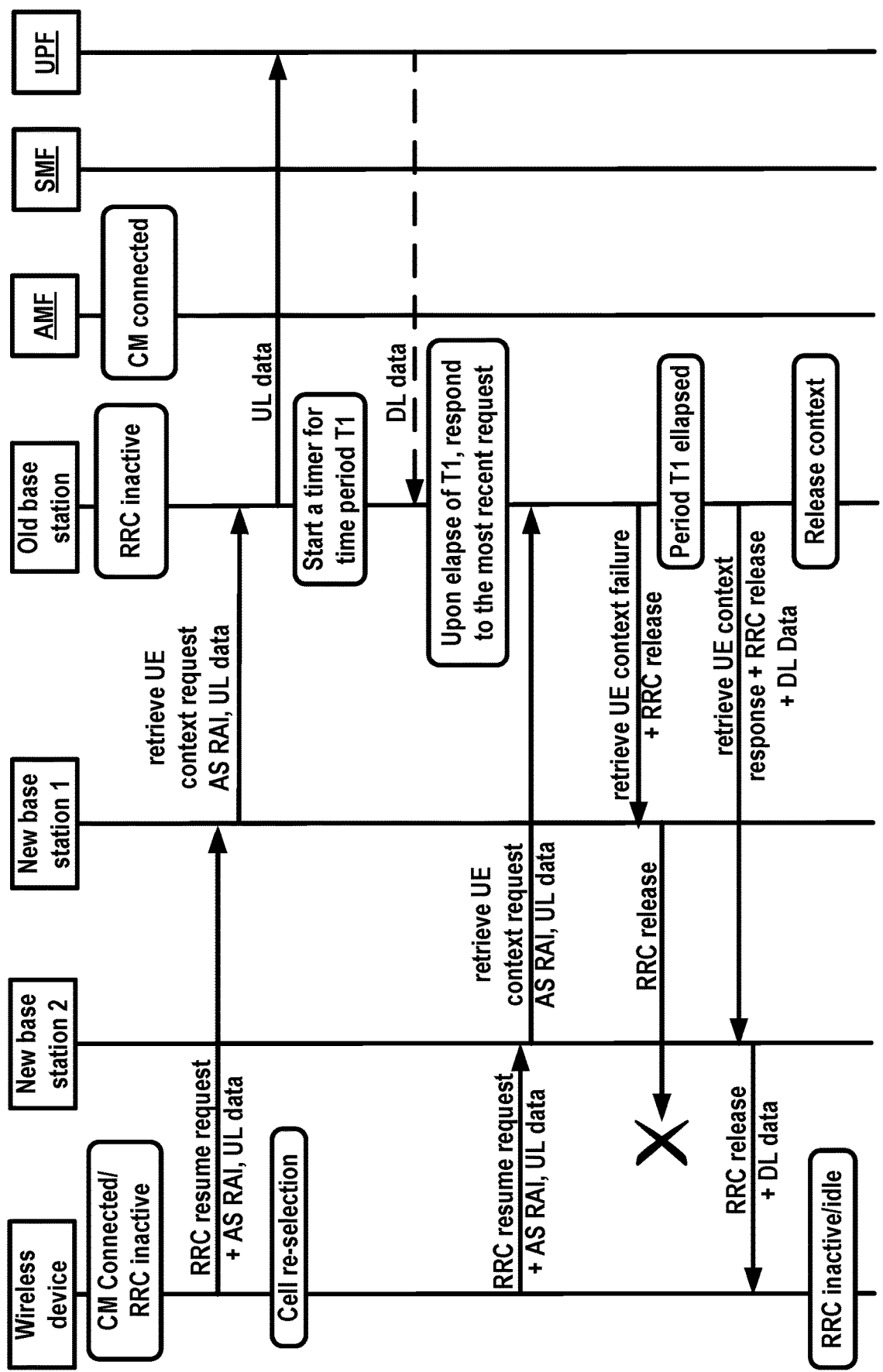
FIG. 29 is an example call flow as per an aspect of an embodiment of the present disclosure.

FIG. 29 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 29, the od base station may employ a retention mechanism based on a timer. The retention mechanism may be employed for delay tolerant communication. The retention mechanism or a retention policy may be based on an element of the AS RAI, and delay tolerance. For example, the old base station may delay sending of the retrieve UE context response for a time period determined by a timer T1. In an example, the old base station may send the retrieve UE context response to the new base station 1 and retain the UE context information for a time duration of timer T1. For example, when the od base station receives the retrieve UE context request message from the new base station 1, the old base station starts the timer T1. The old base station may send a retrieve UE context response comprising the context of the UE and the DL data upon expiry of timer T1. In an example, the old base station may send the retrieve UE context response comprising the context of the UE and the DL data and may retain the UE context and the DL data upon expiry of timer T1.

As depicted in FIG. 29, the UE may send an RRC resume request to a new base station e.g., new base station 1. The RRC resume request message may comprise an I-RNTI (and/or a resume ID), access stratum release assistance information/indication (RAI), uplink data (UL data), and/or the like. The RAI may indicate that the UL data may be followed by one or more DL data. The RAI may indicate that no further UL data and/or DL data is expected after transmission of the UL data. The RAI may be employed by the new base station 1, RAN node, NG-RAN, gNB, and/or the like to determine release of resources and connection upon delivery/transmission of the UL data or after transmitting the DL data to the UE. The UE may start a timer upon sending the RRC resume request message. The timer may be T300, T319 and/or the like. The UE may perform a cell reselection while the timer is running. The UE may perform a cell re-selection before receiving a confirmation from the new base station 1 that the UL data is transmitted, or an RRC release message comprising DL data, or RRC resume message indicating successful resumption of the RRC connection. The new base station 1 may receive the RRC resume request message from the UE. The new base station 1 may send to the old base station a retrieve UE context request message to retrieve the UE context. The new NG-RAN node (the new base station 1) may initiate the procedure by sending the retrieve UE context request message to the old NG-RAN node (the old base station). If the old NG-RAN node is able to identify the UE context by means of the UE Context ID, and to successfully verify the UE by means of the integrity protection contained in the retrieve UE context request message, and decides to provide the UE context to the new NG-RAN node (the new base station 1), the old NG-RAN node may respond to the new base station 1 with the retrieve UE context response message. The old base station may determine based on the timer T1 to delay sending the retrieve UE context response message to the new base station 1 until expiry of the timer T1. The old base station may send the retrieve UE context response and keep/retain the UE context information until expiry of timer T1 (that started upon receiving the retrieve UE context request message). In an example, the UE may perform a cell re-selection while the resume procedure is in progress. The UE may select a cell of a new base station 2. The UE may send an RRC resume request comprising the AS RAI and the UL data to the new base station 2. The new base station 2 may send a retrieve UE context request message to the old base station. The old base station may have the UE context information based on the retention policy (based on the timer T1). In an example, the old base station may send the retrieve UE context response message to the new base station 2. The retrieve UE context response message may comprise the context information of the UE. The retrieve UE context response message may comprise the DL data. The old base station may send a retrieve UE context failure message to the new base station 1. In an example, the old base station may release the UE context and the resources.

Figure 30:
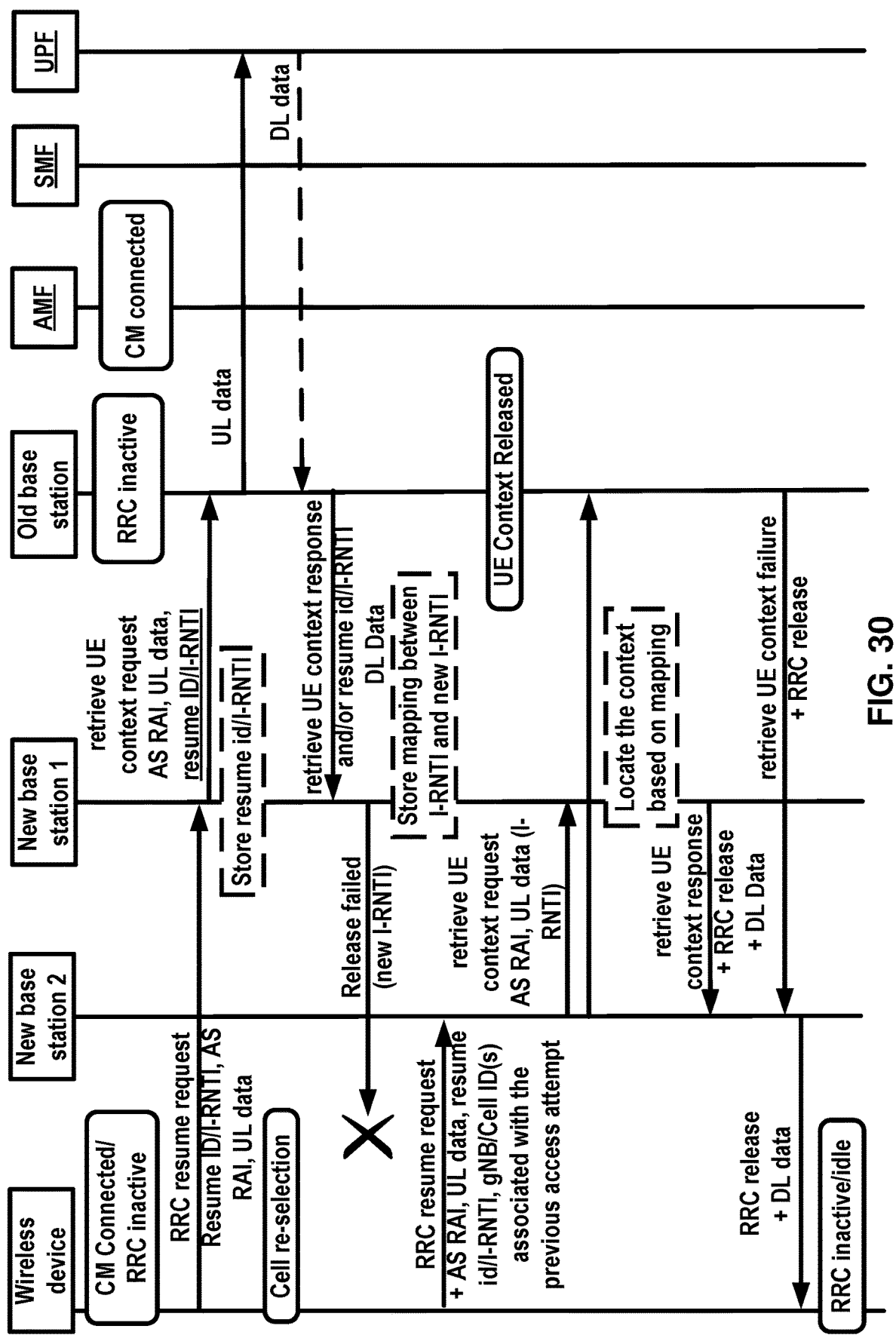
FIG. 30 is an example call flow as per an aspect of an embodiment of the present disclosure.

FIG. 30 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 30, a wireless device may provide information to the network that one or more resume request procedures are interrupted or was not successful. The information may be employed by the network to determine a RAN node or a base station that has the UE context. A wireless device (UE) may send an RRC resume request message to a new base station 1 comprising an AS RAI, UL data, an old I-RNTI (or an old resume ID), a transaction identifier (transaction ID) and/or the like. In an example, the RRC resume request message may comprise a global gNB ID that may comprise a PLMN identity, choice gNB ID, wherein the gNB ID may be equal to the leftmost bits of the NR Cell Identity IE contained in the NR CGI IE of each cell served by the gNB. The NR CGI may comprise a PLMN identity, an NR cell identity wherein the leftmost bits of the NR Cell Identity IE may correspond to the gNB ID. In an example, the RRC resume request message may comprise a cell ID, gNB ID, base station ID, and/or the like associated with the access points that the UE has sent an RRC resume request message and did not receive a response such as an RRC release message, RRC resume, and/or the like or the UE has failed to send a complete message to. The new base station 1 may store the old I-RNTI or the old resume ID. In an example, the new base station 1 may send a retrieve UE context request message to the old base station. The retrieve UE context request message may comprise the old I-RNTI, the AS RAI, the UL data, and/or the like. The old base station may send to the new base station 1 the retrieve UE context response message. The retrieve UE context response message may comprise the UE context information. The retrieve UE context response message may comprise the DL data. The retrieve UE context response message may comprise the old I-RNTI (or the old resume ID). In an example, the new base station 1 will assign a new I-RNTI before sending an RRC message (e.g., RRC release message or RRC resume message) to the UE. The new base station 1 may store a mapping or association between the old I-RNTI and the new I-RNTI. The mapping may indicate that the context of the UE may be associated with or correspond to the old I-RNTI and/or the new I-RNTI. In an example, the UE may perform a cell re-selection while the resume procedure with the new base station 1 is in progress. The UE may send to the new base station 2 an RRC resume request message comprising the global gNB ID of the new base station 1, the old I-RNTI, AS RAI, UL data, the transaction identifier, and/or the like. The RRC resume request message may comprise a cause value indicating an unsuccessful attempt with a previously selected cell. The new base station 2 may determine based on an element of the RRC resume request message (e.g., the cause, transaction ID, and the global gNB ID of the new base station 1, and/or the like) to send one or more retrieve UE context messages to the old base station and the new base station 1. In an example, the one or more retrieve UE context messages may comprise the old I-RNTI, AS RAI, UL data, and/or the like. In an example, the new base station 1 may locate the UE context based on the old I-RNTI and the mapping information between the new I-RNTI and the old I-RNTI. The new base station 1 may send a retrieve UE context response message to the new base station 2 comprising the context of the UE and the DL data. The retrieve UE context response message from the new base station 1 to the new base station 2 may comprise an RRC release indication. The new base station 2 may send to the UE an RRC release message comprising the DL data. The old base station may send to the new base station 2 a retrieve UE context failure message.

Figure 31:
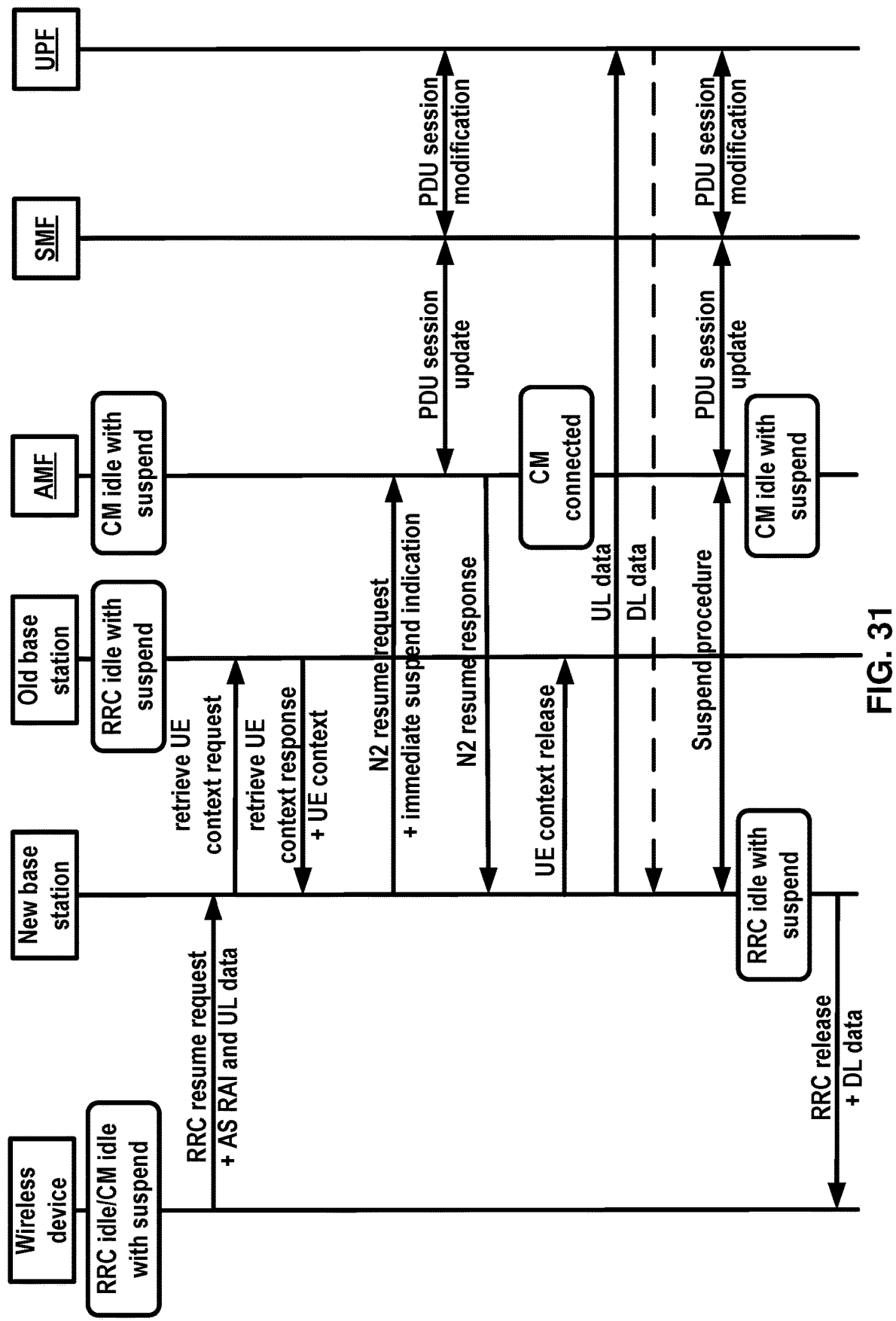
FIG. 31 is an example call flow as per an aspect of an embodiment of the present disclosure.

FIG. 31 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 31, a UE may send to a new base station (e.g., NG-eNB or NG-RAN node) an RRC message (Resume ID, AS RAI) with UL EDT. The UE may initiate the transition from RRC IDLE with Suspend state to RRC Connected state. The UE may include AS Release Assistance information indicating: No further Uplink and Downlink Data transmission, or Only a single Downlink Data transmission subsequent to the Uplink transmission. The new base station may decipher the EDT UL data received from the UE and forwards the UL data to the UPF using the N3 UL TEID in the AS context. The new base station may send an N2 Resume Request to an AMF including Resume cause and N2 SM. If the UE included AS Release Assistance information indicating No further Uplink and Downlink Data transmission, the new base station node may request for immediate transition to RRC IDLE with Suspend. The AMF may interact with a SMF to establish the N3 tunnel. The AMF may send an N2 Resume Response to new base station. The new base station may request an old base station to release the context of the UE (UE context release message). If the AMF received a request for immediate transition to RRC IDLE with Suspend and there is no downlink data or signaling pending, the AMF may include a Suspend indication, and may keep the UE in CM-IDLE with Suspend and restarts the Periodic Registration Timer unless the Strictly Periodic Registration Timer Indication has been provided to the UE during a registration procedure. The AMF may send an N2 Resume Response to the new base station after the N3 Connectivity has been established, and may move the UE to CM-CONNECTED. If the AMF knows of mobile terminating data or signaling pending, the AMF may include the Extended Connected Time value to the RAN. If the AMF included the Suspend indication, the new base station may release the RRC Connection with Suspend. The new base station may send an RRC Resume message to the UE and the UE moves to CM-CONNECTED and RRC Connected. The new base station may release the N3 connectivity by sending an N2 Suspend Request to AMF including Suspend cause and N2 SM. The ew base station may send to the UE an RRC message (with DL data). The new base station may cipher the received DL data. The new base station may release the RRC Connection with Suspend including the DL EDT data.

In an example embodiment, for the UE supporting User Plane CIoT 5GS Optimisation, the Connection Resume procedure may be employed by the UE to perform RRC_IDLE with Suspend to RRC_CONNECTED state transition. The UE may initiate the transition from CM-IDLE and RRC IDLE state with Suspend to CM-CONNECTED and RRC Connected state. The UE may provide its Resume ID needed by a base station to access the UE's stored Context. The base station may perform UE Context Retrieval. The UE Context Retrieval may be performed when the UE Context associated with the UE attempting to resume its connection is not locally available at the accessed base station. The base station and the UE may continue the resume procedure and access stratum configuration synchronization may be performed between the UE and the network. The UE may enter CM-CONNECTED and RRC_CONNECTED. The base station may send an N2 resume request to an AMF. If the base station is the same as the base station when UE is suspended, the base station may send the N2 Resume Request to the AMF including Resume cause, and N2 SM information which indicates the PDU sessions successfully resumed, and PDU sessions failed or partially failed to resume the user plane resource. If the base station is different from the base station when UE is suspended, and the new base station is able to retrieve the UE Context from the old base station, the new base station node may initiate N2 Path Switch Request towards the AMF. If the RRC connection is resumed and the UE is accessing via the NB-IoT RAT with the RRC resume cause set to "MO exception data", the AMF may update all (H-)SMFs which have PDU Sessions using Small Data Rate Control with the MO Exception Data Counter. The AMF may maintain the MO Exception Data Counter for Small data Rate Control purposes. The (H-)SMF, in an N4 Session Modification Request, may update all UPFs and NEFs which have PDU Session(s) using Small Data Rate Control as to whether an RRC Connection was established for "MO Exception data" for Small Data Rate Control purposes. Each UPF may be updated for the first new RRC Connection which is triggered for "MO Exception data" and the first new RRC Connection afterwards without "MO Exception data". For each of the PDU Sessions, the AMF may invoke/send to a SMF an Nsmf_PDUSession_UpdateSMContext Request (PDU Session ID, Cause, Operation type, User Location Information, Age of Location Information, N2 SM Information). The Operation Type may be set to "UP Resume" to indicate resume of user plane resources for the PDU Session. For PDU Session(s) to be switched to the new base station, upon receipt of the Nsmf_PDUSession_UpdateSMContext request, the SMF may determine whether the existing UPF can continue to serve the UE. The SMF may send to the UPF an N4 Session Modification Request (AN Tunnel Info to be resumed, Buffering on/off). The SMF may initiate an N4 Session Modification procedure indicating the resume of AN tunnel. Buffering on/off may indicate whether the UPF may buffer incoming DL PDU or not. The UPF may send an N4 Session Modification Response to acknowledge the SMF request. The SMF may send to the AMF an Nsmf_PDUSession_UpdateSMContext response. If new CN tunnel information is allocated for the PDU session, the SMF may include the new CN tunnel information as part of the N2 SM information. If the resume for PDU session is unsuccessful, the SMF may include the resume failure as part of the N2 SM information. The AMF may send an N2 Resume Response to base station and may indicate success, including N2 SM information for the PDU session, if at least one PDU session is resumed successfully. If none of the PDU sessions is resumed successfully, the AMF may indicate failure to the base station. The AMF may send N2 Path Switch Acknowledge with PDU session resume information, if Path Switch Request is received. The AMF may provide Extended Connected Time value to the base station. If the base station receives the Extended Connected Time value, the base station may take this information into account when determining user inactivity. The base station may reconfigure the RRC connection based on resume result received from AMF. The base station may release the RRC Connection with Suspend including the DL EDT data.

Figure 32:
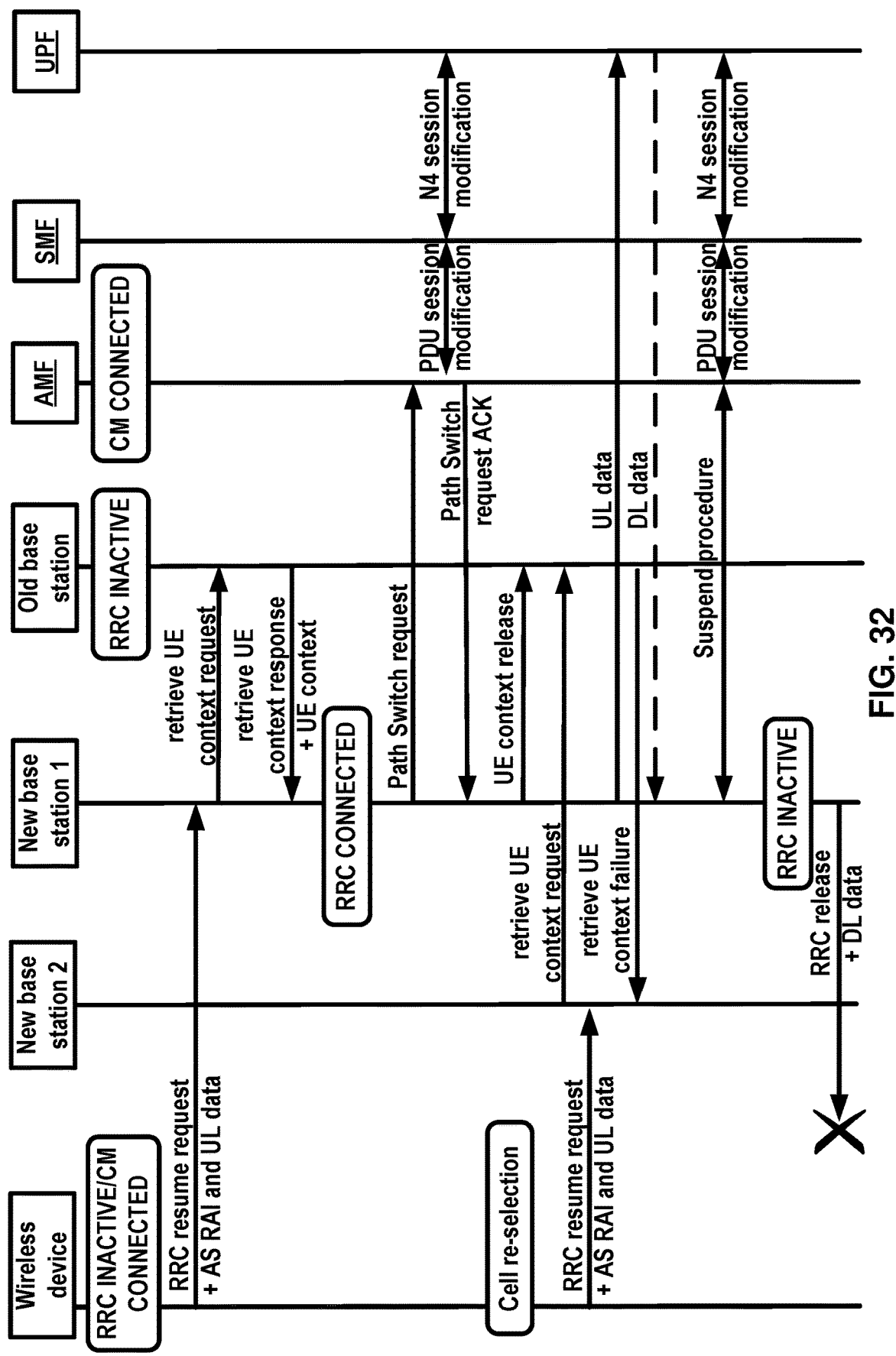
FIG. 32 is an example call flow as per an aspect of an embodiment of the present disclosure.

FIG. 31 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment while the procedure depicted in FIG. 31 is in progress, and the UE is performing an RRC resume procedure with MO EDT with new base station 1, the UE may perform a cell re-selection as depicted in FIG. 32. The UE may select a cell of a new base station 2 and send an RRC resume request with the UL data and the AS RAI with resume ID (or I-RNTI) to the new base station 2. The new base station 2 may send to the old base station a retrieve UE context request message. As depicted in FIG. 32, prior to receiving the retrieve UE context request message, the new base station 1 may send to the old base station a UE context release message. The new base station 2 may not be able to retrieve the UE context.

The DL data that may arrive for the UE may not be delivered to the UE and may be lost. To mitigate the problem, solutions of example embodiments as depicted in FIG. 22-30 may be employed.

Figure 33:
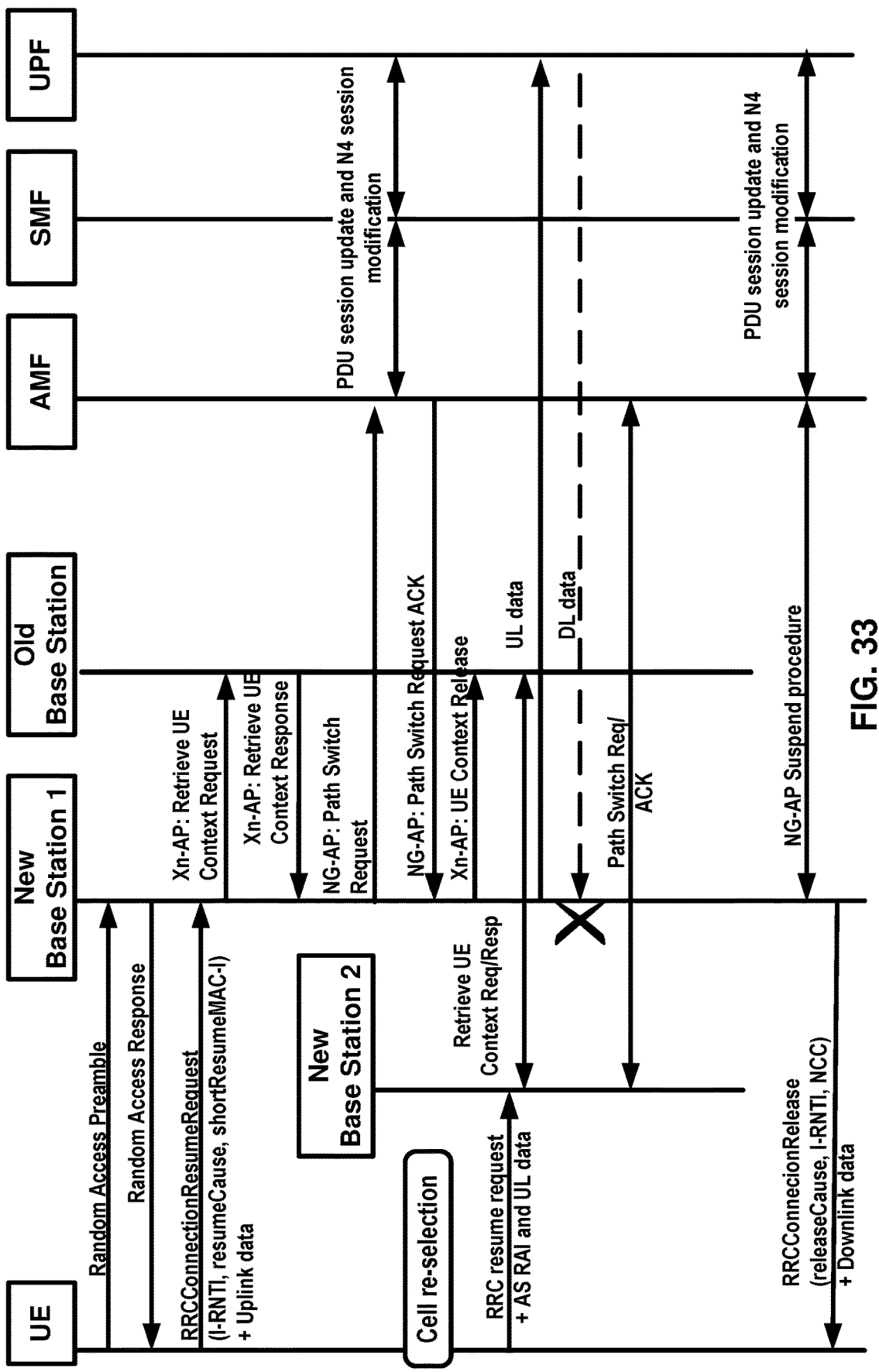
FIG. 33 is an example call flow as per an aspect of an embodiment of the present disclosure.

FIG. 33 illustrates a call flow of a procedure for data transmission during an RRC resume procedure performed for a wireless device in accordance with embodiments of the present disclosure. Before the call flow is initiated, the wireless device may receive a message from an old base station that causes the wireless device to transition from an RRC-CONNECTED state to an RRC-INACTIVE state. In an example, before the call flow is initiated, the wireless device may receive a message from an old base station that causes the wireless device to transition from an RRC-CONNECTED state to an RRC-IDLE state. The wireless device may send an RRC resume request to a new base station 1. The RRC resume request message may comprise an I-RNTI (and/or a resume ID), access stratum release assistance information/indication (RAI), uplink data (UL data), and/or the like. In an example embodiment as depicted in FIG. 33, upon connection resumption request for Mobile Originated data from the upper layers, the UE may initiate the MO-EDT procedure and may selects a random access preamble configured for EDT. The UE may send an RRC-ConnectionResumeRequest to the new base station 1, including a transaction ID, an I-RNTI, the UL data, AS RAI, the resume cause, and an authentication token. The UE may resume all SRBs and DRBs, and may derive new security keys using the NextHopChainingCount provided in the RRCConnectionRelease message of the previous RRC connection and re-establishes the AS security. The user data may be ciphered and transmitted on DTCH multiplexed with the RRCConnectionResumeRequest message on CCCH. The UE may indicate AS Release Assistance Information. The uplink data may be delivered to the UPF. In an example, the new base station 1 may locate the old base station using the Resume ID (for EPS) or I-RNTI (for 5GS) and may retrieve the UE context by means of the X2-AP (for EPS) or Xn-AP (for 5GS) Retrieve UE Context procedure. The old base station may respond with the UE context associated with the Resume ID (for EPS) or I-RNTI (for 5GS). For EPS, the new base station 1 may initiate a S1-AP Path Switch procedure to establish a S1 UE associated signaling connection to the serving MME and to request the MME to resume the UE context. For 5GS, the new base station 1 may initiate the NG-AP Path Switch procedure to establish a NG UE associated signaling connection to the serving AMF and to request the AMF to resume the UE context. For EPS, the MME may request a S-GW to activate the 51-U bearers for the UE and updates the downlink path. For 5GS, the AMF may request the SMF to resume the PDU session and the SMF may request the UPF to create the tunnel information for the UE and update the downlink path. For EPS, after the S1-AP Path Switch procedure the new base station 1 may trigger release of the UE context at the old eNB by means of the X2-AP UE Context Release procedure. For 5GS, after the NG-AP Path Switch procedure the new base station 1 may trigger release of the UE context at the old base station by means of the Xn-AP UE Context Release procedure.

Figure 34:
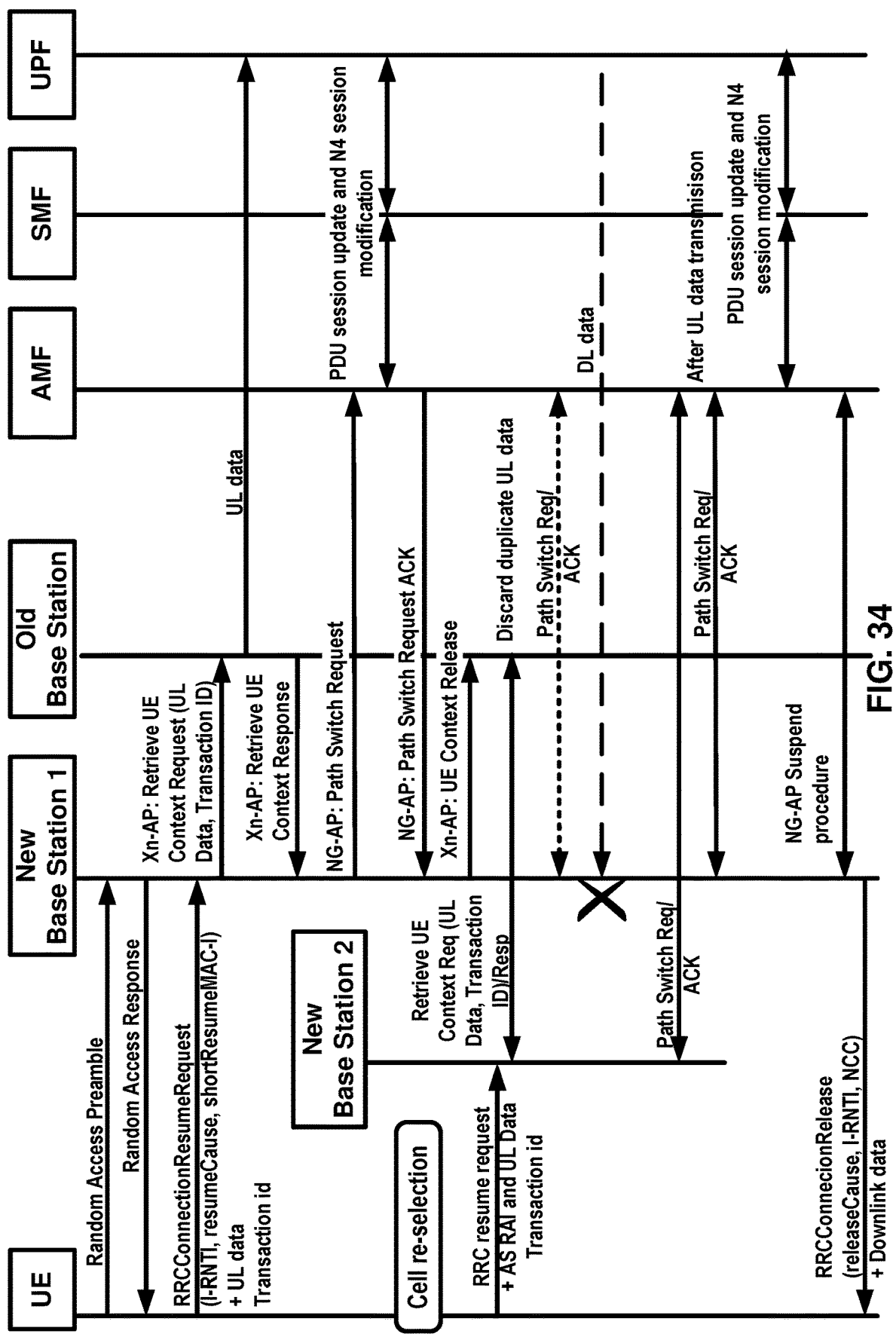
FIG. 34 is an example call flow as per an aspect of an embodiment of the present disclosure.

In an example embodiment as depicted in FIG. 34, during the resume procedure with the new base station 1 (as in FIG. 33) the UE may perform a cell reselection and may select a cell of the new base station 2. The UE may send an RRC resume request message to the new base station 2 that may comprise the transaction ID, the I-RNTI, the UL data, the AS RAI, the resume cause, and an authentication token. The new base station 2 may send a retrieve UE context request message to the old base station after the old base station receives the UE context release from the new base station 1 and releasing the UE context. The retrieve UE context request message may comprise the UL data and the transaction ID. The old base station may determine that based on the transaction ID the UL data is a duplicate data and not send the UL data to the UPF. The transaction ID may help reduce the transmission of duplicate data. The new base station 1 have received a path switch requested ACK and the UPF may send the DL data to the new base station 1. The DL data may not reach the UE and may be lost.

Figure 35:
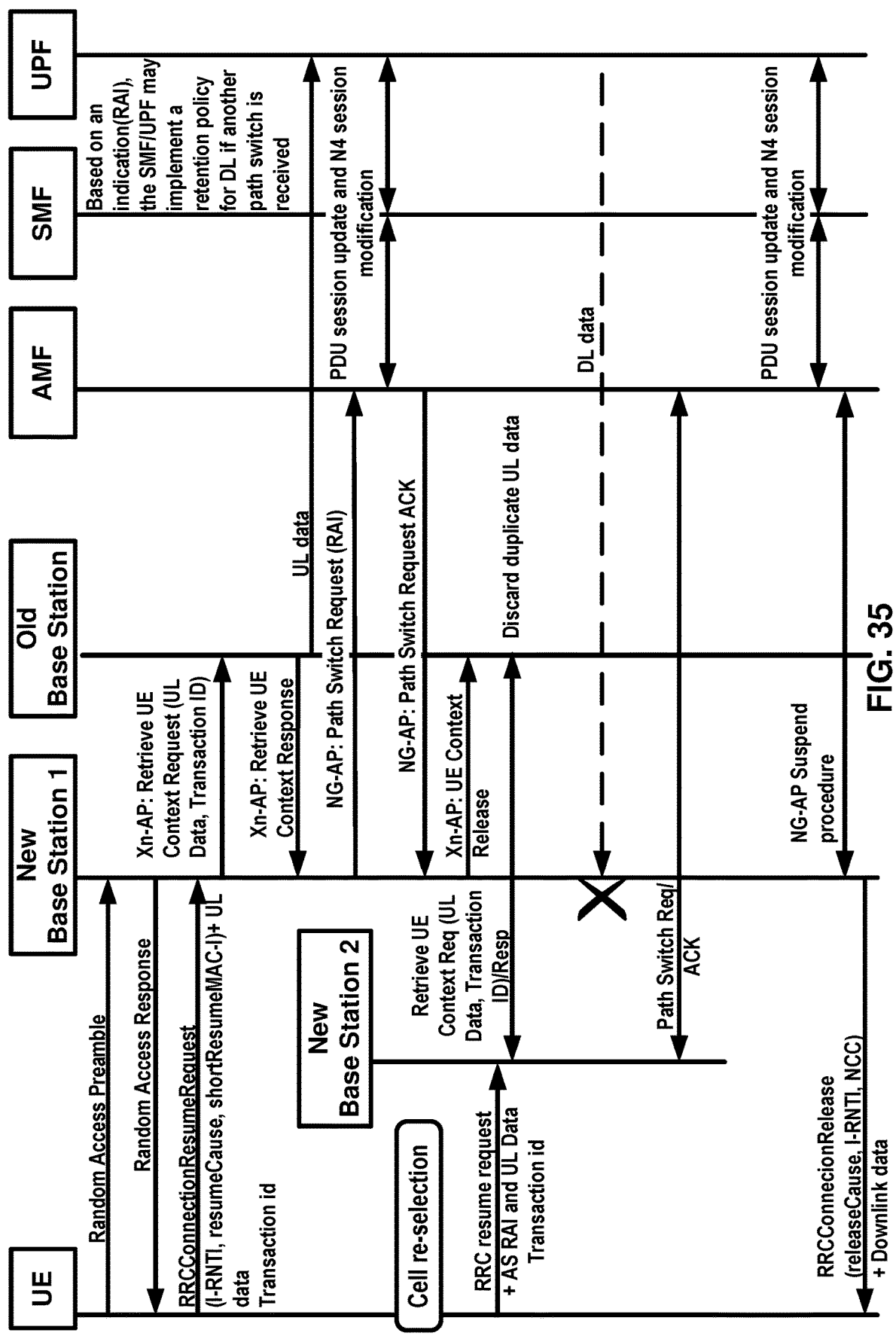
FIG. 35 is an example call flow as per an aspect of an embodiment of the present disclosure.

FIG. 35 illustrates a call flow of a procedure for data transmission during an RRC resume procedure performed for a wireless device in accordance with embodiments of the present disclosure. In an example, the procedure may comprise a path switch procedure (e.g., an NGAP path switch procedure). In an example embodiment as depicted in FIG. 35, an NGAP path switch request message may comprise the AS RAI or the RAI. The AMF may send to the SMF a N11 message such as the Nsmf_PDUSession_UpdateSMContext request message that may comprise the RAI. The SMF may employ the RAI and based on an element of the RAI, determine a retention policy for the DL data. For example, the SMF may request the UPF to forward the DL data to the SMF and the SMF may buffer the DL data for a time period to ensure that the resume procedure and delivery of the DL data to the UE is complete and successful. The SMF may send the RAI to the UPF via the N4 session modification procedure. The UPF may employ the RAI and based on an element of the RAI, determine a retention policy for the DL data. For example, the UPF may buffer the DL data for a time period to ensure that the resume procedure and delivery of the DL data to the UE is complete and successful.

Figure 36:
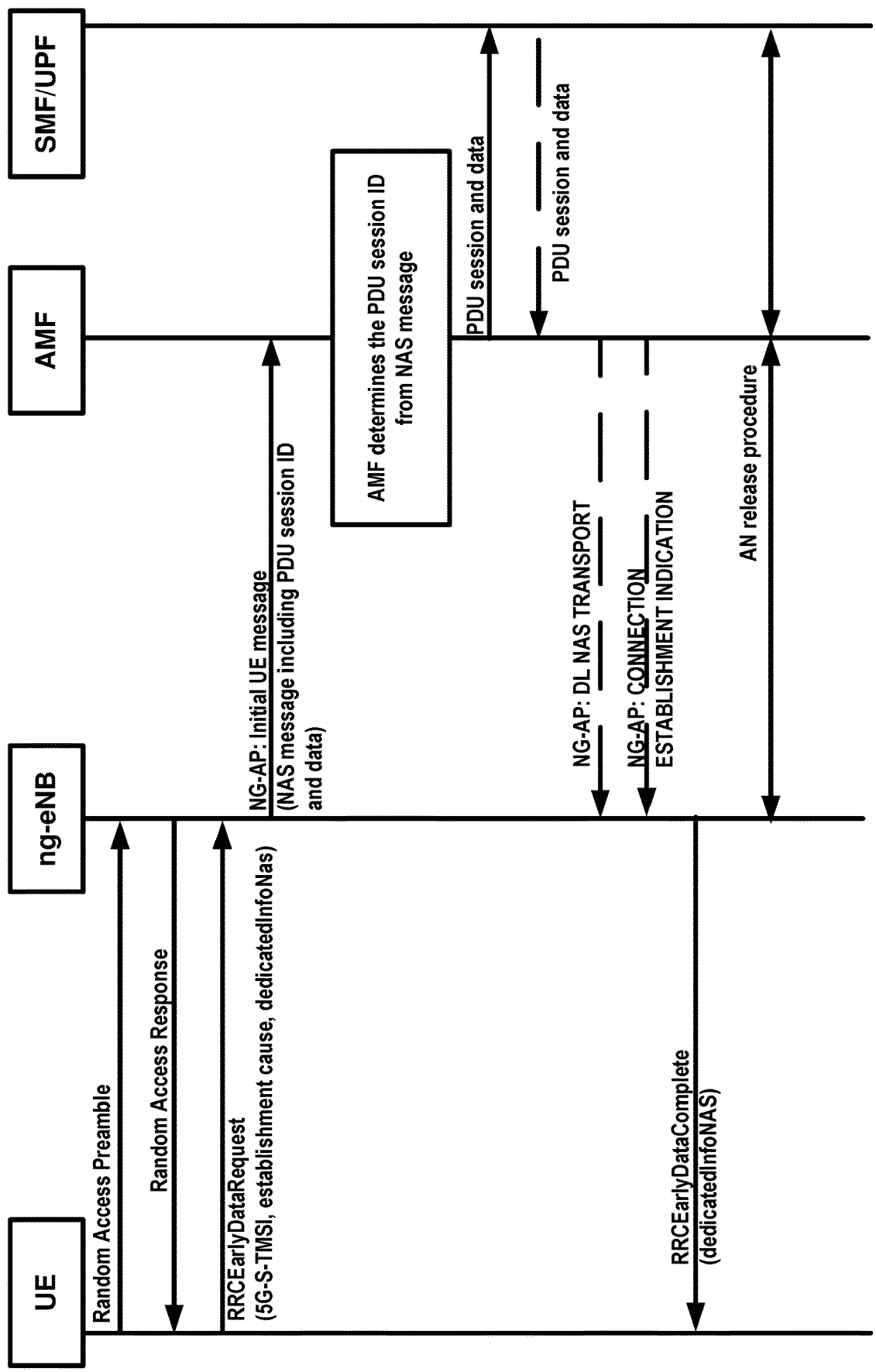
FIG. 36 is an example call flow as per an aspect of an embodiment of the present disclosure.

In an example embodiment, when the AMF, SMF, or the UPF receive the RAI, the RAI may be employed by a core network element such as the AMF, SMF or the UPF to determine delivery of the DL data based on control plane data transmission e.g., RRC early data transmission when the UE supports control plane CIoT 5GS optimizations. An example of the control plane data transmission is depicted in FIG. 36.

In an example embodiment as depicted in FIGS. 22, 23, and 27, the failure message may be an error indication message sent over Xn interface as part of an error indication procedure. The Error Indication procedure may be initiated by an NG-RAN node to report detected errors in one incoming message, provided they cannot be reported by an appropriate failure message. If the error situation arises due to reception of a message utilizing UE associated signaling, then the Error Indication procedure may employ UE-associated signaling. Otherwise the procedure uses non UE-associated signaling. The error indication message may comprise at least either a Cause IE or a Criticality Diagnostics IE. In case the Error Indication procedure is triggered by UE associated signaling, in the course of handover signaling and signaling for dual connectivity, the Old NG-RAN node UE XnAP ID IE and the New NG-RAN node UE XnAP ID IE shall be included in the error indication message. If any of the Old NG-RAN node UE XnAP ID IE and the New NG-RAN node UE XnAP ID IE is not correct, the cause may be set to an appropriate value. In an example, the cause IE may indicate that transmission of an RRC message to the UE has failed. In an example, the cause IE may indicate that reception of an RRC response message from the UE has failed.

In an example embodiment as depicted in FIGS. 22, 23, and 27, the failure message may be an RRC transfer message that is sent over Xn interface as part of an RRC transfer procedure. The purpose of the RRC Transfer procedure is to deliver a PDCP-C PDU encapsulating an LTE RRC message or NR RRC message to an NG-RAN node (e.g., the old base station). The purpose of the RRC Transfer procedure is to deliver a PDCP-C PDU encapsulating an LTE RRC message or NR RRC message to a S-NG-RAN-NODE that the PDCP-C PDU may then be forwarded to the UE, or from the S-NG-RAN-NODE, if the PDCP-C PDU was received from the UE. The delivery status may be provided from the S-NG-RAN-NODE to a M-NG-RAN-NODE using the RRC Transfer. The procedure may be employed to enable transfer one of the following messages from the M-NG-RAN-NODE to the S-NG-RAN-NODE, when received from the UE: the NR RRC message container with the NR measurements, the E-UTRA RRC message container with the E-UTRA measurements, the NR RRC message container with the NR failure information, and/or the like. The procedure may use UE-associated signaling.

Figure 37:
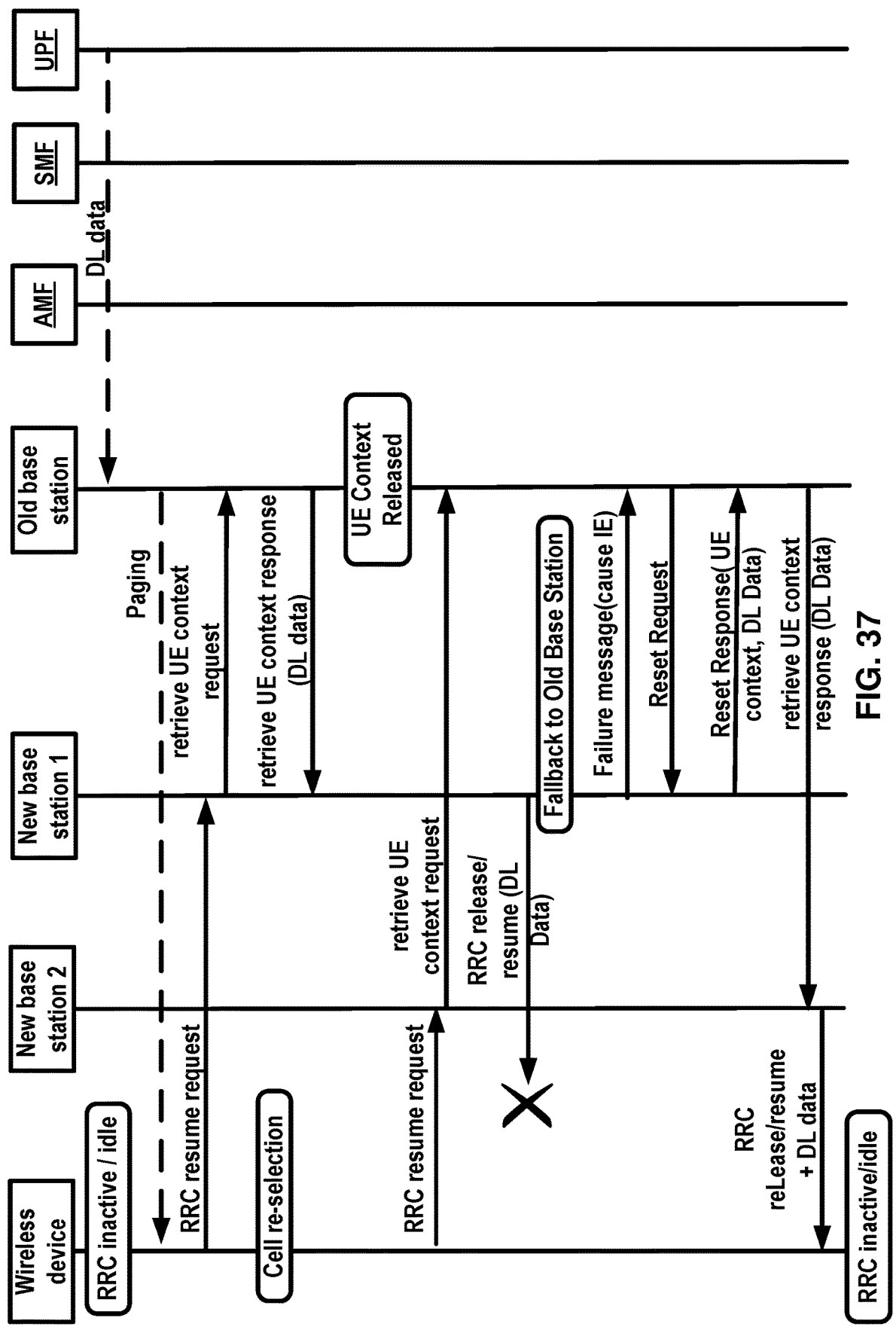
FIG. 37 is an example call flow as per an aspect of an embodiment of the present disclosure.

The failure message may be a reset message sent over an Xn interface as part of a reset procedure. The purpose of the Reset procedure is to align the resources in a NG-RAN node$_1$ and a NG-RAN node$_2$ in the event of an abnormal failure. The procedure either resets the Xn interface or selected UE contexts. This procedure doesn't affect the application level configuration data exchanged during, e.g., the Xn Setup procedure. In an example embodiment as depicted in FIG. 37, the failure message comprising the cause IE, may trigger the old base station to send a reset request message to the new base station 1. The new base station 1 may send a reset response message to the old base station. The reset response message may comprise the context of the UE and the DL data.

In an example embodiment, determining a reception failure may comprise the following. In an example, a determining that reception of an RRC message has failed, may be due to a base station sending an RRC message to a wireless device and the wireless device does not receive the RRC message e.g., due to a link failure, radio link failure, of the wireless device moving to out of coverage, and/or the like. The reception failure may be a transmission failure by the base station to the wireless device. The reception failure may occur when the wireless device receives the RRC message from the base station but transmission of an RRC response, RRC complete, or acknowledgement message to the base station fails e.g., due to a link failure.

Figure 38:
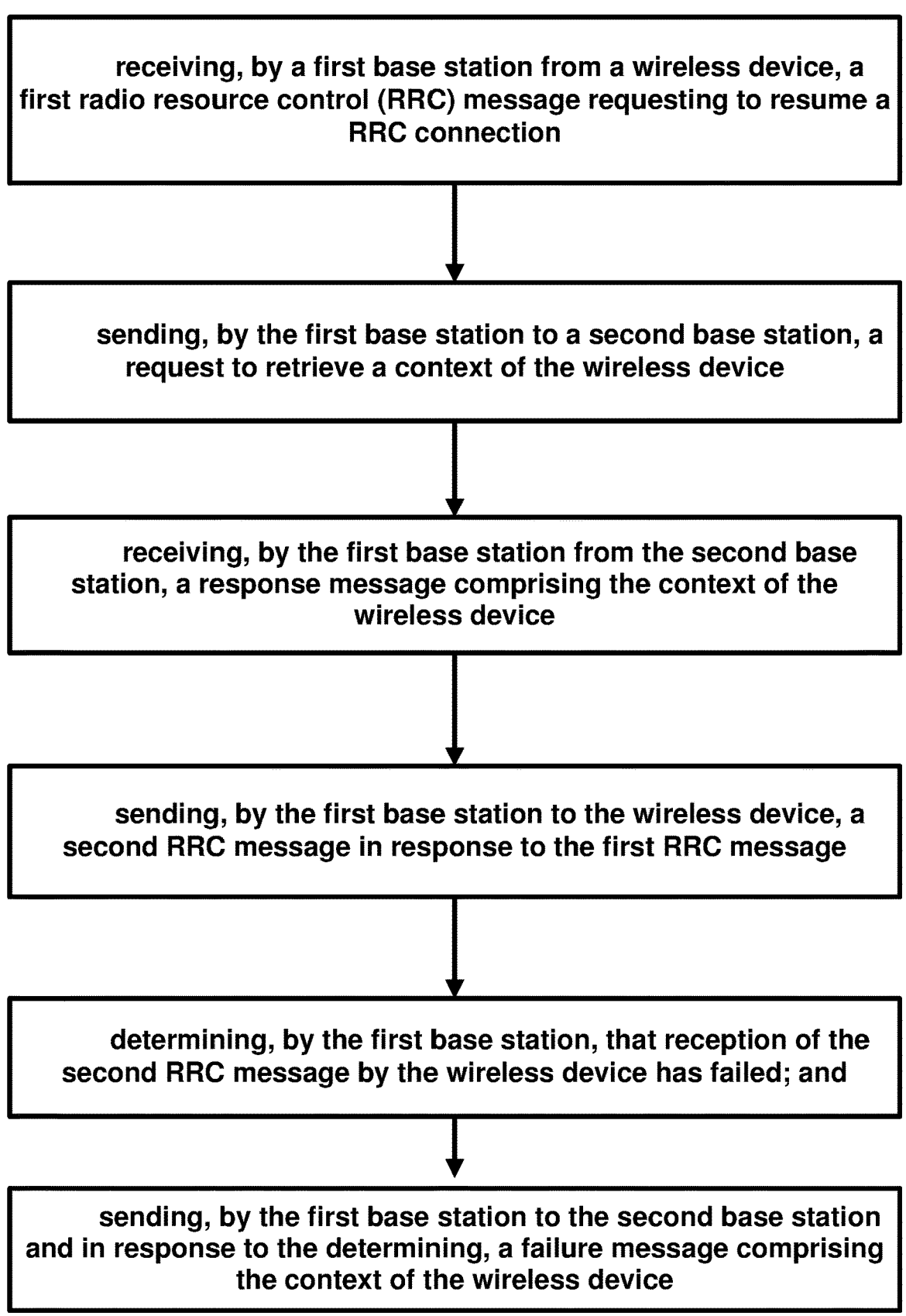
FIG. 38 is an example diagram as per an aspect of an embodiment of the present disclosure.
Figure 39:
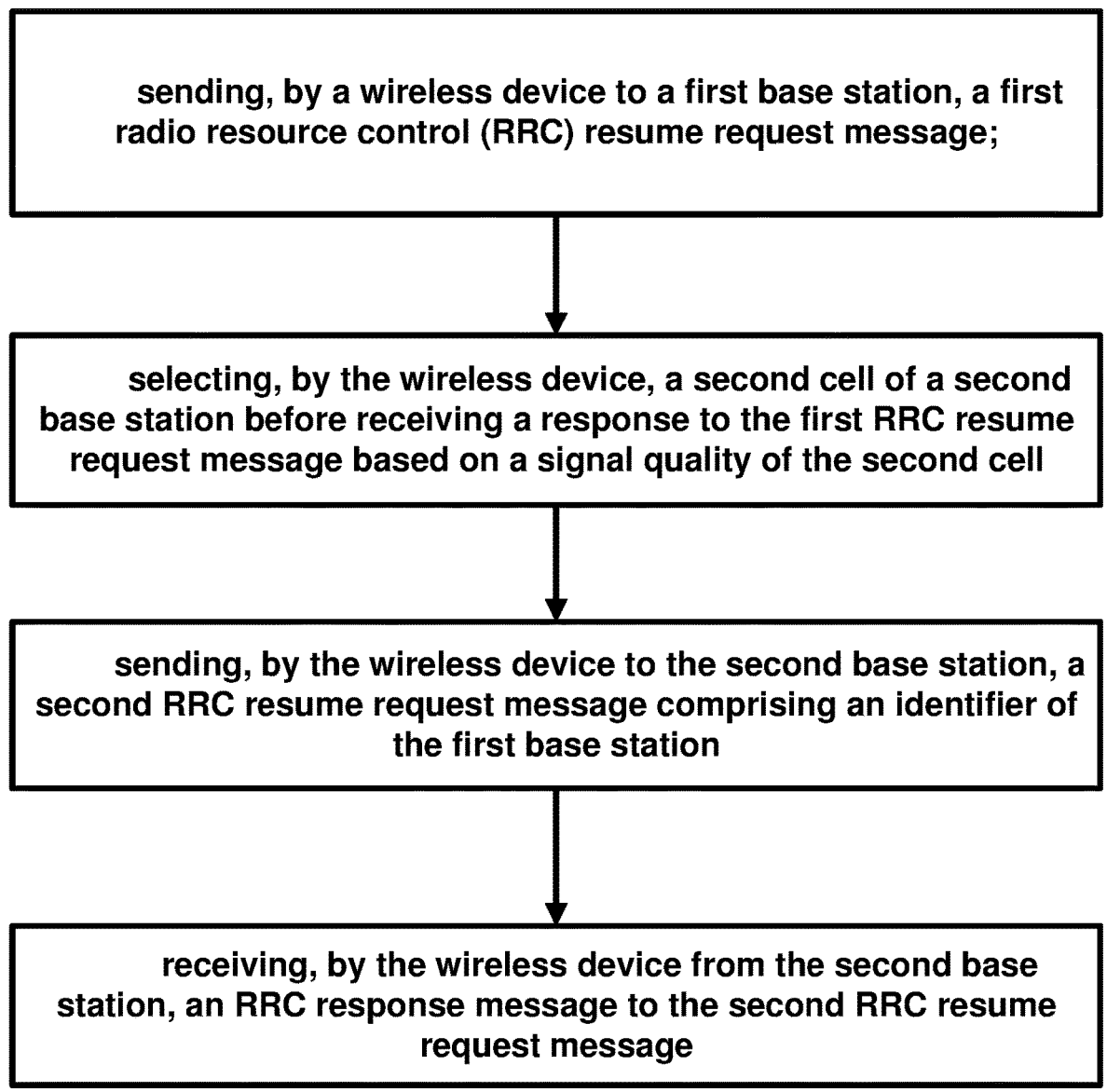
FIG. 39 is an example diagram as per an aspect of an embodiment of the present disclosure.

In an example embodiment as depicted in FIG. 38, a first base station may receive from a wireless device, a first radio resource control (RRC) message requesting to resume a RRC connection. The first base station may send to a second base station, a request to retrieve a context of the wireless device. The first base station may receive from the second base station, a response message comprising the context of the wireless device. The first base station may send to the wireless device, a second RRC message in response to the first RRC message. The first base station may determine that reception of the second RRC message by the wireless device has failed (e.g., the reception failure or a transmission failure). The first base station may send to the second base station and in response to the determining, a failure message comprising the context of the wireless device.

In an example, the first RRC resume request message may comprise a release assistance information (RAI), uplink data, and/or the like.

In an example, the RAI may indicate that no further uplink and no further downlink data transmission is expected, a single downlink data transmission and no further uplink data transmission is expected, more than single uplink or downlink data transmission is expected, a packet count value associated with UL data packets subsequent to the UL data, a packet count value associated with expected DL data subsequent to the UL data.

In an example, the RAI may comprise at least one of: expected data transmission information, a data radio bearer identity associated with data transmission, application information associated with a data transmission, a size of the expected data, and/or the like.

In an example, the first RRC resume request message may comprise a first transaction identifier.

In an example, the first RRC message may comprise at least one of: a resume UE identity of the wireless device, a next hop chaining count, radio access network (RAN) notification area information, period RAN-based notification area update timer value, and/or the like.

In an example, the second base station may send to the wireless device an RRC response message, wherein the RRC response message may comprise a RRC release message, or a RRC resume message.

In an example, the RRC response message may comprise downlink data.

In an example, the request to retrieve the context of the wireless device may comprise uplink data.

In an example, the request to retrieve the context of the wireless device may comprise an RAI.

In an example, the response message may be a retrieve UE context response message.

In an example, the retrieve UE context response message may comprise downlink data.

In an example, the failure message may comprise downlink data.

In an example, the second RRC message may comprise downlink data.

In an example, the second RRC message may be a RRC resume message, or a RRC release message.

In an example, the first RRC message may comprise a first resume identifier (resume ID), or a first inactive radio network temporary identifier (I-RNTI).

In an example, the request to retrieve a context of the wireless device may comprise the first resume identifier (resume ID), the first inactive radio network temporary identifier (I-RNTI).

In an example, the response message may comprise a first resume identifier (resume ID), or a first inactive radio network temporary identifier (I-RNTI).

In an example, the first base station may release the context of the wireless device.

In an example, the failure message may comprise a cause value indicating a failure to transmit an RRC message to the wireless device; or a failure to receive an RRC response message from the wireless device.

In an example, the failure message may be an RRC transfer message, a reset request message, or an error indication message.

In an example embodiment, a first base station may receive from a wireless device a first radio resource control (RRC) message requesting to resume RRC connection. The first RRC message may comprise uplink data, a release assistance information (RAI), indicating that downlink data is expected after transmission of the uplink data, and/or the like. The first base station may send to a second base station, a request to retrieve a context of the wireless device. The first base station may receive from the second base station, a response message. The response message may comprise the context of the wireless device, the downlink data, and/or the like. The first base station may send to the wireless device, a second RRC message. The second RRC message may comprise the downlink data. The first base station may determine that transmission of the second RRC message has failed. The first base station may send to the second base station in response to the determining, a failure message. The failure message may comprise the context of the wireless device, the downlink data, and/or the like.

In an example embodiment as depicted in FIG. 24 and FIG. 26, a first base station may receive from a wireless device a first radio resource control (RRC) message requesting to resume RRC connection. The first base station may send to a second base station, a request to retrieve a context of the wireless device. The first base station may receive from the second base station, a failure message. The failure message may comprise an identifier of a third base station. The first base station may send to the third base station, a request to retrieve the context of the wireless device. The first base station may receive from the third base station, a response message. The response message may comprise the context of the wireless device.

In an example embodiment as depicted in FIG. 30, a wireless device may send to a first base station, a first radio resource control (RRC) resume request message. The wireless device may select a second cell of a second base station before receiving a response to the first RRC resume request message based on a signal quality of the second cell. The wireless device may send to the second base station, a second RRC resume request message. The second RRC resume request message may comprise an identifier of the first base station. The wireless device may receive from the second base station, an RRC response message to the second RRC resume request message.

In an example, the identifier of the first base station may be a global gNB identifier of the first base station.

In an example, the second RRC resume request message may comprise a first resume identifier (resume ID), or a first inactive radio network temporary identifier (I-RNTI).

In an example, the second RRC resume request message may comprise a resume cause, a resume MAC-I, and/or the like.

In an example, the resume cause may indicate unsuccessful resume procedure with the first base station.

In an example, the wireless device transitions to an RRC-INACTIVE state may be in response to receiving the RRC response message.

In an example, the first RRC resume request message may comprise a release assistance information (RAI), uplink data, and/or the like.

In an example, the RAI may indicate that no further uplink and no further downlink data transmission is expected, a single downlink data transmission and no further uplink data transmission is expected, more than single uplink or downlink data transmission is expected, a packet count value associated with UL data, a packet count value associated with expected DL data.

In an example, the RAI may comprise at least one of: expected data transmission information, a data radio bearer identity associated with data transmission, application information associated with a data transmission, a size of the expected data, and/or the like.

In an example, the first RRC resume request message may comprise a first transaction identifier.

In an example, the second RRC resume request message may comprise a release assistance information (RAI), uplink data, and/or the like.

In an example, the second RRC resume request message may comprise a second transaction identifier, wherein the second transaction identifier may be equal to a first transaction identifier transmitted via the first RRC resume request message.

In an example, the RRC response message may be an RRC resume message; or an RRC release message.

In an example, the RRC response message may comprise downlink data.

In an example, the first RRC message may comprise at least one of: a resume UE identity of the wireless device, a next hop chaining count, radio access network (RAN) notification area information, period RAN-based notification area update timer value, and/or the like.

In an example, the RRC release message may comprise a suspend indication.

In an example, the RRC release message may comprise: a redirected carrier information, suspend configuration information, a cell reselection priority, and/or the like.

In an example, the wireless device may start a timer upon sending the first RRC resume request message.

In an example, the selecting (e.g., a cell of a new base station) may be in response to expiry of a timer by the wireless device.

In an example, the selecting may be based on a signal strength of the second base station.

In an example embodiment, a first base station may receive from a wireless device, a first radio resource control (RRC) message. The first base station may send to a second base station a first request message to retrieve a context of the wireless device. The first base station may receive from a second base station a first response message that may comprise the context of the wireless device. The first base station may receive from a third base station, a second request message to retrieve the context of the wireless device. The first base station may send to the third base station, a second response message that may comprise the context of the wireless device.

In an example, the first radio resource control (RRC) message may comprise a first resume identifier (resume ID).

In an example, the first resume ID may be an inactive radio network temporary identifier (I-RNTI).

In an example, the first request message may comprise the first resume ID.

In an example, the first response message may comprise a first resume ID.

What is claimed is:

1. A method comprising:
   sending, by a wireless device to a first base station, a first radio resource control (RRC) resume request message, wherein uplink data is sent using the first RRC resume request message;
   selecting, by the wireless device, a second cell of a second base station without receiving a response to the first RRC resume request message;
   sending, by the wireless device to the second base station, a second RRC resume request message comprising an identifier indicating the first base station; and
   receiving, by the wireless device from the second base station, a RRC response message to the second RRC resume request message, wherein the RRC response message comprises downlink data retrieved from the first base station by the second base station based on the identifier sent by the wireless device.

2. The method of claim 1, wherein the second cell of the second base station is selected base on a signal quality of the second cell.

3. The method of claim 1, wherein the identifier of the first base station comprises an inactive radio network temporary identifier (I-RNTI) associated with the first base station.

4. The method of claim 1, wherein the second RRC resume request message comprises access stratum release assistance information (RAI).

5. The method of claim 1, wherein the RRC response message comprises a RRC release message.

6. The method of claim 1, wherein the RRC response message comprises a RRC resume message.

7. The method of claim 1, further comprising performing a cell re-selection while a resume procedure with the second base station is in progress.

8. A wireless device comprising:
one or more processors; and
memory storing instructions that, when executed by the one or more processors, cause the wireless device to perform operations comprising:
sending, to a first base station, a first radio resource control (RRC) request resume message, wherein uplink data is sent using the first RRC resume request message;
selecting a second cell of a second base station without receiving a response to the first RRC resume request message;
sending, to the second base station, a second RRC resume request message comprising an identifier indicating the first base station; and
receiving, from the second base station, a RRC response message to the second RRC resume request message, wherein the RRC response message comprises downlink data retrieved from the first base station by the second base station based on the identifier sent by the wireless device.

9. The wireless device of claim 8, wherein the second cell of the second base station is selected base on a signal quality of the second cell.

10. The wireless device of claim 8, wherein the identifier of the first base station comprises an inactive radio network temporary identifier (I-RNTI) associated with the first base station.

11. The wireless device of claim 8, wherein the second RRC resume request message comprises access stratum release assistance information (RAI).

12. The wireless device of claim 8, wherein the RRC response message comprises a RRC release message.

13. The wireless device of claim 8, wherein the RRC response message comprises a RRC resume message.

14. The wireless device of claim 8, wherein the operations further comprise performing a cell re-selection while a resume procedure with the second base station is in progress.

* * * * *